US012754301B2

(12) United States Patent
Gross

(10) Patent No.: US 12,754,301 B2
(45) Date of Patent: Oct. 6, 2026

(54) ULTRASONIC SENSING FOR MEASURING OBJECTS IN SPATIAL ENVIRONMENTS

(71) Applicant: Providential Innovations, LLC, Nisswa, MN (US)

(72) Inventor: Robert Ray Gross, Nisswa, MN (US)

(73) Assignee: PROVIDENTIAL INNOVATIONS, LLC, Nisswa, MN (US)

(*) Notice: Subject to any disclaimer, the term of this patent is extended or adjusted under 35 U.S.C. 154(b) by 36 days.

(21) Appl. No.: 18/890,427

(22) Filed: Sep. 19, 2024

(65) Prior Publication Data

US 2025/0138173 A1 May 1, 2025

Related U.S. Application Data

(60) Provisional application No. 63/629,454, filed on Oct. 25, 2023.

(51) Int. Cl.
*G01S 7/54* (2006.01)
*G01S 13/00* (2006.01)

(52) U.S. Cl.
CPC .............. *G01S 7/54* (2013.01); *G01S 13/003* (2013.01)

(58) Field of Classification Search
CPC ................................. G01S 7/54; G01S 13/003
See application file for complete search history.

(56) References Cited

U.S. PATENT DOCUMENTS

| | | | | |
|---|---|---|---|---|
| 5,280,457 | A | 1/1994 | Figueroa et al. | |
| 7,679,996 | B2 | 3/2010 | Gross | |
| 9,084,045 | B2 * | 7/2015 | Scholte | H04R 19/005 |
| 2007/0268783 | A1 | 11/2007 | Okuda et al. | |
| 2008/0072675 | A1 * | 3/2008 | Okuda | G01H 11/08 310/326 |
| 2009/0085439 | A1 * | 4/2009 | Okuda | G01S 7/521 310/334 |
| 2018/0074177 | A1 | 3/2018 | Rudoy | |

FOREIGN PATENT DOCUMENTS

| | | |
|---|---|---|
| KR | 20220107169 | 8/2022 |

OTHER PUBLICATIONS

Jimenez J.A. et al., "Characterisation of an ultrasonic sensor designed to identify reflectors in 3D environments." Department of Electronics of the University of Alcalá., date Unknown, 7 pgs.
Kreczmer, "Estimation of the Azimuth Angle of the Arrival Direction for an Ultrasonic Signal by Using Indirect Determination of the Phase Shift." Archives of Acoustics vol. 44, No. 3, pp. 585-601 (2019), 17 pgs.

* cited by examiner

*Primary Examiner* — Krystine E Breier
(74) *Attorney, Agent, or Firm* — HAYES SOLOWAY P.C.

(57) ABSTRACT

Positioning acoustic receivers to sense an incoming acoustic wave uses a first receiver adjacent to a second receiver. The first and second receivers have a center point along a first axis. A third receiver is adjacent to the first receiver. A center point of the third receiver is along a second axis perpendicular to the first axis. A third axis, perpendicular to the second axis, crosses the center point of the third receiver. A fourth axis crosses the center point of the second receiver and is perpendicular to the third axis. A fourth receiver is adjacent to the second and third receivers. A center point of the fourth receiver is an offset distance from the third and fourth axes. The offset is greater than zero but less than one-half a wavelength of an incoming acoustic wave.

20 Claims, 22 Drawing Sheets

ULTRASONIC SENSING FOR MEASURING OBJECTS IN SPATIAL ENVIRONMENTS

CROSS REFERENCE TO RELATED APPLICATION

This application claims benefit of U.S. Provisional Application Ser. No. 63/629,454 filed Oct. 25, 2023, the entire disclosure of which is incorporated herein by reference.

FIELD OF THE DISCLOSURE

The present disclosure is generally related to ultrasonic sensors and more particularly is related to ultrasonic sensing for measuring objects in spatial environments.

BACKGROUND OF THE DISCLOSURE

Ultrasonic sensors for sensing and measuring objects in two-dimensional and/or three-dimensional space have been around for decades with uses in robotics, unmanned aerial vehicles (UAVs), and several other applications. The accuracy of measurements, in part, relies on how the ultrasonic sensors are able to receive ultrasonic waveforms. For example, with both time-of-flight (TOF) and pitch-catch acoustic sensing, the time of arrival of a transmitted ultrasonic wave and phase information on incoming waves may be relevant. Various methods for capturing this information, and arrangements for ultrasonic sensors to best capture this information, are presented in the following patents and non-patent literature.

The publication *Characterisation of an ultrasonic sensor designed to identify reflectors in 3D environments* by Jimenez J. A., et al., discusses the use of a single transmitter and multiple receivers to receive additional data from an incoming ultrasonic wave. FIG. 1 is an illustration of an ultrasonic sensor array 1 in accordance with the prior art, where a single transmitter 7 transmits an ultrasonic signal to be received by the nine receiving transducers 5 to locate objects in a three-dimensional spatial environment. Jimenez contemplates the use of nine receivers to locate objects in a three-dimensional spatial environment, but further states that only three transducers are typically needed to classify objects in three dimensions. Herein Jimenez, nine transducers in a rhombus shape are used to discriminate between edges, planes, and corners of an object. The rhombus shape is used for arranging the transducers due to the symmetry of the shape, which allows for simplified measurement calculations. The use of three transducers in this configuration would not yield measurements that can be used to determine the location of objects in a three-dimensional spatial environment.

US 2018/0074177 A1 to Rudoy utilizes the configuration of Jimenez, with the primary difference between Rudoy and Jimenez being a reduction in the number of transmitters. However, this reduction is a trivial matter, as it is known that the number of transmitters used in Jimenez is more than what is required to locate objects in a 3D spatial environment. Additionally, Rudoy distinguishes itself from Jiminez by stating that the use of more transmitters than what is illustrated in FIG. 1 cannot be done.

The publication *Estimation of the Azimuth Angle of the Arrival Direction for an Ultrasonic Signal by using Indirect Determination of the Phase Shift* by Bogdan Kreczmer discusses an arrangement that operates in one or two planes, but fails to reduce the number of transducers needed, and thus, in practice makes the system impractical. Kreczmer provides that directly obtaining the incoming phase information on an incoming ultrasonic wave is not possible as receivers are spaced apart more than ½ wavelengths. Thus, Kreczmer solves this problem indirectly by introducing the mathematical concepts used for transducers that are closely spaced together and applying that to the arrangement presented in Kreczmer. FIG. 2 illustrates an ultrasonic sensor array 2 in accordance with the prior art. Shown are incoming waves 9 on transducers 5, where the transducers 5 are separated out more than one-half wavelength and the incoming waves 9 approach the transducers 5 at various incoming angles.

KR20220107169A, assigned to Topsoens, proposes the use of miniature transducers that allows for the transducers to be placed closer than the ½ wavelength required to directly measure phase of the incoming ultrasonic waves. Phase ambiguity elimination in KR20220107169 requires that the transducers have a spacing of no more than ½ wavelength of the incoming signal. This solution has been known for many years, but microphones or receivers of that size have not been readily available. The required transducer spacing of KR20220107169 of no more than ½ wavelength allows for direct measurement of incoming phase, azimuth, and elevation to be directly calculated.

Additional known publications addressing this issue use polaroid electrostatic transducers. The use of polaroid electrostatic transducers does not implicate the issue associated with the ½ wavelength spacing required by the aforementioned transducers. However, the use of this is impractical when using piezoelectric transducers due to a limited field view of approximately 17 degrees. Other existing methods for measurements of objects in both two dimensional and three-dimensional space requires the use of an ultrasonic array. In examples of ultrasonic arrays, triangulation and trilateration are used to determine measurements in three dimensions, such as distance, azimuth, and elevation. Even here, however, a direct measurement is not possible.

Thus, a heretofore unaddressed need exists in the industry to address the aforementioned deficiencies and inadequacies.

SUMMARY OF THE DISCLOSURE

Embodiments of the present disclosure provide a method for positioning acoustic receivers for sensing an incoming acoustic wave. Briefly described, in architecture, one embodiment of the method, among others, can be broadly summarized by the following steps. Providing a first acoustic receiver having a center point; positioning a second acoustic receiver adjacent to the first acoustic receiver, wherein the second acoustic receiver has a center point, wherein the center points of each of the first acoustic receiver and the second acoustic receiver are positioned along a first axis; positioning a third acoustic receiver adjacent to the first acoustic receiver, wherein the third acoustic receiver has a center point, wherein the center points of each of the first acoustic receiver and third acoustic receiver are positioned along a second axis, wherein the second axis is perpendicular to the first axis, and wherein a third axis crosses the center point of the third acoustic receiver and a fourth axis crosses the center point of the second acoustic receiver, wherein the third and fourth axes are different from the first and second axes respectively, and are perpendicular; positioning a fourth acoustic receiver adjacent to the second acoustic receiver and the third acoustic receiver, wherein a center point of the fourth acoustic receiver is positioned an offset distance from each of the third axis and the fourth axis; and receiving an incoming acoustic wave having a wavelength, wherein the offset distance is greater than zero but less than one-half a wavelength of the incoming acoustic wave.

In one aspect, a step comprises, comparing, with a control device, parallel incoming acoustic waves received at each of a first group of acoustic receivers and a second group of acoustic receivers; and comparing, with the control device, parallel incoming acoustic waves received at each of a third group of acoustic receivers and a fourth group of acoustic receivers, wherein each group of acoustic receivers is unique and has at least two acoustic receivers.

In another aspect, the method further comprises determining a position of an object in a spatial environment by calculating: an elevation of the object by comparing parallel measurements between the first group of acoustic receivers and the second group of acoustic receivers; and an azimuth of the object by comparing parallel measurements between the third group of acoustic receivers and the fourth group of acoustic receivers.

In this aspect, the method further comprises calculating a position of an object in a spatial environment using at least one of: a distance of the object from at least one of the first, second, third, or fourth acoustic receivers; an elevation of the object relative to the position of at least one of the first, second, third, or fourth acoustic receivers; and an azimuth of the object relative to the position of at least one of the first, second, third, or fourth acoustic receivers.

In this aspect, the method further comprises positioning a transducer adjacent to at least one of the acoustic receivers; and emitting at least one acoustic wave with the transducer.

In this aspect, the method further comprises positioning an additional acoustic receiver adjacent to the second acoustic receiver, wherein the additional acoustic receiver has a center point positioned along the first axis.

In another aspect, the method further comprises positioning an additional acoustic receiver adjacent to the third acoustic receiver, wherein the additional acoustic receiver has a center point positioned along the second axis.

In this aspect, the method further comprises positioning a fifth acoustic receiver adjacent to the third acoustic receiver, wherein a center point of the fifth acoustic receiver is positioned along the second axis; and positioning a sixth acoustic receiver adjacent to the third acoustic receiver, wherein a center point of the sixth acoustic receiver is positioned along the first axis.

In another aspect, the method further comprises positioning a seventh acoustic receiver adjacent to the fifth acoustic receiver, wherein a center point of the seventh acoustic receiver is an offset distance from a fifth axis, wherein the fifth axis is perpendicular to the second and third axes, and wherein the offset distance of the seventh acoustic receiver is greater than zero but less than one-half the wavelength of the incoming acoustic wave.

In yet another aspect, the method further comprises positioning an eighth acoustic receiver adjacent to the sixth acoustic receiver, wherein a center point of the eighth acoustic receiver is an offset distance from a sixth axis, wherein the sixth axis is perpendicular to the first and fourth axes, and wherein the offset distance of the eighth acoustic receiver is greater than zero but less than one-half the wavelength of the incoming acoustic wave.

The present disclosure can also be viewed as providing an acoustic sensor array. In this regard, one embodiment of such an apparatus, among others, can be implemented as follows. A first acoustic receiver having a center point positioned adjacent to a second acoustic receiver, wherein the second acoustic receiver has a center point, and wherein the center points of each of the first acoustic receiver and the second acoustic receiver are positioned along a first axis. A third acoustic receiver is positioned adjacent to the first acoustic receiver, wherein the third acoustic receiver has a center point, wherein the center points of each of the first acoustic receiver and third acoustic receiver are positioned along a second axis. The second axis is perpendicular to the first axis. A third axis crosses the center point of the third acoustic receiver and a fourth axis crosses the center point of the second acoustic receiver, wherein the third and fourth axes are different from the first and second axes respectively, and are perpendicular. A fourth acoustic receiver is positioned adjacent to the second acoustic receiver and the third acoustic receiver. A center point of the fourth acoustic receiver is positioned at an offset distance from each of the third axis and the fourth axis. An incoming acoustic wave has a wavelength, and the offset distance of the fourth acoustic receiver is greater than one, but less than one-half a wavelength of the incoming acoustic wave.

In one aspect, a controller is added, wherein the controller compares the incoming acoustic waves received at a first group of acoustic receivers in parallel with a second group of acoustic receivers and the incoming acoustic wave is received at a third group of acoustic receivers in parallel with a fourth group of acoustic receivers, wherein each group of acoustic receivers is unique and has at least two acoustic receivers.

In another aspect, each of the acoustic receivers comprises a transducer.

In another aspect, a transducer is positioned adjacent to at least one of the acoustic receivers, wherein the transducer is configured to emit at least one acoustic wave.

In another aspect, an additional acoustic receiver is positioned adjacent to the second acoustic receiver, wherein the additional acoustic receiver has a center point positioned along the first axis.

In another aspect, an additional acoustic receiver is positioned adjacent to the third acoustic receiver, wherein the additional acoustic receiver has a center point positioned along the second axis.

In another aspect, a fifth acoustic receiver is positioned adjacent to the third acoustic receiver, wherein the fifth acoustic receiver has a center point positioned along the second axis; and a sixth acoustic receiver is positioned adjacent to the second acoustic receiver, wherein the sixth acoustic receiver has a center point positioned along the first axis.

In this aspect, a seventh acoustic receiver is positioned adjacent to the fifth acoustic receiver, wherein a center point of the seventh acoustic receiver is positioned an offset distance from a fifth axis, wherein the fifth axis is perpendicular to the second and third axes, and wherein the offset distance is greater than zero but less than one-half the wavelength of the incoming acoustic wave.

In yet another aspect, an eighth acoustic receiver is positioned adjacent to the sixth acoustic receiver, wherein a center point of the eighth acoustic receiver is positioned an offset distance from a sixth axis, wherein the sixth axis is perpendicular to the first and fourth axes, and wherein the offset distance is greater than zero but less than one-half of the wavelength of the incoming acoustic wave.

The present disclosure can also be viewed as providing a multi-array acoustic sensor arrangement. In this regard, one embodiment of such an apparatus, among others, can be implemented as follows. A housing has a first sensor array and a second sensor array. The second sensor array is positioned adjacent to the first sensor array. Each of the first and second sensor array has: a first acoustic receiver having a center point; a second acoustic receiver positioned adjacent to the first acoustic receiver, wherein the second acoustic receiver has a center point, wherein the center points of each of the first acoustic receiver and the second acoustic receiver are positioned along a first axis; a third acoustic receiver positioned adjacent to the first acoustic receiver, wherein the third acoustic receiver has a center point, wherein the center points of each of the first acoustic receiver and third acoustic receiver are positioned along a second axis, the second axis being perpendicular to the first axis, wherein a third axis crosses the center point of the third acoustic receiver and a fourth axis crosses the center point of the second acoustic receiver, wherein the third and fourth axes are different from the first and second axes, respectively, and are perpendicular; and a fourth acoustic receiver positioned adjacent to the second acoustic receiver and the third acoustic receiver, wherein a center point of the fourth acoustic receiver is positioned an offset distance from each of the third axis and the fourth axis. An incoming acoustic wave has a wavelength, and the offset distance of the fourth acoustic receiver is greater than one, but less than one-half a wavelength of the incoming acoustic wave.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
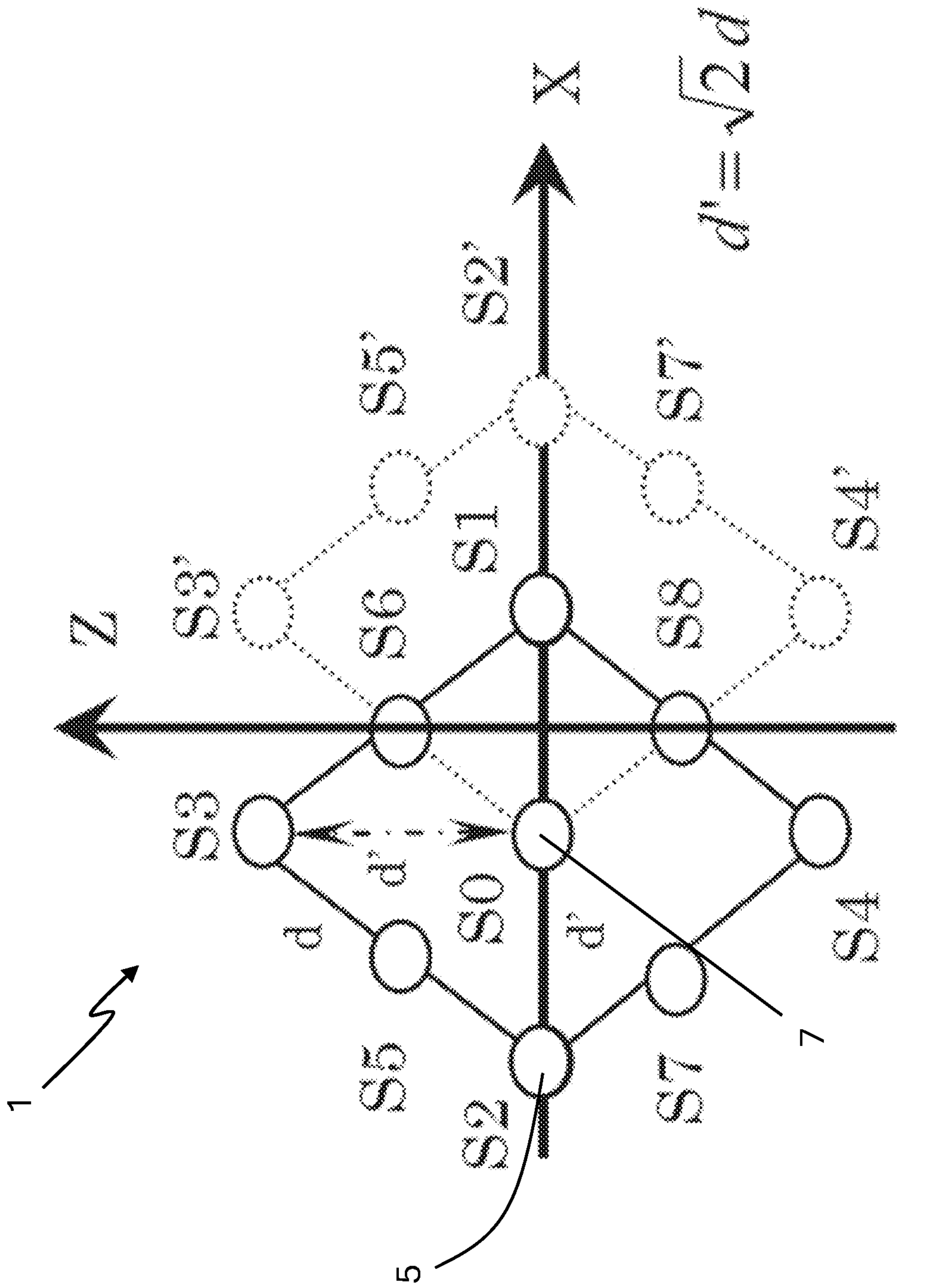
FIG. 1 Prior Art
FIG. 1 is an illustration of an ultrasonic sensor array, in accordance with the prior art.
Figure 2:
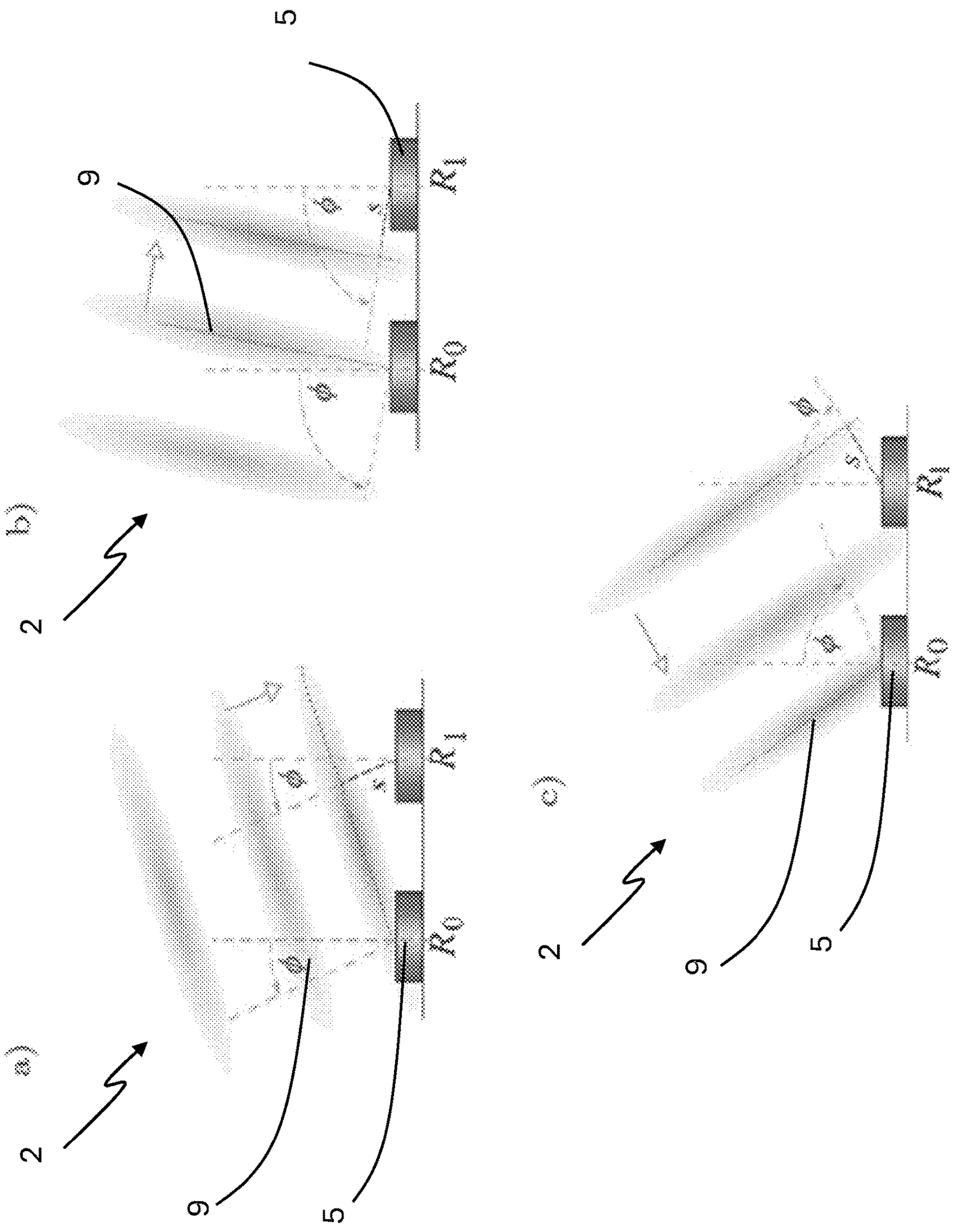
FIG. 2 Prior Art
FIG. 2 is an illustration of incoming waves on transducers, in accordance with the prior art.

The acoustic receivers (which may also be referred to as sensors, sensors having transducers, or simply transducers) described herein provide detection directions of an object relative to the sensors as distance, azimuth, and elevation data over the field of view of the sensors, where the sensors have a transducer positioned therein, and where the sensors are spaced farther apart than one-half the wavelength of an incoming acoustic wave. Methods for sensing distance, azimuth, and elevation of an object (sensing the object in three-dimensional space) relative to the sensors are discussed herein. Additionally discussed is the use of the sensors for detection of objects in two-dimensions. Detection of objects in two-dimensions decreases the detection directions to two directions, to include distance and azimuth, azimuth and elevation, and distance and azimuth.

The sensors or transducers may all provide robust distance azimuth and elevation data over the field of view of the sensor with transducers spaced farther apart than one-half the wavelength of an acoustic wave, which may be referred to as the sound wavelength. Three separate methods are presented in this disclosure for three-dimensional sensors. This disclosure also provides certain variants to the above. By removing one of the detection directions, the sensor may sense distance together with azimuth or elevation as a two-dimensional sensor. The sensor may also be reduced to detect only time of arrival, azimuth, and elevation without distance, as may be desired with a detection from another sensor or from a beacon. The sensor could also be reduced to detect only azimuth, and elevation without distance, as may be desired with a detection from another sensor or from a beacon. The sensor could also be reduced to detect only time of arrival, azimuth, or only elevation. The sensor could also be reduced to detect only azimuth, or elevation. Since these are all sub variants of the three-dimensional sensor, the disclosure primarily discusses the design and operation of the three-dimensional sensor. It is understood that similar concepts may be employed for designing and operating two-dimensional sensors.

Described herein are certain terms, structures and definitions that are applicable to all methods and designs. Some of these terms and structures include the following: receiver, transducer, transmit burst, ringdown, time of transmit burst, the received echo, time of arrival, time of flight, speed of sound at the current temperature, distance, time, azimuth, elevation, 3d math, layout of transducers, an optional extra transducer, angular resolution, the incoming echo. Below are explanations of these terms. The methods and design have variations in some of the areas that will be generally introduced here, but covered in detail in later portions of the specification.

A receiver can receive soundwaves. The receiver may be an acoustic receiver, a sensor, or transducer. In some examples, the receiver may be a piezoelectric receiver. A transducer is a device configured to both transmit and receive a sound wave. The transducer may be positioned within the sensor, or be the sensor itself.

A transmit burst is a short sound burst sent by the sensor and is typically 4 to 13 waves of a single frequency ultrasonic sound. The transmit burst may be a frequency of any ultrasonic frequency, but have a single frequency, typically 23 KHz, 25 KHz, 32 KHz, 40 KHz, or 50 KHz, with a range from 20 KHz to 100 KHz or higher. For brevity in disclosure, the frequency of 40 KKHz will be used as an example. It is understood that any single frequency may operate well. Use of lower frequencies, such as 23 KHz or 25 KHz may yield a longer-range sensor for detecting distance directions of an object relative to the sensors because air does not absorb lower frequencies as quickly as higher frequencies.

When a transducer initiates the sound burst, a ringdown on the transducer may cause that transducer to not be able to detect for some distance, typically about 30 cm and may not allow reliable measurement of phase during this time. Some transducers may ringdown more quickly, but at the expense of receiving sensitivity.

Ringdown effects may be alleviated by alternating sending the transmit burst between at least two transducers from each distance direction axis (e.g., azimuth and elevation). Doing so may allow phase measurement on the other distance direction axis, during ringdown, of azimuth and elevation every other measurement cycle. In this example, targets or objects farther than approximately 30 cm from the transducers may be always evaluated for azimuth and elevation, and targets or objects closer than 30 cm may have azimuth and elevation measured every other cycle.

The use of an additional transducer or transmitter may remove burst transmission from the transducers used to measure distance directions such as azimuth and elevation. This May allow for the phase of nearby targets, for example, targets closer than 30 cm, to be measured even during transmit burst and ringdown.

A time of transmit burst is the time that the transmit burst from the transducer starts. Even though for most piezoelectric transducers, the amplitude builds as the transducer transmits the sound waves, the start of the burst is the time used for the time of transmit burst.

A received echo includes the burst waveform, consisting of waves of sound, and the ringdown it leaves on the transducer.

Time of arrival is obtained when receiving the echo, where acoustic waves reflect off objects in the field of view of the sensor and subsequently return to the sensor. Alternatively, the acoustic waves may be transmitted from another sensor, transmitter, beacon, or object. Time to flight is used to estimate the distance based on the time elapsed from when the transmit burst occurred together with the speed of sound at the temperature in which the apparatus is operating and the time of arrival. A sensor with accurate distance measurements can use this information to calculate the azimuth and elevation using the calculations described herein.

Time of flight is the time between the transmit burst to the received echo. The elapsed time between the time of transmission and the time of arrival may be used to determine the time of flight. The time of flight can be calculated with the following:

$$ToF = ToT - ToA$$

Where, ToF is the time of flight; ToT is the time of transmission; and ToA is the time of arrival where the incoming acoustic wave is received at the sensors.

Because the speed of sound in air changes based on temperature, the speed of sound at a current operating temperature must be determined. This is typically done with a temperature sensor, and the calculation is as follows:

$$SOS_t = 331300 \times \sqrt{1 + \left(\frac{T}{273.15}\right)}$$

Where, $SOS_t$ is the speed of sound in air in millimeters per second; T is the temperature of the air in degrees Celsius; and 331,300 is the speed of sound in mm/s at 0° C.

Distance of an object or beacon relative to the sensor may be measured using the transmit burst and the time of arrival in the following equation:

$$\text{distance} = \frac{(ToF)}{(SOS_t/2)}$$

Where, ToF is the time of flight which is the time it takes for an acoustic wave to travel from a transducer emitting a transmit burst to the transducer or sensor receiving the transmit burst; and $SOS_t$ is the speed of sound in a given or measured air temperature.

Alternatively, a distance to a beacon or other external sensor relative to the sensors can be calculated using the following equation:

$$\text{distance} = \frac{(ToF)}{(SOS_t)}$$

Where, ToF is the time of flight which is the time it takes for an acoustic wave to travel from a transducer, beacon, or other external sensor emitting a transmit burst to the sensor receiving the transmit burst; and $SOS_t$ is the speed of sound in a given or measured air temperature.

Time is used instead of distance in the calculations because time is measured by a microcontroller. Because of this, conversion to distance is not required for all the real time math operations. However, time could be converted to distance using the $SOS_t$ for all the equations, but this may be inefficient. The conversion from distance to time occurs for finding the distance in time between transducers. Finding the distance in time between transducers occurs only when the temperature changes. The microcontroller operates by measuring time which allows the microcontroller or microcontroller within the sensor to not require extensive calculations during the receive portion of the measurement cycle, and just use, without conversion, the time measurements which may allow for better real time operation.

With regards to the distance directions, azimuth is a side-to-side, or right and left angular measurement and elevation is an up and down angular measurement. The three-dimensional math for azimuth and elevation is based upon right angle trigonometry principles. This is described in further detail relative to the methods and designs presented herein.

All methods and designs described herein may use various layouts for sensors and transducers. In some examples, an extra transducer or dedicated transmitter may be used, the benefits thereof described in detail relative to each method and design presented herein.

In industrial settings, where off-axis targets or beacons might be present, sensing objects, azimuth, and elevation in 180 degrees may be desired. The angular resolution of the sensor is best directly in front of the sensor, and decreases as objects move to the side. This is due to the physics of sound, the measurement noise, and resolution/accuracy of the phase (zero crossing) information provided by the sensor. Even so, the sensor can accurately measure the central region well, and still obtain, with decreasing accuracy, reliable estimates out to −90 degrees to +90 degrees.

The incoming echo can be considered a plane wave. Sound is a spherical wave front that spreads out from a source. This is true for reflections from objects in the field of view of the sensor (echo), or if the sensor is receiving a signal from a beacon or another sensor. Described herein are calculations to determine the direction of arrival of an incoming ultrasonic wavefront. With the calculations shown, applied to any two receivers at a time, the incoming wavefront can be considered as a plane wave.

Zero crossings, corresponding to phase of the incoming wave, all occur in the same plane because these correspond to the incoming angle of the incoming echo. That is, because the incoming wave can be modeled as a plane, all the zero crossings are also on that plane. The zero crossings repeat every 25 uS for 40 KHz (1/40 Khz) corresponding to the phase of the incoming wave.

Figure 3B:
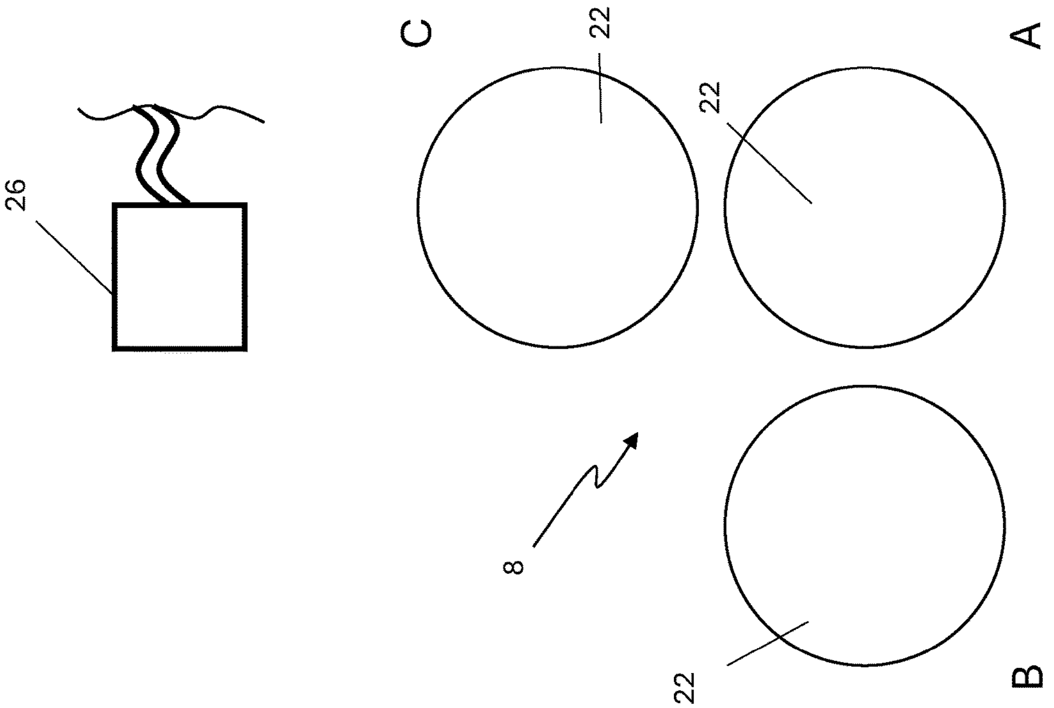
FIG. 3A-3B are top view illustrations of an acoustic sensor array, in accordance with embodiments of the present disclosure.
Figure 3A:
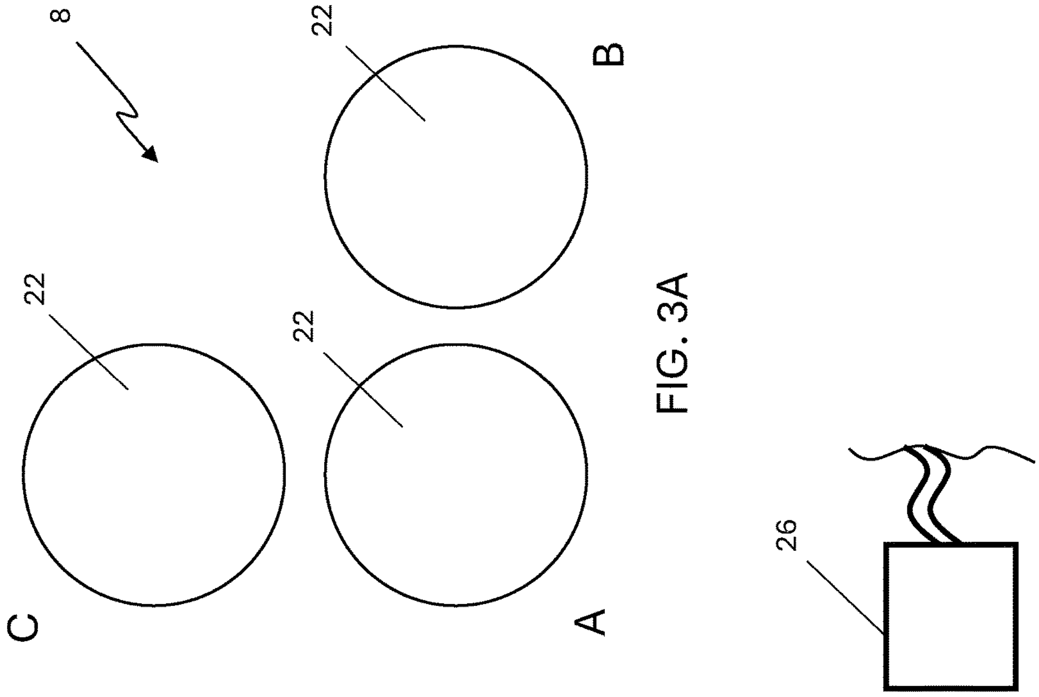

FIGS. 3A-3B are top view illustrations of an acoustic sensor array 8, in accordance with exemplary embodiments of the present disclosure. FIGS. 3A-3B show the minimum arrangement of acoustic receivers 22 to determine/calculate distance, elevation, and azimuth of objects. In some examples, at least one of the acoustic receivers 22 may be a transceiver, or a sensor having a transducer positioned therein. In some examples, the acoustic receivers 22 may be referred to as receivers, transceivers, sensors, or transducers. It is understood that these refer to the acoustic receivers 22, where the acoustic receivers 22 are configured as transceivers or have a transducer positioned therein.

In order to determine/calculate distance, elevation, and azimuth, a non-linear arrangement of the acoustic receivers 22 relative to one another is preferred. In one example, this may be an L-shape configuration of acoustic receivers 22. In some examples, when more than one acoustic receiver 22 is a transceiver, or each acoustic receiver 22 is a transceiver, transceivers of the acoustic receivers 22 may alternate between which one transmits acoustic waves. In some examples, additional acoustic receivers 22 may be placed in a vertical or horizontal arrangement for greater accuracy or coverage when detecting objects. Additionally, spacing between each acoustic receiver 22 can be varied according to environmental conditions. For example, while close spacing between acoustic receivers 22 in this example is not required, however, in cluttered environments, close spacing of acoustic receivers 22 may be favorable. FIG. 3B provides an additional example of a non-linear arrangement of acoustic receivers 22 where at least one acoustic receiver 22 is a transceiver.

In some examples, a control circuit 26 microcontroller, processing circuit, or analog to digital converter may be used to evaluate incoming acoustic waves. The control circuit 26 may be a stand-alone circuit separate from the acoustic receivers 22 or may be integrated within the acoustic receivers 22. A further discussion of the functions of the control circuit is discussed below.

The first working example presented focuses on a 40 KHz sound. If a different frequency sound is used, the spacing of the sensors (which may be referred to as transducers) and the calculations to obtain distance directions of an object must be recalculated using the understandings presented. FIGS. 3A-3B illustrate a suggested arrangement for the transducers. The transducers are aligned vertically (elevation) and horizontally (azimuth) relative to a first transducer A and located on the same plane. The sensor initiates a sound burst of sound waves, typically either from a second transmitter B or third transmitter C.

A short sound burst is sent by the transducer, typically 4 to 13 ultrasonic waves of a single frequency. When the second transducer B initiates the sound burst, the ringdown on the second transducer B will cause second transducer B to not be able to detect for some distance, typically about 30 cm and will not allow measurement of azimuth during this time. When the third transducer C initiates the sound burst, ringdown on the third transducer C will cause that transducer to not be able to detect for some distance, typically about 30 cm and will not allow measurement of elevation during this time. Alternating sending the sound burst between the second transducer B and third transducer C allows distance measurements every other measurement cycle during the ringdown.

The received echo includes the burst waveform which further includes the waves of sound and the ringdown left on the receiving transducer. For purposes of examples, 40 KHz will be used as a frequency, however, it should be noted that any wavelength can be used. In particular, for long distances, a lower frequency may be preferred, as lower frequencies are not absorbed by the air as quickly and allows for longer-range sensors. In this example, the transducers have a diameter of 16 mm and are spaced center-to-center 17.5 mm apart. This spacing allows for one wave to fall on a receiving transducer, and a different wave to fall on a nearby transducer. The following is a set of equations and calculations that can be used to accurately measure distance directions of an object relative to the position of the transducers.

The time spacing of a 40 KHz wave is 25 uS. This can be calculated by the following equation:

$$25uS = \frac{1}{40{,}000\ \text{Hz}}$$

This provides that sine waves of a 40 KHz sound occur every 25 uS for the duration of the echo. Because the speed of sound in air changes based on temperature, the speed of sound at a current operating temperature must be determined. This is typically done with a temperature sensor, and the following calculation:

$$SOS_t = 331300 \times \sqrt{1 + \left(\frac{T}{273.15}\right)}$$

Where, $SOS_t$ is the speed of sound in air in millimeters per second; T is the temperature of the air in degrees Celsius; and 331,300 is the speed of sound in mm/s at 0° C.

For the speed of sound in air at the temperature of 20° C.:

$$SOS_t = 331300\ \text{mm/S} \times \sqrt{1 + \left(\frac{20^\circ\ \text{C.}}{273.15}\right)}$$

$$SOS_t = 343214.6227\ \text{mm/S}$$

Provided is one example to calculate the wavelength in millimeters. With the speed of sound at a given or sensed temperature calculated, and the time spacing of the waves at a frequency of 40 KHz known, the following equation to calculate wavelength in millimeters May be used:

$$\text{Wavelength mm} = \text{time spacing} \times SOS_t$$

Where, $SOS_t$ is the speed of sound in the air in millimeters per second; time spacing a known time spacing at a given wavelength; and wavelength mm is the wavelength of the sound for a given frequency in mm.

In an example where the 40 KHz is the frequency of the sound the sensor is operating at and using the previous calculation for the speed of sound in air at the temperature of 20° C.:

$$\text{Wavelength mm} = 343214.6227\ \frac{\text{mm}}{\text{s}} \times 25uS$$

$$\text{Wavelength mm} = 8.58\ \text{mm}$$

It is understood that for this calculation certain unit conversions are required.

Next, the time spacing of the two transducers can be calculated. Given a center-to-center transducer spacing, the time spacing can be calculated. The general equation for time spacing is as follows:

$$TS_{A-B} = \frac{\text{center to center spacing}}{SOS_t}$$

As applied to the example of a 40 KHz frequency, a transducer with a center-to-center spacing of 17.5 mm in an environment with an air temperature of 20° C., the time spacing can be calculated as follows:

$$TS_{A-B} = \frac{17.5\ \text{mm}}{343214.6227}$$

$$TS_{A-B} = 50.99uS$$

A time spacing of 50.99 uS allows for up to 2.034 acoustic waves to fall on the face of the transducers. This is calculated by dividing $TS_{A-B}$ with the time spacing of a 40 KHz wave. Because the sound can come in from either one side or the other, this allows for the need to evaluate just over four wavelengths.

The incoming echo can be considered a plane wave. Sound is a spherical wave front that spreads out from a source. This is true for reflections from objects in the field of view of the sensor (echo), or if the sensor is receiving a signal from a beacon or other external sensor. With the calculations shown, applied to any two receivers at a time, the incoming wavefront can be considered as a plane wave.

Sound waves reflect off objects in the field of view and return to the sensor. Time of flight is used to estimate the distance based on the time elapsed from when the transmit burst occurred, together with the speed of sound at the temperature of operation, and the time of arrival. A sensor with very accurate distance measurements can use this information to calculate the azimuth and elevation using right angle trigonometry. But with receivers spaced closely together, and time of arrival typically being determined within a few millimeters by accurate methods this yields low accuracy estimates for azimuth and elevation. But when the time of arrival is known to an accuracy of less than one quarter wavelength of sound being received, the incoming phase information can then be accessed with certainty. Large objects within the central field of view of the sensor allow the needed accuracy for the time of arrival to be used to access the phase information with certainty. Smaller objects and objects outside the main central field of view of the sensors are still received and provide usable distance with and less accurate phase information than can be used to estimate azimuth and elevation using this method.

The echoes are electronically processed. Each transducer may have its own amplifier and associated circuitry. For each transducer the echo is amplified, and this signal is used for two purposes. These occur at substantially the same time. The amplified echo is sent to a slope integrator circuit. The slope integrator circuit may be an electronic circuit. Alternatively, the function of the slope integrator circuit could be done by measuring the amplified sine wave with an analog to digital converter and then processed to find the beginning of the signal. Some analog to digital convertors might have sufficient accuracy to not require an amplified sine wave. The echoes are also sent to a zero cross detector circuit which may amplify the waveform before electrically connecting to a zero cross comparator circuit. Alternatively, the function of the zero cross detector circuit could be done by looking at the amplified sine wave with an analog to digital converter and then processing the sine wave for zero crossings. Some analog to digital convertors might have sufficient accuracy to not require an amplified sine wave. The slope integrator is used to determine the time of arrival, where the rising integrator is sampled by an analog to digital converter, and the exact point where the integrator starts to rise from zero is determined (i.e. the accurate time of arrival), where the slope of the rise can be used to find the start of the rise, that is, the beginning of the received wave, which allows for accurate estimates for time of arrival. The second is to yield an accurate phase from the zero crossings. It should be noted that the zero cross detector may be one which yields an accurate phase from the incoming waves. In one example, the measurements taken of the zero cross times have one sigma jitter of 50 nS, centered around the correct value of 0 nS. Thus, in this example, the zero cross times can be measured to within plus or minus 100 nS more than 95% of the time.

The zero crossings, corresponding to phase, for the incoming wave all occur in the same plane because these correspond to the incoming angle of the incoming echo. That is, because the incoming wave can be modeled as a plane, all the zero crossings are also on that plane. Because this incoming wave, when off axis, has zero crossings repeating every 25 uS for 40 KHz (1/40 Khz), and the time (time of flight×distance) between the transducers is greater than 12.5 uS, the corresponding phase must be determined.

A slope integrator allows for accurate time of arrival to be calculated and yields distance to the target when combined with burst transmit time and the speed of sound. In order to correctly determine the phase, the time of arrival accuracy must always be within one-half wavelength of the sound being detected. Time of arrival accuracy to within a few millimeters allows the sensor to use the phase corrected time of arrival to calculate azimuth and elevation using both the time of arrival and phase.

To calculate azimuth using the phase corrected time of arrival, the time of arrival difference between the time of arrival between two different transducers is calculated, followed by finding the closest matching phase zero crossings of the same polarity. The zero crossings found can be either a rising or falling zero crossing, but the zero crossing selected must remain consistent, i.e., if the rising zero crossing is chosen, all measurements must be done for the rising zero crossing and vice versa. For purposes of this example, the rising zero crossing will be used.

Time is used instead of distance for the calculations because time is measured by a microcontroller, and thus, conversion to distance is not required for all the real time operations. The conversion from distance to time occurs for finding the distance in time between transducers. Finding the distance in time between transducers occurs only when the temperature changes. This allows the microcontroller and sensors to not require extensive calculations during the receive portion of the measurement cycle, and just use, without conversion, the time measurements it does, and this allows better real time operation. For example, if the difference in time of arrival between the first transducer A and the second transducer B is 20 uS, then the closest rising zero crossing to the time of arrival of the first transducer A ($ToA_A$) is found, and then 20 uS later, the closest zero crossing to 20 uS later is found for the time of arrival of the second transducer B ($ToA_B$). For purposes of the example, it will be assumed that the closest rising zero crossing to 20 uS from $ToA_A$ to $ToA_B$ is found at 28 uS. This may be referred to as $ToAP_{A-B}$. This elevation measurement, being completed using the phase of the incoming plane wave, is much more accurate than can be completed using time of arrival alone. The distance between the receiving transducers is converted to time. With the previously calculated 50.99 uS center-to-center transducer spacing, and with 20 uS time of arrival difference, the azimuth angle calculates to 23.09 degrees using the following:

Where the general equation is:

$$\text{azimuth} = 90 - \left(\cos^{-1}\left(\frac{(ToA_A - ToA_B)}{TS_{A-B}}\right) \times \left(\frac{180}{\pi}\right)\right)$$

The equation as applied to the example numerical values is:

$$\text{Azimuth} = 90 - \left(\frac{(20)}{(50.99)} \times \left(\frac{180}{\pi}\right)\right)$$

$$\text{Azimuth} = 23.09°$$

Azimuth may however be calculated with greater accuracy using the closest rising zero crossing of 28 uS as identified above.

$$\text{Azimuth} = 90 - \left(\frac{(28)}{(50.99)} \times \left(\frac{180}{\pi}\right)\right)$$

$$\text{Azimuth} = 33.31°$$

As can be seen, using time of arrival alone has an error of approximately 10 degrees. Using time of arrival phase instead, that is, the closest identified zero crossing, increases accuracy of angle measurements.

It should be noted that elevation measurements and calculations are a repeat of the azimuth measurements, except that it uses the first transducer A and the third transducer C, and thus $ToA_A$ and $ToA_C$, and $ToAP_{A-C}$. Because the calculations for elevations rely on the same equations and concepts as calculating azimuth, with only a difference in the values used, the calculations will not be restated for brevity in disclosure.

It should additionally be noted that arcsine may also be used to further simplify the above equation, as the use of arcsine removes the "90-" as seen in the previous azimuth formula. The general formula for that is as follows:

$$\text{Azimuth} = \left(\sin^{-1}\left(\frac{ToAP_{A-B}}{TS_{A-B}}\right) \times \left(\frac{180}{\pi}\right)\right)$$

$$\text{Elevation} = \left(\sin^{-1}\left(\frac{ToAP_{A-C}}{TS_{A-C}}\right) \times \left(\frac{180}{\pi}\right)\right)$$

Figure 4:
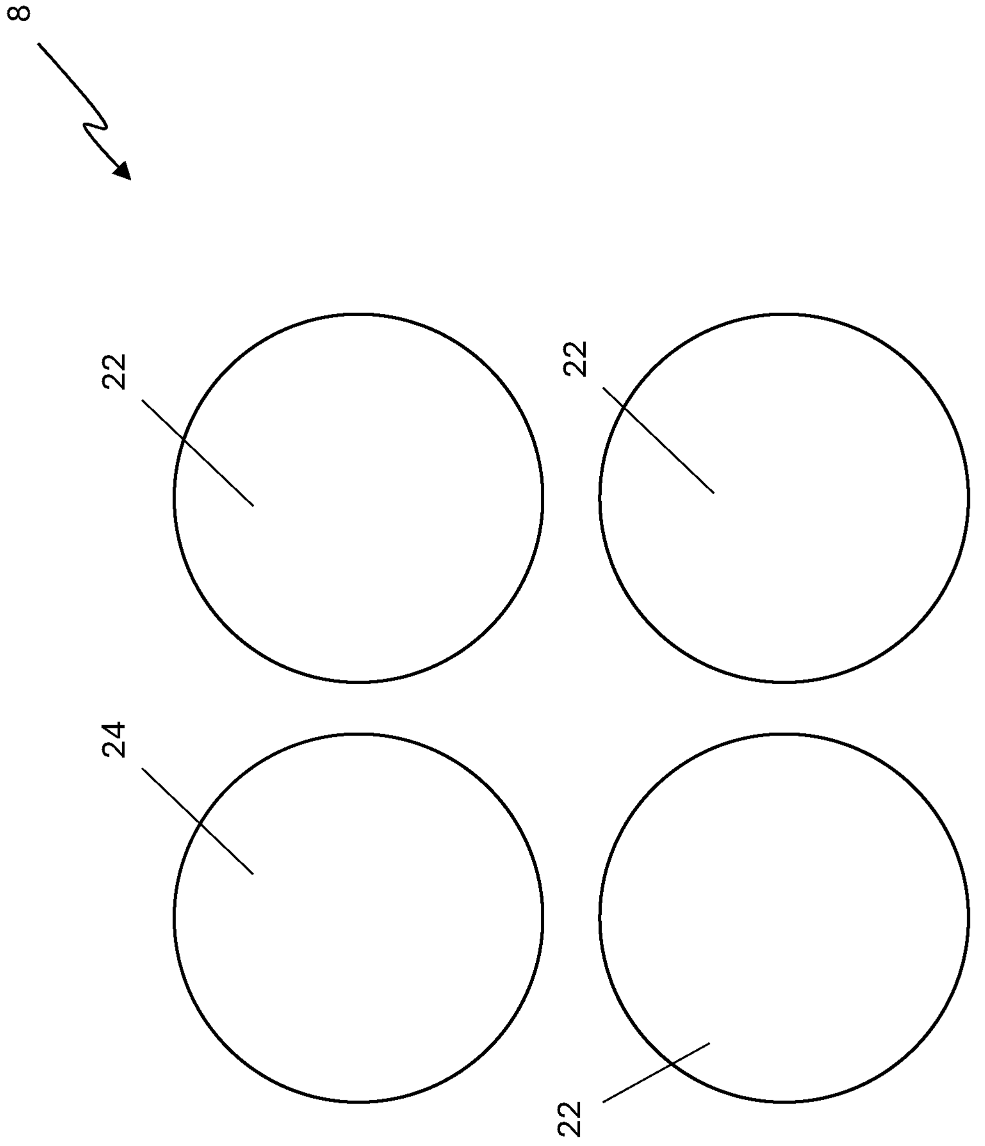
FIG. 4 is a top view illustration of an acoustic sensor array, in accordance with embodiments of the present disclosure.

FIG. 4 is a top view illustration of an acoustic sensor array 8, in accordance with exemplary embodiments of the present disclosure. FIG. 4 illustrates the three acoustic receivers 22 as seen in FIG. 3A-3B, but now has an additional fourth component. This fourth component may be a transmitter 24 or transducer configured to only transmit an acoustic wave or sound burst. In some examples however, the fourth component may also be an acoustic receiver 22 that is configured to both transmit and receive acoustic waves, thus increasing the total number of acoustic receivers 22 capable of transmitting and receiving an incoming acoustic wave to four. The functions and possible advantages of a transmitter 24 are discussed herein.

A fourth transducer may be added to the system, where the fourth transducer only transmits. This eliminates the ringdown on the receiving transducers and allows for close echoes to be used to determine azimuth and elevation during the ringdown period. The use of the additional fourth transducer may remove burst transmission from the transducers used to determine azimuth and elevation to allow for close targets. The phase from these nearby targets may be measured even during transmit burst and ringdown by the receiving transducers.

With reference to FIGS. 3A-4, the minimum transceiver and/or acoustic receiver 22 and acoustic transmitter 24 configuration needed to determine distance, elevation, and azimuth of an object is either one of: three transceivers, three acoustic receivers 22, three acoustic receivers 22 and one acoustic transmitter 24, or any combination thereof. When measuring objects in three dimensions, it is preferred that acoustic receivers 22 and/or transceivers be placed in a non-linear arrangement. FIG. 4 shows an arrangement having the minimum number of acoustic receivers 22 to determine/calculate distance, elevation, and azimuth of objects with a transmitter 24 positioned proximate to or within the acoustic receiver 22 array. In some examples, the transmitter 24 may be a transceiver, as can the acoustic receivers 22. Thus, this arrangement provides for at least one transceiver, and four ways to receive incoming acoustic waves.

Figure 5A:
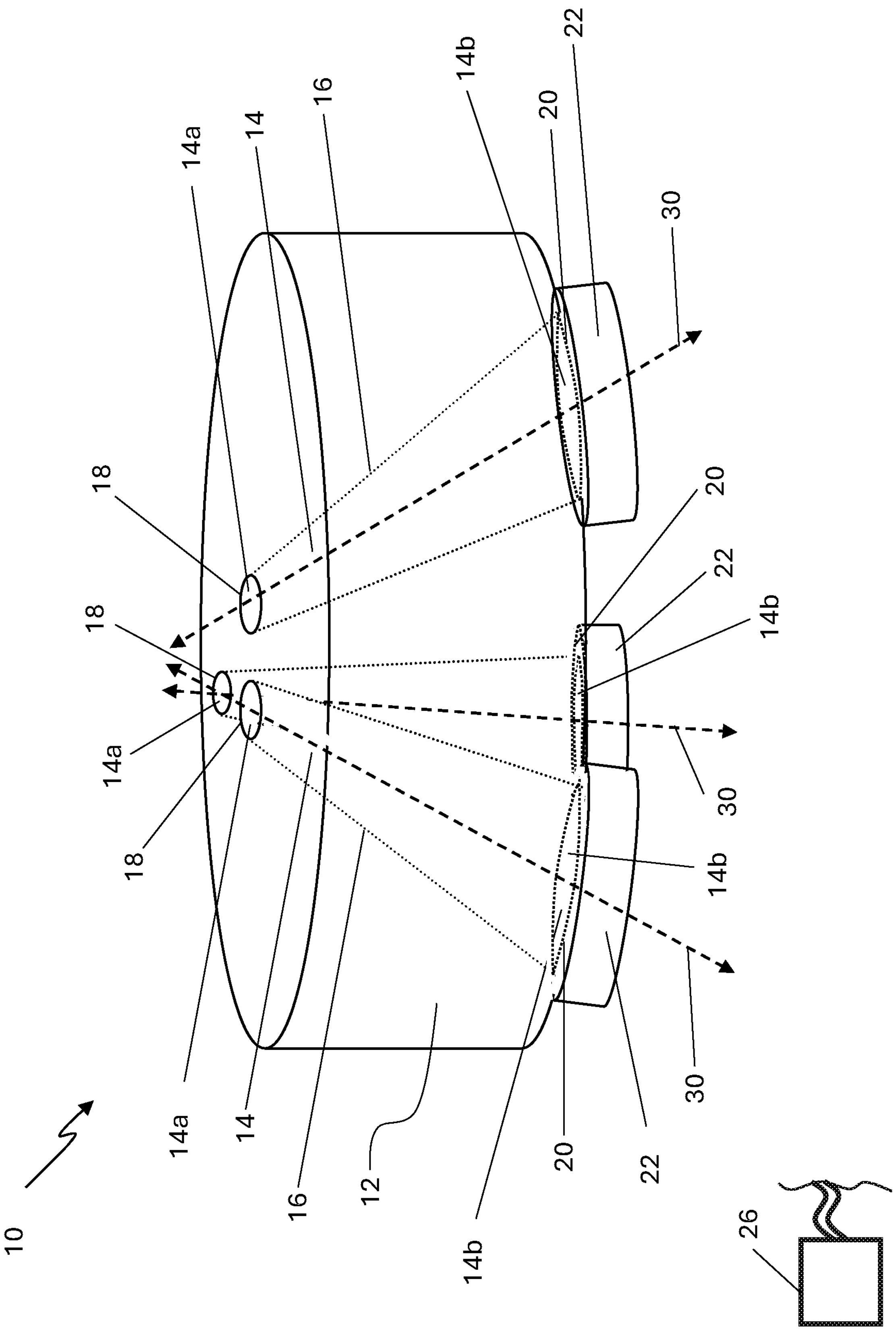
FIG. 5A is a front perspective view illustration of an acoustic sensing apparatus, in accordance with embodiments of the present disclosure.
Figure 5B:
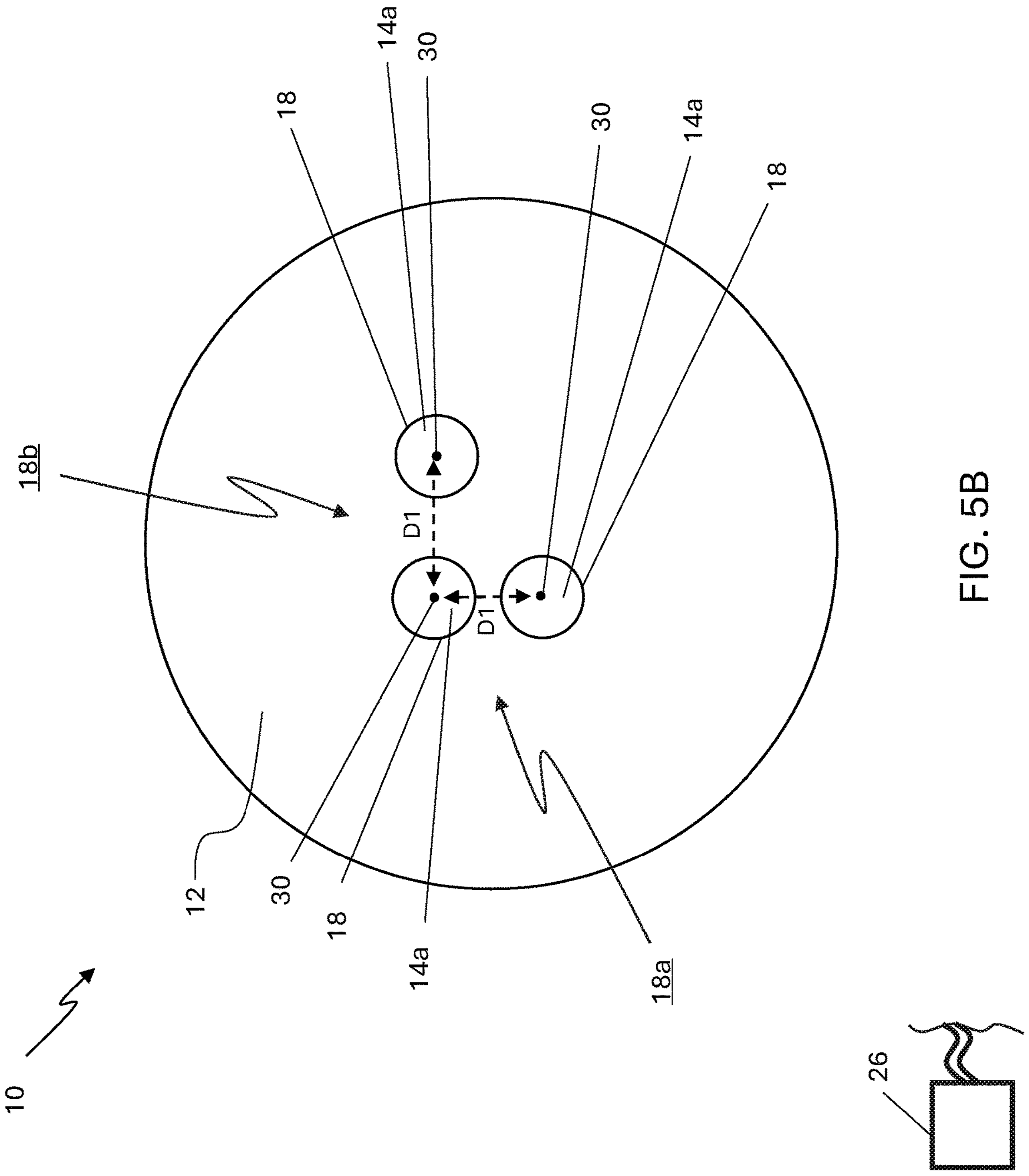
FIG. 5B is a top view illustration of the acoustic sensing apparatus of FIG. 5A, in accordance with embodiments of the present disclosure.
Figure 5C:
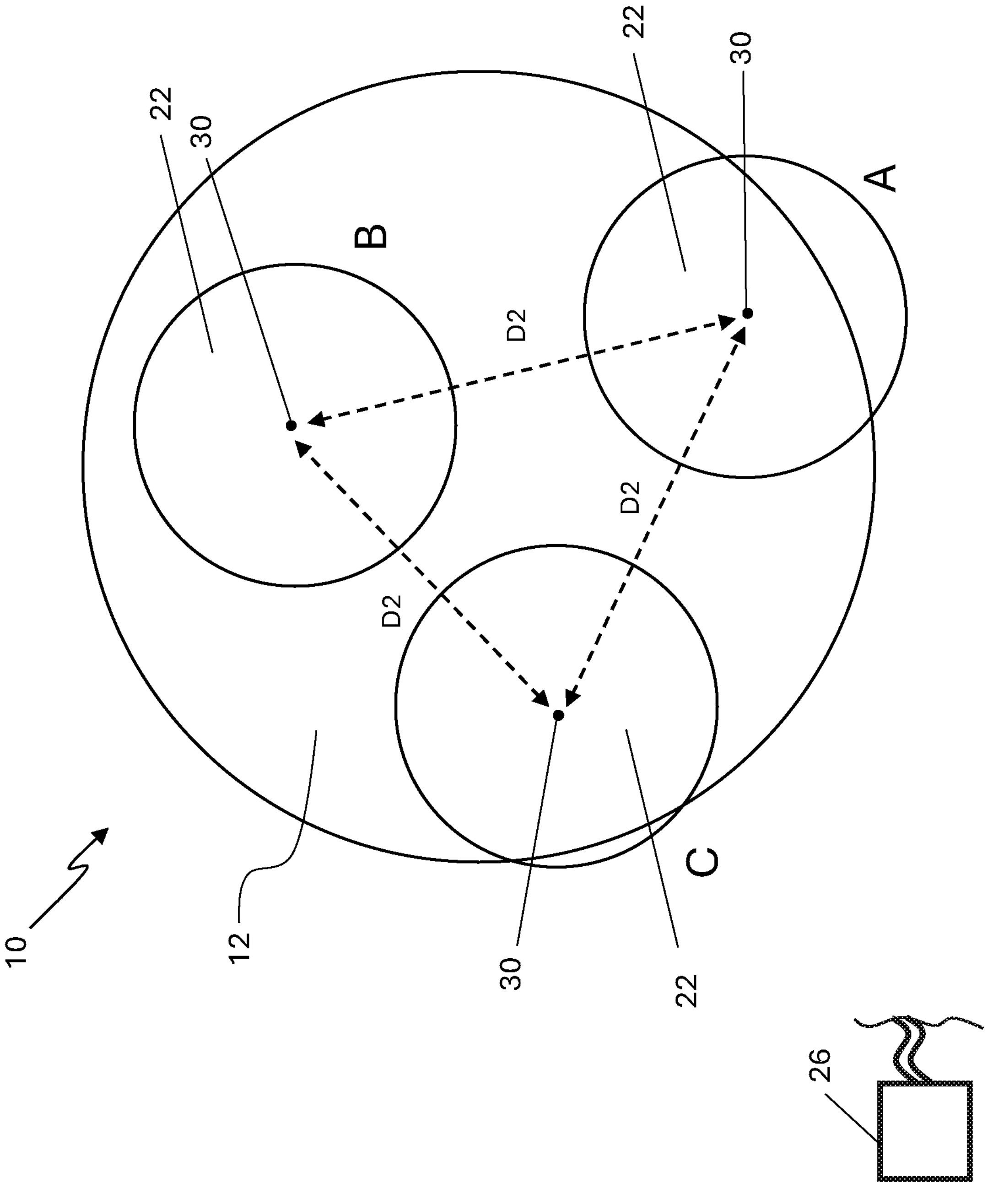
FIG. 5C is a bottom view illustration of the acoustic sensing apparatus of FIG. 5A, in accordance with embodiments of the present disclosure.

FIG. 5A is a front perspective view illustration of an acoustic sensing apparatus 10, in accordance with exemplary embodiments of the present disclosure. FIG. 5B is a top view illustration of the acoustic sensing apparatus 10 of FIG. 5A, in accordance with exemplary embodiments of the present disclosure. FIG. 5C is a bottom view illustration of the acoustic sensing apparatus 10 of FIG. 5A, in accordance with exemplary embodiments of the present disclosure.

FIGS. 5A-5C are referenced for the following examples. Similar to the previous examples, this description focuses on 40 Khz sound. If a different frequency sound is used, the spacing and math must be recalculated using the understanding that is presented.

In this example, the acoustic sensing apparatus 10 can measure objects or beacons that transmit acoustic waves in three-dimensional space. Here the acoustic sensing apparatus 10 waveguide 12 has at least three acoustic paths 14. Each of at least three acoustic paths 14 are formed from the inner space of the waveguide 12, defined by acoustic path sidewalls 16, and each have a center axis 30. Each of at least three acoustic paths 14 have first ends 14*a* positioned at first openings 18 and second ends 14*b* positioned at second openings 20. At least three acoustic receivers 22 or transducers are each configured to connect to second openings 20 of the waveguide 12 of one of at least three acoustic paths 14. With regard to the center axes 30 of at least three acoustic paths 14, the distance D2 between the center axes 30 of at least three acoustic paths 14 is larger at second ends 14*b* of at least three acoustic paths 14 than the distance D1 between the center axes 30 at first ends 14*a* of at least three acoustic paths 14.

In some examples the waveguide 12 and acoustic path sidewalls 16 may be made out of a plastic, a metal, or a composite material. Acoustic paths 14 situated in the inner space of waveguides 12 may have a frustoconical shape, such that each first opening 18 has a diameter smaller than the diameter of second opening 20. In some examples, each first opening 18 may be situated on a same planar surface. FIG. 5B provides a top view illustration of the acoustic sensing apparatus 10 of FIG. 5A, in accordance with another exemplary embodiment of the present disclosure. Each first opening 18 is situated on a top planar surface of the waveguide 12 with distance D1 defining the distance between the center axis 30 of a first group of first openings 18*a* and a second group of first openings 18*b*. The first group of first openings 18*a* May include two first openings 18 spaced together a distance D1 that is greater than zero, but less than one-half of an incoming acoustic wave. Similarly, the second group of first openings 18*b* may include two first openings 18 spaced together a distance D1 that is greater than zero, but less than one-half an incoming acoustic wave. Either one of the first group of first openings 18*a* or second group of first openings 18*b* may be configured to measure either one of an azimuth or an elevation of an object or beacon. FIG. 5C is a bottom view illustration of the acoustic sensing apparatus 10 of FIG. 5A, in accordance with another exemplary embodiment of the present disclosure. With reference to FIGS. 5A-5C, each second opening 20 is covered by acoustic receivers 22 or transducers, however, each second opening 20 in this example is also similarly situated on the same plane of the waveguide 12, where each second opening 20 is found on a bottom plane of waveguides 12. Each second opening 20 has distance D2 defining the distance between the center axis 30 of each second opening 20 of second ends 14*b*. The distance D2 between the center axis 30 of each second opening 20 need not be the same and may vary. In other words, the spacing of the acoustic receivers 22 and the distance D2 between each acoustic receiver 22 does not affect the operation of the acoustic sensing apparatus 10.

For example, an acoustic sensing apparatus 10 with waveguides 12 of cylindrical shape may have a top side and a bottom side. Situated on the top side of the waveguide 12 may be three first openings 18, where each first opening has a diameter of 4.4 mm, and the distance D1 between each center axis 30 of each first opening 18 in the first group of first openings 18*a* May be 5.1 mm, which may correspond to a distance D1 that is less than one-half the wavelength of an incoming acoustic wave. Similarly, the distance D1 between each center axis 30 of each first opening 18 in the second group of first openings 18*b* may be 5.1 mm, which may correspond to a distance D1 that is less than one-half the wavelength of an incoming acoustic wave. That is, if a right-triangle-like shape is drawn between the center axes30 of each first opening 18, the base and height of the triangle would have a length of 5.1 mm. On the bottom side of the waveguide 12, acoustic receivers 22 or transducers may be positioned with the distance D2 of the center axis 30 of second openings 20 being greater than the distance D1 of the center axis of first openings. In this example, acoustic receivers 22 or transducers may have a diameter of 16 mm, and acoustic paths 14 may be positioned such that first openings 18 and second openings 20 are opposing or in-line with one another in a stacked plane. The second openings 20 and thus the acoustic receivers 22 or transducers may be positioned anywhere on the bottom side of the waveguide 12, i.e., the distance D2 of the center axes 30 of each of the first openings need not be equal. Certain unequal distance D2 layouts may be preferred in situations requiring tight or unequal spacing of the second openings 20 and consequently, the acoustic receivers 22 or transducers. However, it is preferred that the length of all acoustic paths 14 are substantially the same. Substantially the same here is understood to mean that length differences are so minimal as to not cause statistically significant error when calculating the distance of objects or beacons from the waveguide 12. Such differences in length may be caused by general manufacturing inconsistencies and errors which do not impact the operation and accuracy of distance measurements. The acoustic paths 14 are preferred to be substantially the same length to facilitate incoming acoustic wave travel through the acoustic paths 14 and to ensure that the incoming acoustic waves travel the same distances irrespective of which acoustic path 14 an incoming acoustic wave travels through. The calculations presented herein assume that the acoustic paths 14 have the same length, such that an incoming acoustic wave travels the same distance irrespective of the acoustic path 14 taken by the incoming acoustic wave.

In some examples, the acoustic receivers 22 may be referred to as receivers, transceivers, sensors, or transducers. It is understood that these refer to the acoustic receivers 22, where the acoustic receivers 22 are configured as transceivers or have a transducer positioned therein.

In some examples, a control circuit 26 microcontroller, processing circuit, or analog to digital converter may be used to evaluate incoming acoustic waves. The control circuit 26 may be a stand-alone circuit separate from the acoustic receivers 22 or may be integrated within the acoustic receivers 22. A further discussion of the functions of the control circuit is discussed below.

A working example of the acoustic sensing apparatus 10 of FIGS. 5A-5C is described herein. The examples, arrangements, and measurements presented are merely for exemplary purposes and are not intended to limit the scope of the disclosure. The sensor initiates a sound burst consisting of waves of sound, typically from either the second transducer B or third transducer C. A short sound burst is sent by the sensor, typically 4 to 13 waves of single frequency ultrasonic sound. When the second transducer B initiates the sound burst, ringdown on the second transducer B may cause that transducer to not be able to detect for some distance, typically about 30 cm and will not allow measurement of azimuth during this time. When the third transducer C initiates the sound burst, ringdown on the third transducer C will cause that transducer to not be able to detect for some distance, typically about 30 cm and will not allow measurement of elevation during this time. Alternating sending the sound burst between the second transducer B and the third transducer C allows measurement, during the ringdown, of elevation and azimuth every other measurement cycle.

The received echo includes the burst waveform, which further includes waves of sound and the ringdown the burst waveform leaves on the receiving transducers. For purposes of this example, a wavelength with a frequency of 40 KHz will be used. It should be noted that in this example, a transducer of any size may be used, and without regard to the center-to-center spacing of the transducers. In receiving the echo, sound waves reflect off objects in the field of view of the transducers and return to the sensors.

Once the echo is received by the sensors, the echoes may be electronically processed. Each transducer may have its own amplifier and associated circuitry. For the first transducer A, second transducer B, and third transducer C, the echo is amplified, and this signal is used for two purposes. The amplified echo is sent to a slope integrator circuit, which may be a dedicated electronic circuit. Alternatively, the function of the slope integrator circuit may also be done by measuring the amplified sine wave with an analog to digital converter and then processed to find the beginning of the signal. Some analog to digital converters might have sufficient accuracy to not require an amplified sine wave. The echo may also be sent to a zero cross detector circuit, which may be a zero cross comparator circuit. Alternatively, the function of the zero cross comparator circuit may be done by looking at the amplified sine wave with an analog to digital converter and then processed for zero crossings. Some analog to digital convertors might have sufficient accuracy to not require an amplified sine wave. The slope integrator is used to determine the time of arrival where the rising integrator is sampled by an analog to digital converter, and the exact point where the integrator starts to rise from zero is determined (i.e. the accurate time of arrival). The second is to yield an accurate phase from the zero crossings. The zero crossings for the incoming wave all occur in the same plane because these correspond to the incoming angle of the incoming echo. That is, because the incoming wave can be modeled as a plane, all the zero crossings are also on that plane.

Time of flight is used to estimate the distance to objects in the field of view of the sensors. This estimation is based on the time elapsed between the occurrence of the transmit burst (the time of transmission) and the time of arrival, and the speed of sound at the temperature of operation. Time of transmission, time of arrival, and the speed of sound at the temperature of operation can be used to determine the distance of an object relative to a sensor with the following equation:

$$\text{Distance} = \frac{(ToT - ToA)}{\left(\frac{SOS_t}{2}\right)}$$

FIGS. 5B-5C illustrate additional aspects of the waveguide 12. With the use of a waveguide 12, the sensors 22 may be any diameter and may have any center-to-center spacing relative to one another. The waveguide 12 may have three first openings 18, where each opening has a diameter that is smaller than that of the corresponding three second openings 20. Additionally, the distance D1 between each center axis 30 at each first opening 18 is smaller than a distance D2 between each center axis 30 at each of the second openings 20. The sensors May be connected, attached, or otherwise positioned at each of the three second openings 20. In some examples, the sensors 22 attached at the second openings 20 may be tilted to accommodate the angled linear path of the acoustic paths 14. In some examples, the path length of the acoustic paths 14 is the same for each acoustic path 14. It should be noted that while the center-to-center spacings of the sensors 22 may not matter, the center-to-center spacings of the distance D1 between each center axis 30 at each first opening 18 may be needed for distance direction calculations. Accordingly, the first openings 18 of the waveguide 12 may have such a diameter, and be positioned such that the center-to-center spacing between the center axis 30 is less than one-half wavelength for the frequency received and lowest temperature of operation chosen for the sensor. This is further described in the following example and with calculations.

In some examples, the acoustic receivers 22 may be referred to as receivers, transceivers, sensors, or transducers. It is understood that these refer to the acoustic receivers 22, where the acoustic receivers 22 are configured as transceivers or have a transducer positioned therein. The examples, arrangements, and measurements presented are merely for exemplary purposes and are not intended to limit the scope of the disclosure.

This example uses a 40 KHz frequency, where the acoustic sensing apparatus is operating in −40° C. The distance directions can be calculated as follows:
First, the speed of sound at the operating temperature must be calculated using the equations and understandings presented herein:

$$SOS_t = 331300\ \text{mm/S} \times \sqrt{1 + \left(\frac{-40°\ \text{C.}}{273.15}\right)}$$

$$SOS_t = 306082.5306\ \text{mm/S}$$

Following this, the time for a 40 KHz frequency to travel one wavelength is calculated.

$$25\ \text{uS} = \frac{1}{40{,}000\ \text{Hz}}$$

This obtained value is then multiplied by the speed of sound calculated at the operating temperature:

$$\text{Wavelength mm} = 306082.5306\ \frac{\text{mm}}{\text{s}} \times 25\ \text{uS}$$

$$\text{Wavelength mm} = 7.652\ \text{mm}$$

The obtained wavelength value is then divided by two to obtain the length of one-half wavelength.

$$\frac{1}{2}\text{Wavelength mm} = \frac{7.652\ \text{mm}}{2}$$

$$\frac{1}{2}\text{Wavelength mm} = 3.826\ \text{mm}$$

From this information the center-to-center spacing can be chosen. For exemplary purposes, 2.5 mm openings with center-to-center spacings of 3.5 mm between the center axes 30 of the first openings 18 is described. The 3.5 mm center-to-center spacing may allow for proper operation down to −40° C. This spacing is repeated for both elevation and azimuth first openings 18 and second openings 20. With this understanding, it is understood that the waveguide 12 directs the sound from the transducers to the first openings 18 and second openings 20 while preserving phase. If different frequency sound is used, the above spacing must be recalculated using the understanding presented herein.

With this waveguide 12 design, less than one half of a 40 Khz wave falls on at least one of the first openings 18 corresponding to the sensors measuring azimuth and elevation. The sound waves that are guided to the sensors with the acoustic paths 14 of the waveguide 12 are evaluated for phase. In one example, a zero crossing circuit such as a comparator is used to evaluate phase information of an incoming sound wave. In another example, the phase may be evaluated using an analog to digital converter, followed by evaluation of the wave. To estimate elevation, the zero crossing for each sound wave received at its respective sensor is compared at each sensor. The same principles are applied for measuring azimuth, where a horizontally adjacent first opening 18 is horizontally adjacent to a center first opening 18. All of the first openings 18 may receive portions of the same one-half sound wave.

Provided is a general summary of the calculations to determine azimuth in accordance with the present example. First the zero crossing times of the same polarity at the first transducer A, the second transducer B, and the third transducer C are recorded. After this information is recorded, the time difference may be calculated, previously termed $\text{ToAP}_{A\text{-}B}$ for azimuth measurements. The previously provided calculations may then be applied to determine the angle of arrival using the speed of sound at the temperature of operation and the center-to-center distance between the first openings 18 corresponding to the first transducer A and second transducer B.

$$\text{Azimuth} = \left(\sin^{-1}\left(\frac{ToAP_{A-B}}{TS_{A-B}}\right) \times \left(\frac{180}{\pi}\right)\right)$$

One can calculate this incoming angle using time units or distance units. Time units May be preferred in a configuration with a microcontroller, as time of arrival is directly measured repeatedly, and the need for repeated conversion from time to distance, during measurement, is eliminated.

Elevation may be calculated using the principles presented above with the zero crossing times of the same polarity between the first transducer A and the second transducer B used:

$$\text{Elevation} = \left(\sin^{-1}\left(\frac{ToAP_{A-C}}{TS_{A-C}}\right) \times \left(\frac{180}{\pi}\right)\right)$$

Provided is Table 1, which shows one method for the microcontroller to conduct or process the calculations presented herein. The method for calculating the degree of arrival presented in Table 1 differs from the calculations provided before and may provide additional advantages. Once the operating temperature is known, all calculations are done in advance and stored in a lookup table, exemplified as Table 1. Because temperature may change slowly and the sensors may take readings rapidly, pre-calculation may allow for faster or more responsive sensor operation. For brevity in disclosure, only one degree of resolution is exemplified, thus, values each corresponding to each degree is shown. In some examples, an angular resolution of greater than one degree may be desired, thus there may be less than 180 values stored. In another example, angular resolution may be finer and include values between degrees. In this case, more than 180 values may be stored. A modulo operator allows for pre-calculation of uS values that are then read by the microcontroller for each degree of interest. The modulo operator is the remainder after a division operation. The microcontroller may read the zero crossing data to look for a zero crossing on the first transducer A, the second transducer B (for azimuth), and the third transducer C (for elevation).

Of note, at zero degrees, the number of uS read by the microcontroller wraps around between the positive and negative directions. That is, the microcontroller measures the time to the next zero crossing. When the angle becomes negative the microcontroller measures the zero crossing of the next sound wave. This operation provides the same results and is optimized to be faster for the microcontroller. Alternatively, the microcontroller may take additional time to sort this to perform the path as presented prior, but in real time, this would use additional time.

The microcontroller reads the first transducer A and then looks for the next zero crossing of the same polarity on the second transducer B for azimuth. At substantially the same time, the microcontroller looks for the next zero crossing on the third transducer C for elevation. At zero degrees, the zero crossings occur at the same time. At plus 1 degree, the adjacent zero crossing is 0.200 uS later, but at minus one degree, the next zero crossing, as measured by the microcontroller, occurs at 24.800 uS (25 uS-0.20 uS). When in the minus degree range, the corresponding zero crossing occurs before the first transducer A's zero crossing, and wraps around. This becomes further apparent with the contents of Table 1.

| | A | B | C | D | E |
|---|---|---|---|---|---|
| 1 | | | | | |
| 2 | | Input Fields | | | |
| 3 | | Temperature (C.) | Frequency | | Outside Center to Center Transducer Spacing (nm) |
| 4 | | −40 | 40000.000 | | 3.500 |
| 5 | | Speed of Sound at this temperature (mm/S) | Wavelength (time) | Wavelength (mm) Required for angle calculations | Transducer Spacing (uS) hypotenuse |
| 6 | | 306082.5306 | 2.50E−05 | 7.65 | 11.435 |
| 7 | | | | | |
| 8 | | Degrees from −90 to +90 | uS | QUOTIENT/25 | outside mod uS |
| 9 | | | Formula for this column | Formula for this column | Formula for this column |
| 10 | | | =E$6 * SIN ($B10 * PI( )/180) | =QUOTIENT (C10, 25) | =MOD (C10, 25) |
| 11 | | −90 | −11.435 | 0 | 13.565 |
| 12 | | −89 | −11.433 | 0 | 13.567 |
| 13 | | −88 | −11.428 | 0 | 13.572 |
| 14 | | −87 | −11.419 | 0 | 13.581 |

TABLE 1

| degrees | uS | QUOTIENT/25 | mod uS |
|---|---|---|---|
| −90 | −11.435 | 0 | 13.565 |
| −89 | −11.433 | 0 | 13.567 |
| −88 | −11.428 | 0 | 13.572 |
| −87 | −11.419 | 0 | 13.581 |
| −86 | −11.407 | 0 | 13.593 |
| −85 | −11.391 | 0 | 13.609 |
| −84 | −11.372 | 0 | 13.628 |
| −83 | −11.350 | 0 | 13.650 |
| −82 | −11.324 | 0 | 13.676 |
| −81 | −11.294 | 0 | 13.706 |
| −80 | −11.261 | 0 | 13.739 |
| −79 | −11.225 | 0 | 13.775 |
| −78 | −11.185 | 0 | 13.815 |
| −77 | −11.142 | 0 | 13.858 |
| −76 | −11.095 | 0 | 13.905 |
| −75 | −11.045 | 0 | 13.955 |
| −74 | −10.992 | 0 | 14.008 |
| −73 | −10.935 | 0 | 14.065 |
| −72 | −10.875 | 0 | 14.125 |
| −71 | −10.812 | 0 | 14.188 |
| −70 | −10.745 | 0 | 14.255 |
| −69 | −10.675 | 0 | 14.325 |
| −68 | −10.602 | 0 | 14.398 |
| −67 | −10.526 | 0 | 14.474 |
| −66 | −10.446 | 0 | 14.554 |
| −65 | −10.363 | 0 | 14.637 |
| −64 | −10.278 | 0 | 14.722 |
| −63 | −10.189 | 0 | 14.811 |
| −62 | −10.096 | 0 | 14.904 |
| −61 | −10.001 | 0 | 14.999 |
| −60 | −9.903 | 0 | 15.097 |
| −59 | −9.802 | 0 | 15.198 |
| −58 | −9.697 | 0 | 15.303 |
| −57 | −9.590 | 0 | 15.410 |
| −56 | −9.480 | 0 | 15.520 |
| −55 | −9.367 | 0 | 15.633 |
| −54 | −9.251 | 0 | 15.749 |
| −53 | −9.132 | 0 | 15.868 |
| −52 | −9.011 | 0 | 16.989 |
| −51 | −8.887 | 0 | 16.113 |
| −50 | −8.760 | 0 | 16.240 |
| −49 | −8.630 | 0 | 16.370 |
| −48 | −8.498 | 0 | 16.502 |
| −47 | −8.363 | 0 | 16.637 |
| −46 | −8.226 | 0 | 16.774 |
| −45 | −8.086 | 0 | 16.914 |
| −44 | −7.943 | 0 | 17.057 |
| −43 | −7.799 | 0 | 17.201 |
| −42 | −7.651 | 0 | 17.349 |
| −41 | −7.502 | 0 | 17.498 |
| −40 | −7.350 | 0 | 17.650 |
| −39 | −7.196 | 0 | 17.804 |
| −38 | −7.040 | 0 | 17.960 |
| −37 | −6.882 | 0 | 18.118 |
| −36 | −6.721 | 0 | 18.279 |
| −35 | −6.559 | 0 | 18.441 |
| −34 | −6.394 | 0 | 18.606 |
| −33 | −6.228 | 0 | 18.772 |
| −32 | −6.060 | 0 | 18.940 |
| −31 | −5.889 | 0 | 19.111 |
| −30 | −5.717 | 0 | 19.283 |
| −29 | −5.544 | 0 | 19.456 |
| −28 | −5.368 | 0 | 19.632 |
| −27 | −5.191 | 0 | 19.809 |
| −26 | −5.013 | 0 | 19.987 |
| −25 | −4.833 | 0 | 20.167 |
| −24 | −4.651 | 0 | 20.349 |
| −23 | −4.468 | 0 | 20.532 |
| −22 | −4.284 | 0 | 20.716 |
| −21 | −4.098 | 0 | 20.902 |
| −20 | −3.911 | 0 | 21.089 |
| −19 | −3.723 | 0 | 21.277 |
| −18 | −3.534 | 0 | 21.466 |
| −17 | −3.343 | 0 | 21.657 |
| −16 | −3.152 | 0 | 21.848 |
| −15 | −2.960 | 0 | 22.040 |
| −14 | −2.766 | 0 | 22.234 |
| −13 | −2.572 | 0 | 22.428 |
| −12 | −2.377 | 0 | 22.623 |
| −11 | −2.182 | 0 | 22.818 |
| −10 | −1.986 | 0 | 23.014 |
| −9 | −1.789 | 0 | 23.211 |
| −8 | −1.591 | 0 | 23.409 |
| −7 | −1.394 | 0 | 23.606 |
| −6 | −1.195 | 0 | 23.805 |
| −5 | −0.997 | 0 | 24.003 |

TABLE 1-continued

| degrees | uS | QUOTIENT/25 | mod uS |
|---|---|---|---|
| −4 | −0.798 | 0 | 24.202 |
| −3 | −0.598 | 0 | 24.402 |
| −2 | −0.399 | 0 | 24.601 |
| −1 | −0.200 | 0 | 24.800 |
| 0 | 0.000 | 0 | 0.000 |
| 1 | 0.200 | 0 | 0.200 |
| 2 | 0.399 | 0 | 0.399 |
| 3 | 0.598 | 0 | 0.598 |
| 4 | 0.798 | 0 | 0.798 |
| 5 | 0.997 | 0 | 0.997 |
| 6 | 1.195 | 0 | 1.195 |
| 7 | 1.394 | 0 | 1.394 |
| 8 | 1.591 | 0 | 1.591 |
| 9 | 1.789 | 0 | 1.789 |
| 10 | 1.986 | 0 | 1.986 |
| 11 | 2.182 | 0 | 2.182 |
| 12 | 2.377 | 0 | 2.377 |
| 13 | 2.572 | 0 | 2.572 |
| 14 | 2.766 | 0 | 2.766 |
| 15 | 2.960 | 0 | 2.960 |
| 16 | 3.152 | 0 | 3.152 |
| 17 | 3.343 | 0 | 3.343 |
| 18 | 3.534 | 0 | 3.534 |
| 19 | 3.723 | 0 | 3.723 |
| 20 | 3.911 | 0 | 3.911 |
| 21 | 4.098 | 0 | 4.098 |
| 22 | 4.284 | 0 | 4.284 |
| 23 | 4.468 | 0 | 4.468 |
| 24 | 4.651 | 0 | 4.651 |
| 25 | 4.833 | 0 | 4.833 |
| 26 | 5.013 | 0 | 5.013 |
| 27 | 5.191 | 0 | 5.191 |
| 28 | 5.368 | 0 | 5.368 |
| 29 | 5.644 | 0 | 5.544 |
| 30 | 5.717 | 0 | 5.717 |
| 31 | 5.889 | 0 | 5.889 |
| 32 | 6.060 | 0 | 6.060 |
| 33 | 6.228 | 0 | 6.228 |
| 34 | 6.394 | 0 | 6.394 |
| 35 | 6.559 | 0 | 6.559 |
| 36 | 6.721 | 0 | 6.721 |
| 37 | 6.882 | 0 | 6.882 |
| 38 | 7.040 | 0 | 7.040 |
| 39 | 7.196 | 0 | 7.196 |
| 40 | 7.350 | 0 | 7.350 |
| 41 | 7.502 | 0 | 7.502 |
| 42 | 7.651 | 0 | 7.651 |
| 43 | 7.799 | 0 | 7.799 |
| 44 | 7.943 | 0 | 7.943 |
| 45 | 8.086 | 0 | 8.086 |
| 46 | 8.226 | 0 | 8.226 |
| 47 | 8.363 | 0 | 8.363 |
| 48 | 8.498 | 0 | 8.498 |
| 49 | 8.630 | 0 | 8.630 |
| 50 | 8.760 | 0 | 8.760 |
| 51 | 8.887 | 0 | 8.887 |
| 52 | 9.011 | 0 | 9.011 |
| 53 | 9.132 | 0 | 9.132 |
| 54 | 9.251 | 0 | 9.251 |
| 55 | 9.367 | 0 | 9.367 |
| 56 | 9.480 | 0 | 9.480 |
| 57 | 9.590 | 0 | 9.590 |
| 58 | 9.697 | 0 | 9.697 |
| 59 | 9.802 | 0 | 9.802 |
| 60 | 9.903 | 0 | 9.903 |
| 61 | 10.001 | 0 | 10.001 |
| 62 | 10.096 | 0 | 10.096 |
| 63 | 10.189 | 0 | 10.189 |
| 64 | 10.278 | 0 | 10.278 |
| 65 | 10.363 | 0 | 10.363 |
| 66 | 10.446 | 0 | 10.446 |
| 67 | 10.526 | 0 | 10.526 |
| 68 | 10.602 | 0 | 10.602 |
| 69 | 10.675 | 0 | 10.675 |
| 70 | 10.745 | 0 | 10.745 |
| 71 | 10.812 | 0 | 10.812 |
| 72 | 10.875 | 0 | 10.875 |
| 73 | 10.935 | 0 | 10.935 |

TABLE 1-continued

| degrees | uS | QUOTIENT/25 | mod uS |
|---|---|---|---|
| 74 | 10.992 | 0 | 10.992 |
| 75 | 11.045 | 0 | 11.045 |
| 76 | 11.095 | 0 | 11.095 |
| 77 | 11.142 | 0 | 11.142 |
| 78 | 11.185 | 0 | 11.185 |
| 79 | 11.225 | 0 | 11.225 |
| 80 | 11.261 | 0 | 11.261 |
| 81 | 11.294 | 0 | 11.294 |
| 82 | 11.324 | 0 | 11.324 |
| 83 | 11.350 | 0 | 11.350 |
| 84 | 11.372 | 0 | 11.372 |
| 85 | 11.391 | 0 | 11.391 |
| 86 | 11.407 | 0 | 11.407 |
| 87 | 11.419 | 0 | 11.419 |
| 88 | 11.428 | 0 | 11.428 |
| 89 | 11.433 | 0 | 11.433 |
| 90 | 11.435 | 0 | 11.435 |

With reference to Table 1, values from −90 to +90 degrees are covered. The initial calculations, as seen in row 6, were discussed prior. It should be noted that the values provided in Table 1 are for an operating temperature of −40° C. with a 40 KHz sound and with a center-to-center spacing between the first openings 18 of 3.5 mm. The formula from degrees to time is the sine formula. The modulo operator transforms the uS calculated by the previously presented formulas to the zero crossings measured by the microcontroller.

This method and design allows for directly estimating every echo wave for azimuth and elevation. In contrast to the first presented design and method, targets or objects can be closer together in distance (less than 30 cm) and still be evaluated for distance, azimuth, and elevation.

Figure 6:
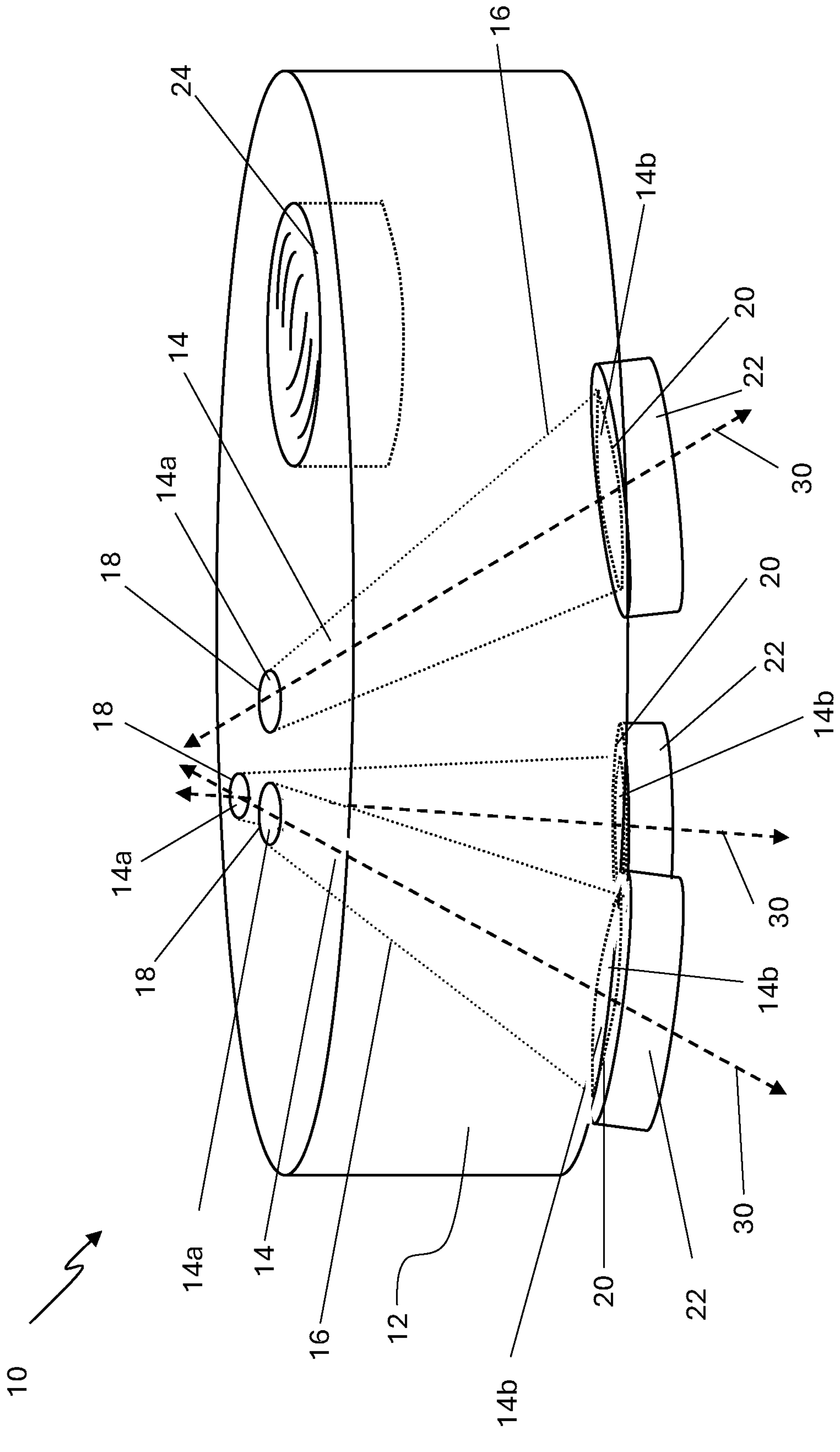
FIG. 6 is a front perspective view illustration of the acoustic sensing apparatus, in accordance with embodiments of the present disclosure.

FIG. 6 is a front perspective view illustration of the acoustic sensing apparatus 10, in accordance with exemplary embodiments of the present disclosure. A transducer or dedicated transmitter 24 would eliminate the transmission ringdown on the acoustic receivers 22 which may be transceivers and allow for close echoes to be used to determine azimuth and elevation during the sending burst transducer ringdown period. In addition, because the acoustic paths 14 or waveguides 12 are not used for transmission of a sound wave from the transmitter 24, much more usable sound energy can be transmitted from the transmitter 24 allowing for better measurements in most cases. In some examples, the transmitter 24, may also be a transducer for receiving sound waves from long range targets. This configuration may provide the most accurate distance measurements for long range targets, because the received signal strength is much higher. Placement of the transmitter 24 is not critical, and could be closer or farther away from the first openings 18 in the waveguide 12. It should be noted that the above description and calculations relative to FIGS. 5A-5C may also be used in an example with a transmitter 24 or with an additional acoustic receiver 22.

Figure 7:
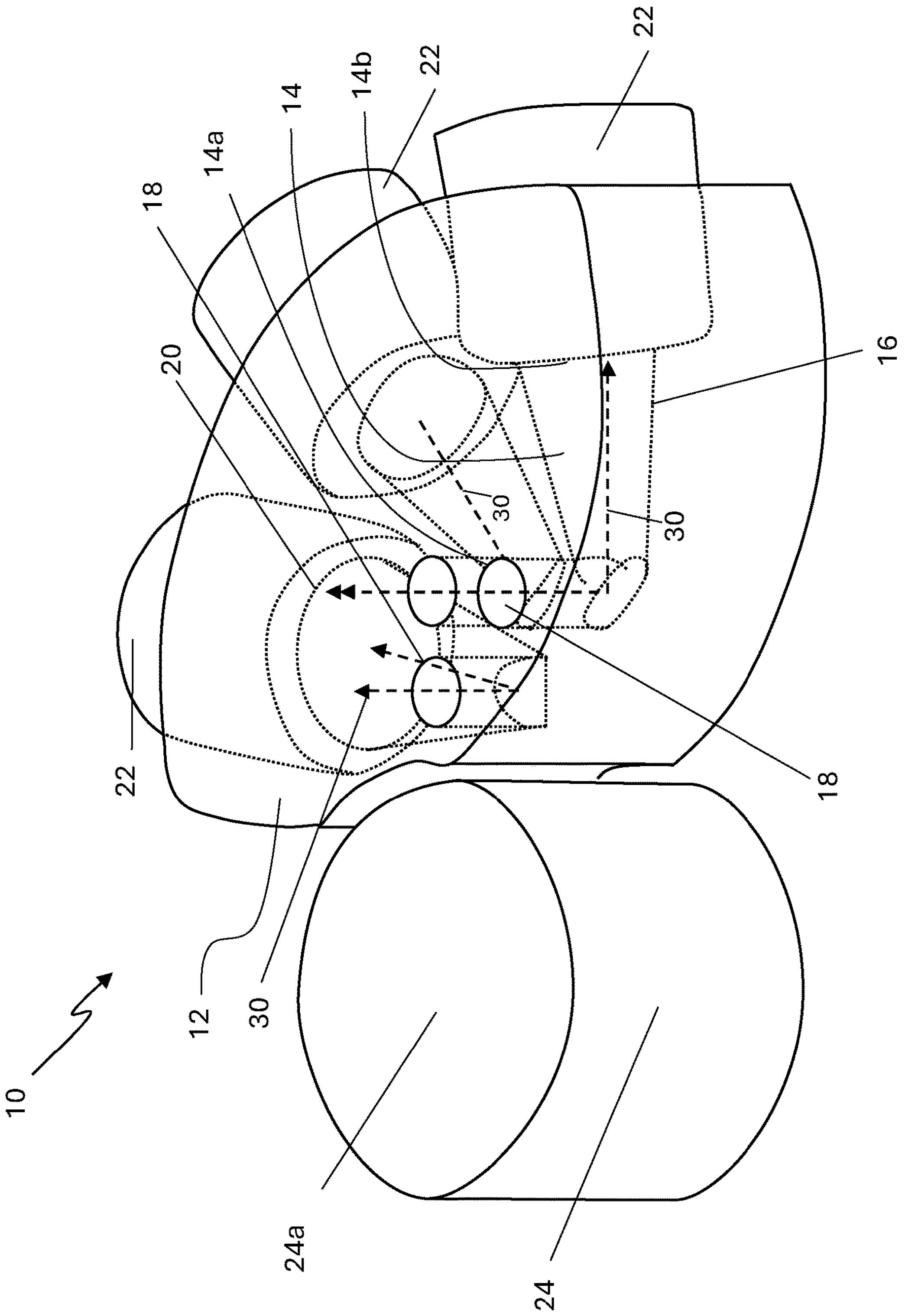
FIG. 7 is a side perspective view illustration of the acoustic sensing apparatus, in accordance with embodiments of the present disclosure.

FIG. 7 is a side perspective view illustration of the acoustic sensing apparatus, in accordance with exemplary embodiments of the present disclosure. In this example, the waveguide 12 is a waveguide 12 which is folded and where acoustic receivers 22 or transducers are situated on a sidewall of the waveguide 12. As a result of this configuration, each first opening 18 and the second opening 20 are located on perpendicular planes, such that the center axis 30 is non-linear. In other words, in this example, acoustic paths 14 are nonlinear, and May have one or more bends, twists, or turns between first ends 14*a* and second ends 14*b*. In some examples, acoustic transmitters 24 may be present. In this example, at least one of at least three acoustic receivers 22 or transducers receives at least one incoming acoustic wave that originates from acoustic transmitters 24.

Several aspects of these exemplary embodiments are also applicable to other examples, including the use of acoustic transmitters 24 and positioning thereof. In some examples acoustic transmitters 24 may be connected to waveguides 12 and have transmitting faces 24*a*. Transmitting faces 24*a* may be a side of acoustic transmitters 24 which are able to transmit acoustic waves. Transmitting faces 24*a* may be substantially aligned with a surface of the waveguide 12 at a location having first openings 18 of each of at least two acoustic paths 14. In another example, acoustic transmitters 24 may be positioned recessed in waveguides 12 relative to a surface of the waveguide 12 at a location having first openings 18 of each of at least two acoustic paths 14. In this example, the inner space of waveguides forms the acoustic guides to direct acoustic waves outwards from the acoustic transmitter 24. The acoustic guide 26 may have a frusto-conical shape similar to that of the acoustic path 14, a bell shape, a horn shape, or any shape which guides acoustic waves from the transmitting face 24*a*, through the acoustic guide 26 and subsequently away from the waveguide 12 to ultimately be reflected off an object, if present.

In a preferred example, each transducer 22 may be an ultrasonic receiver, and acoustic transmitters 24 may be ultrasonic transmitters. Ultrasonic receivers and ultrasonic transmitters may have diameters of 8 mm though 50 mm. Ultrasonic receivers and ultrasonic transmitters May receive and emit, respectively, typically frequencies of 23 KHz, 25 KHz, 32 KHz, 40 KHz, and 50 KHz, fall within a range of 20 KHz to 100 KHz or higher. These ultrasonic receivers and ultrasonic transmitters may be combined into the same unit to form a transceiver, so that the same transceiver may both transmit the ultrasonic wave, and receive a reflected ultrasonic wave emitted by the ultrasonic transmitter, or receive an incoming ultrasonic wave emitted by the object.

The minimum transducer 22 and acoustic transmitter 24 configuration needed to determine distance, elevation, and azimuth of an object is either one of: three acoustic receivers 22 or transducers, three acoustic receivers 22 or transducers and one acoustic transmitter 24, or any combination thereof. When measuring objects in three dimensions, it is preferred that acoustic receivers 22 or transducers be placed in a non-linear arrangement.

In some examples, the acoustic receivers 22 or transducers may alternate between which one transmits and which one receives over a period of time. In configurations having four transceivers arranged in a 2×2 configuration (not illustrated), alternating which acoustic transmitter 24 transmits side to side, and all acoustic transmitters 24 receiving may provide a more robust object detection of objects.

The use of waveguides 12 allows sampling of the incoming waveforms at distances less than one-half wavelength yet allows for the use of acoustic receivers 22 or transducers that can be spaced much further than one-half wavelength. In other words, while acoustic receivers 22 or transducers can be spaced further apart, acoustic waves and ultrasonic waves are received by the first openings 18 which are positioned less than one-half wavelength from each other, thus, each individual wave of an acoustic and/or ultrasonic wave can be evaluated by the acoustic receivers 22 or transducers. The use of waveguides 12 with linear or non-linear acoustic paths 14 allows for routing phase information, and the acoustic and/or ultrasonic wave to the acoustic receivers 22 or transducers.

Figure 8A:
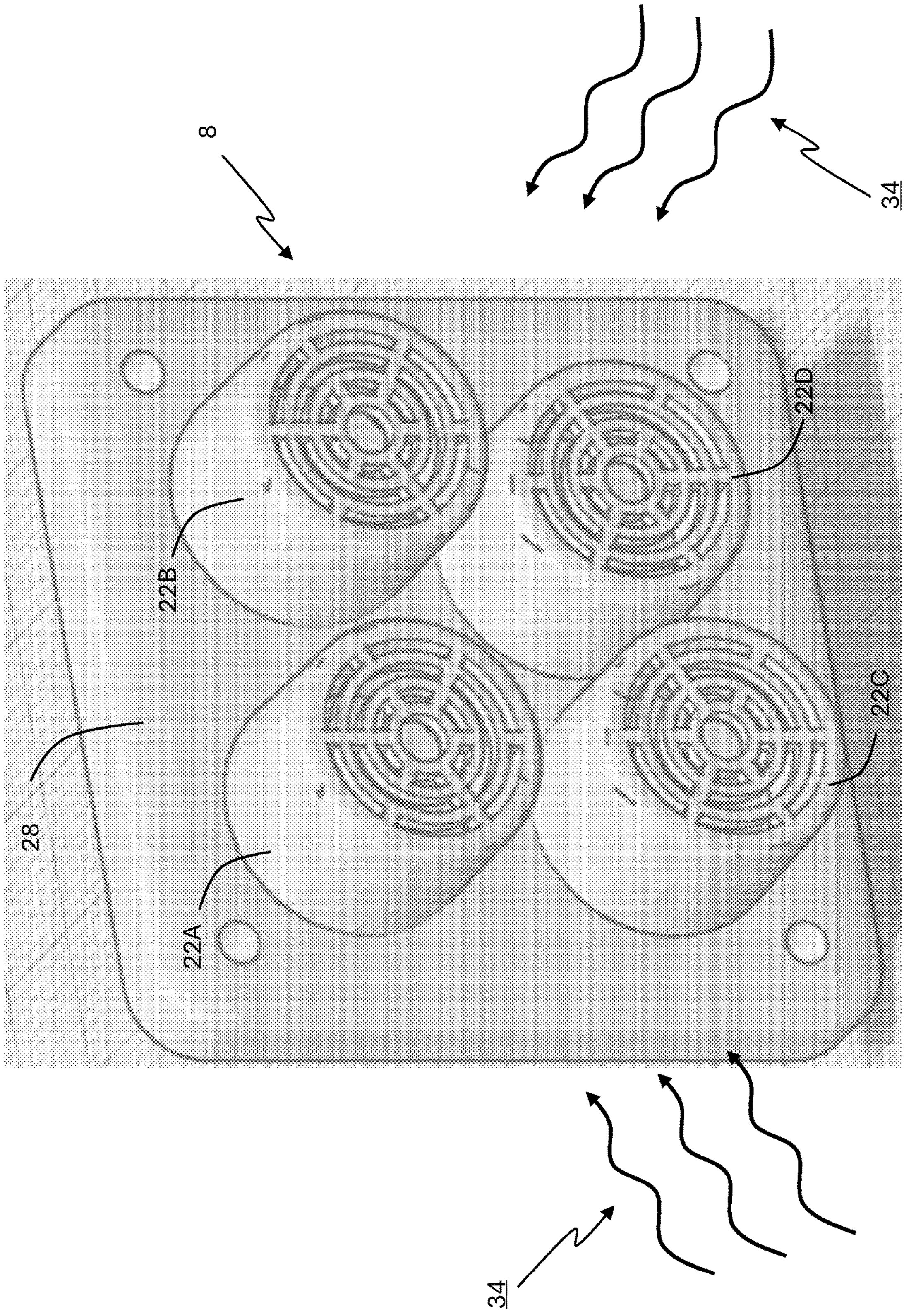
FIG. 8A is a perspective view illustration of the acoustic sensor array in a housing, in accordance with embodiments of the present disclosure.

FIG. 8A is a perspective view illustration of the acoustic sensor array 8 in a housing 28, in accordance with exemplary embodiments of the present disclosure. Four acoustic receivers 22 may be positioned in the housing 28 in this example. Further aspects of this arrangement are described relative to FIG. 8B. It is understood that the incoming acoustic wave 34 may arrive from any angle or direction and the illustrated direction of the incoming acoustic wave 34 is merely for illustrative purposes and is not meant to limit the scope of this disclosure or the function or operability of the acoustic sensor array 8 and components thereof.

Figure 8B:
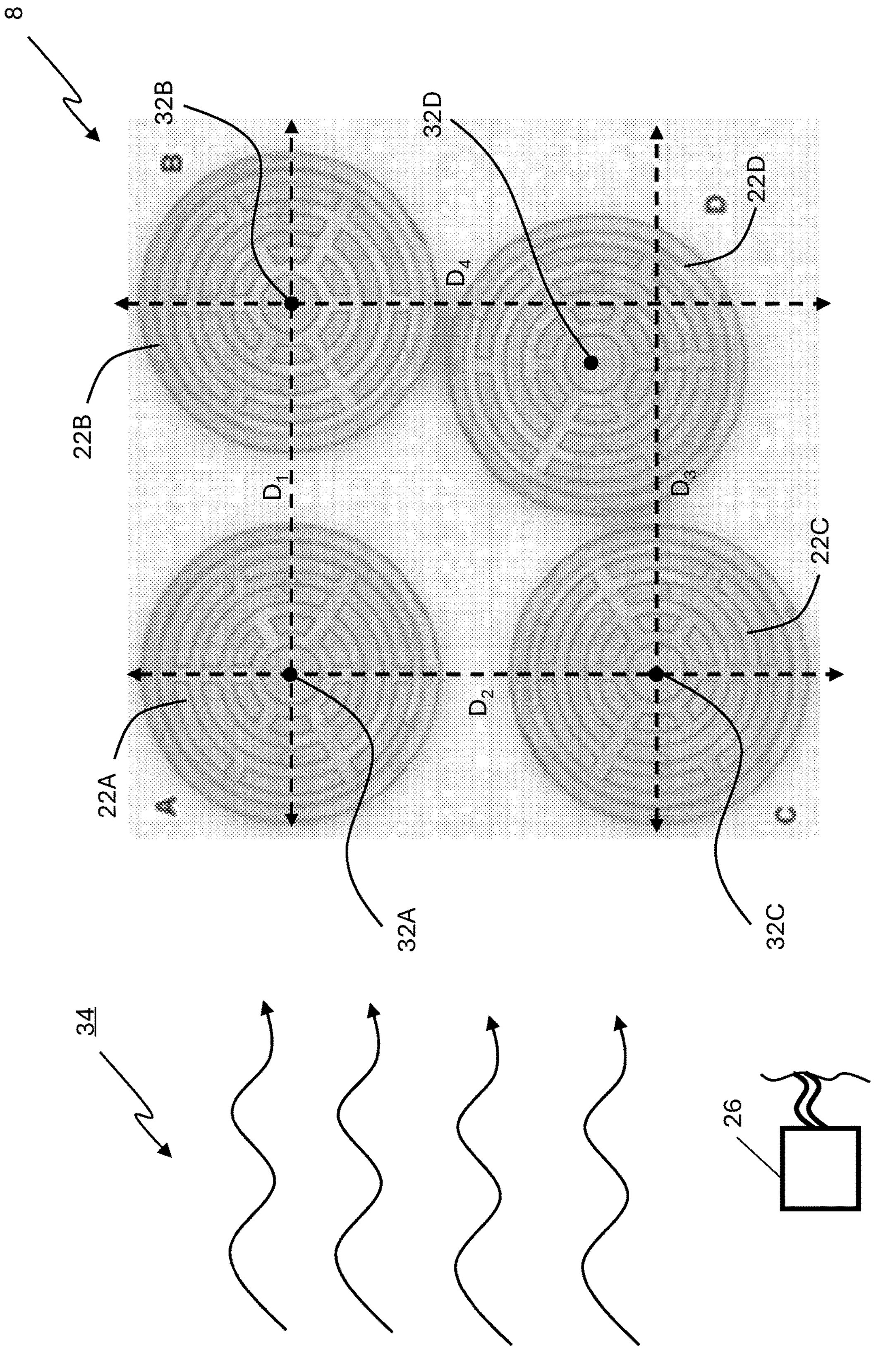
FIG. 8B is a top view illustration of the acoustic sensor array of FIG. 8A, in accordance with embodiments of the present disclosure.

FIG. 8B is a top view illustration of the acoustic sensor array 8 of FIG. 8A, in accordance with exemplary embodiments of the present disclosure. The acoustic sensor array has a first acoustic receiver 22A, wherein the first acoustic receiver has a center point 32A. A second acoustic receiver 22B is positioned adjacent to the first acoustic receiver 22A, and the second acoustic receiver has a center point 32B. The center points 32A, 32B of each of the first acoustic receiver 22A and the second acoustic receiver 22B are positioned along a first axis $D_1$. A third acoustic receiver 22C is positioned adjacent to the first acoustic receiver 22A, wherein the third acoustic receiver 22C has a center point 32C, wherein the center points 32A, 32C of each of the first acoustic receiver 22A and third acoustic receiver 22C are positioned along a second axis $D_2$. The second axis $D_2$ is perpendicular to the first axis $D_1$, and a third axis $D_3$ crosses the center point 32C of the third acoustic receiver 22C and a fourth axis $D_4$ crosses the center point 32B of the second acoustic receiver 22B. The third axis $D_3$ is perpendicular to the fourth axis $D_4$. A fourth acoustic receiver 22D is positioned adjacent to the second acoustic receiver 22B and the third acoustic receiver 22C, and a center point 32D of the fourth acoustic receiver 22D is positioned an offset distance from each of the third axis $D_3$ and the fourth axis $D_4$. An incoming acoustic wave 34 has a wavelength corresponding to the incoming acoustic wave's 34 frequency. The offset distance of the fourth acoustic receiver 22D from the third axis $D_3$ and fourth axis $D_4$ is a distance greater than zero but less than one-half a wavelength of the incoming acoustic wave 34. The acoustic receivers 22A, 22B, 22C, 22D may itself be or otherwise have a transducer or other acoustic wave-emitting component positioned within the acoustic receiver 22A, 22B, 22C, 22D. In some examples, a control circuit 26 microcontroller, processing circuit, or analog to digital converter may be used to evaluate incoming acoustic waves. The control circuit 26 may be a stand-alone circuit separate from the acoustic receivers 22 or may be integrated within the acoustic receivers 22. Further aspects and details of the control circuit 26 are described herein.

The incoming acoustic wave 34 may be measured in parallel between groupings of the acoustic receivers 22A, 22B, 22C, 22D. For example, a first group of acoustic receivers 22A, 22B may include the first acoustic receiver 22A and the second acoustic receiver 22B. A second group of acoustic receivers 22C, 22D may include the third acoustic receiver 22C and the fourth acoustic receiver 22D. An incoming wave 34 falling on the face of each group of acoustic receivers 22A, 22B, 22C, 22D can be measured and compared using the control circuit 26 to provide more accurate distance measurements. For purposes of this example, the first group of acoustic receivers 22A, 22B and the second group of acoustic receivers 22C, 22D can be said to measure azimuth in parallel. A third group of acoustic receivers 22A, 22C may include the first acoustic receiver 22A and the third acoustic receiver 22C. A fourth group of acoustic receivers 22B, 22D may include the second acoustic receiver 22D and the fourth acoustic receiver 22D. An incoming wave 34 falling on the face of each group of acoustic receivers 22A, 22B, 22C, 22D can be measured and compared using the control circuit 26 to provide more accurate distance measurements. For purposes of this example, the third group of acoustic receivers 22A, 22C and the fourth group of acoustic receivers 22B, 22D can be said to measure elevation in parallel. Parallel measurements are understood to mean two measurements taken by two distinct acoustic receiver groups 22A, 22B, 22C, 22D of the incoming acoustic wave 34. A control circuit 26 or other microcontroller may be used to process the data obtained from these parallel measurements and conduct the relevant calculation for the distance direction corresponding to the group (i.e., azimuth measurements and elevation measurements corresponding to their respective groups).

In some examples, the acoustic receivers 22A, 22B, 22C, 22D may be referred to as receivers, transceivers, sensors, or transducers. It is understood that these refer to the acoustic receivers 22A, 22B, 22C, 22D, where the acoustic receivers 22A, 22B, 22C, 22D are configured as transceivers or have a transducer positioned therein. The examples, arrangements, and measurements presented are merely for exemplary purposes and are not intended to limit the scope of the disclosure.

This example focuses on the 40 Khz sound. If a different frequency sound is used, the spacing of the transducers and other calculations must be recalculated using the understanding presented herein. For exemplary purposes, this description will discuss the arrangement of a waveguide using four 16 mm transducers to estimate azimuth and elevation.

Center-to-center spacing from transducer A to transducer B is 21 mm. Center-to-center spacing from transducer A to transducer C is 21 mm. Transducer D is offset or inset by 3.5 mm, which is less than the one-half wavelength of 40 KHz at −40° C., which is 3.83 mm. For both the elevation and azimuth axis, this yields a direct spacing of 17.5 mm to the A-B azimuth axis, and a direct spacing of 17.5 mm to the A-C elevation axis. And a slightly diagonal spacing of 17.85 mm distance from D to B, or from D to C. The following provides a method to calculate the diagonal spacing, where the general equation is:

$$\text{Diagonal spacing} = \sqrt{a^2 + b^2}$$

Where a is the offset or inset amount of a fourth transducer; and b is the direct spacing between the azimuth axis and the elevation axis.

The general equation as applied to the example is as follows:

$$\text{Diagonal spacing} = \sqrt{3.5^2 + 17.5^2}$$

$$\text{Diagonal spacing} = \sqrt{318.5}$$

$$\text{Diagonal spacing} = 17.84657$$

Transducers A and B are directly in the azimuth measurement direction. Transducers C and D are close to parallel to transducers A and B. Transducers A and C are directly in the elevation direction and transducers B and D are close to parallel to transducers A and C.

Provided is a working example of the transducer arrangement of FIGS. 8A-8B. The examples, arrangements, and measurements presented are merely for exemplary purposes and are not intended to limit the scope of the disclosure. The sensor initiates a transmit burst typically from either transducer C or transducer B. A short sound burst is sent by the sensor, typically 4 to waves of single frequency ultrasonic sound. When transducer B initiates the sound burst, ringdown on transducer B will cause that transducer to not be able to detect for some distance, typically about 30 cm and will not allow measurement of azimuth during this time. When transducer C initiates the sound burst, ringdown on transducer C will cause that transducer to not be able to detect for some distance, typically about 30 cm and will not allow measurement of elevation during this time. Alternating sending the sound burst between transducer B and transducer C may allow measurement of elevation and azimuth every other measurement cycle during ringdown.

The received echo includes the burst waveform, which further includes the waves of sound, and the ringdown the burst waveform leaves on the receiving transducer. For exemplary purposes, a 40 KHz sound is used. It should be noted that any wavelength can be used, for example, for longer distances a lower frequency such as 23 KHz or 25 KHz may be used as it is not absorbed by the air as quickly and allows for much longer-range sensors. This example further uses transducers with a diameter of 16 mm. The center-to-center spacing between transducer A and transducer B is 22 mm apart and the center-to-center spacing between transducer A to transducer C is also 22 mm. This spacing allows for one wave to fall on one of the receiving transducers and possibly a different wave to fall on another receiving transducer.

With 16 mm diameter transducers A to B, and A to C, spaced center-to-center 21 mm apart, this allows for one wave to fall on a receiving transducer and possibly a different wave to fall on a nearby transducer. Using the previously presented calculations, the time spacing of a 40 KHz wave is known to be 25 uS. This means that sine waves of 40 KHz occur every 25 uS for the duration of the echo. It is known that the speed of sound in air changes with temperature. Using the previously presented calculations, the speed of sound in air at 20° C. is 343214.6227 mm/S. Using the speed of sound in air at a given operational temperature, the wavelength in mm can be calculated by multiplying the time spacing of a 40 KHz wave (25 uS) with the speed of sound, yielding a value of 8.57 mm. Using the center-to-center spacing of the transducers, a time spacing ($TS_{A-B}$) can be calculated using the following equation:

$$TS_{A-B} = \frac{\text{center to center spacing}}{SOS_t}$$

$$TS_{A-B} = \frac{21\text{ mm}}{343214.6227\text{ mm/S}}$$

$$TS_{A-B} = 61.19\text{ uS}$$

With the center-to-center transducer spacing of 22 mm, up to 2.448 waves may fall on the faces of the transducers. This is calculated by dividing $TS_{A-B}$ with the time spacing of a 40 KHz wave. Because the sound wave can come in from either one side or the other, this allows for the need to evaluate just over four wavelengths.

Center-to-center spacing from transducer C to transducer D and from transducer B to transducer D is 17.85 mm or a time spacing of 52.01 uS, which is calculated using the understanding presented herein. This 17.85 mm spacing allows for 2.08 waves to fall on this transducer. Waves directly from the side can have a wave spacing of 17.5 mm so calculations for signature are preferably done using 17.68 mm, which is the average between 17.5 mm and 17.78 mm. This offset of up to 0.175 mm causes an error of up to 0.51 uS, which is calculated by dividing the offset length in mm with the speed of sound at the operating temperature. This error is not significant enough to cause issues.

Sound waves reflect off objects in the field of view of the transducers and return to the sensor (or originate from another sensor or beacon). Time of flight is used to estimate the distance based on the time elapsed from when the transmit burst occurred together with the speed of sound at the temperature of operation, and the time of arrival. A sensor sensing distance measurements can use this information to calculate the azimuth and elevation using the calculations presented herein. With receivers spaced closely together, and time of arrival typically being determined within a few mm by accurate methods, this yields low accuracy estimates for azimuth and elevation. Even so, these estimates can be useful. For example, distance determined by time of flight, which is the difference between time of transmission and time of arrival, can be used to double check if the direction of arrival phase estimates fall in the correct range.

Each transducer has its own amplifier and associated circuitry. For each transducer, the echo is amplified, and this signal is used for two purposes. These occur at the same time. The amplified echo is sent to a slope integrator circuit. The slope integrator circuit may be an electronic circuit, but this could also be done by measuring the amplified sine wave with an analog to digital converter and then processed to find the beginning of the signal. Some analog to digital convertors might have sufficient accuracy to not require an amplified sine wave, or can be used together with amplification. The amplified echo is also sent to a zero cross detector circuit. This may be an amplified waveform and a zero cross comparator circuit, but this could be done by looking at the amplified sine wave with an analog to digital converter and then processed for zero crossings. Some analog to digital converters might have sufficient accuracy to not require an amplified sine wave. The slope integrator is used to determine the time of arrival, where the rising integrator is sampled by an analog to digital converter, and the exact point where the integrator starts to rise from zero is determined (i.e. the accurate TOA), where the slope of the rise can be used to find the start of the rise, that is, the beginning of the received wave, which allows for accurate estimates for time of arrival.

The zero crossings, corresponding to phase, for the incoming wave all occur in the same plane because these correspond to the incoming angle of the incoming echo. Since all the transducers are on the same plane, this allows for simplified evaluation. That is, because the incoming wave can be modeled as a plane, all the zero crossings are also on that plane. Because this incoming wave, when off axis, has zero crossings repeating every 25 uS for 40 KHz (1/40 Khz), and the time (the product of time of flight and distance) between the transducers is greater than 12.5 uS, the elevation and azimuth are determined using the corresponding phase information. If the receiving transducers are moved out of the same plane, the described calculations and methods would still work, provided that the new arrangement has the associated calculations to account for the new arrangement.

Time is used instead of distance for the calculations because time is measured by the microcontroller, so conversion to distance is not required for all the real time calculations. The conversion from distance to time occurs for finding the distance in time between transducers. Finding the distance in time between transducers occurs only when the temperature changes. This allows the sensor to not require extensive calculations during the receiving portion of the measurement cycle, and just use, without conversion, the time measurements it does. This May allow better real-time operation.

The incoming waves are of a quantity of at least one sent by the transducer and the ringdown which is typically longer than the echo. Thus, a piezoelectric transducer will continue to ring at the resonant frequency of the transducer after a sound burst, stretching the number of usable waves for measurement. Accordingly, when more waves are included in the transmit burst, more waves are available for measurement. For example, 13 waves can be sent, allowing more waves, and the ringdown from the transducer will extend this number of measurable waves considerably.

The waves fall on receivers A, B, C, and D. With waves present on all receivers A, B, C, D the zero crossings are sampled for at least the duration that allows for the signals for at least one full wave of zero crossing from each transducer, relative to another to be captured. For a direction of arrival close to zero degrees, only one wave may fall on all the transducers. As the direction of arrival moves to plus 90 degrees or minus 90 degrees, more and more waves are incident on the face of the transducers. Even so, the waves only need to be sampled such that at least the zero crossings (i.e. phase) of the waves present on the transducers can be measured. This results in all the transducers having the wavefront incident on them. Since for 40 KHz, it takes 25 uS for a full wave to be sampled, and the time for sampling may not be synchronous with the incoming wave, sampling for at least 51 uS allows for up to two waveforms to be pulled in from each receiver and is a more than sufficient duration. Less time may be used, but the zero crossing information may need to be obtained from all transducers used to calculate direction of arrival. Then the zero crossing times for A, B, C, and D are determined. In general, it is preferred that zero crossing times of the same polarity be compared to rising zero crossing times of the same polarity. In other words, rising zero crossing times can be used, or falling zero crossing times can be used but the same may be preferably used for consistency and accuracy. Alternatively, both the rising and falling phases can be used for redundancy, adding robustness to the measurement. Both the rising and falling zero crossing times may be used together by adding or subtracting one half wave to the measurements, which in this example would be 12.5 uS for 40 KHz. This may further increase the speed of measurement; however, this may introduce some error. However, these errors may be negligible.

In continuing the example of FIGS. 8A-8B, it should be noted that the following calculations and discussions are applicable to all subsequent examples shown in FIGS. 8A-16 FIGS. 8A-8B exemplifies a 40 KHz sound wave at an operating temperature of 20° C. with a 21 mm center-to-center spacing between transducer A to transducer B and transducer A to transducer C. 17.68 mm is used as the center-to-center spacing between transducers B to D and transducers C to D.

Because the transducer spacing for both the elevation axis (A to C and B to D) and the azimuth axis (A to B and C to D) are the same, the same calculations and signatures apply to each axis. The azimuth uses the time from A to B, and the time from C to D. The elevation uses the time from A to C and the time from B to D.

For exemplary and non-limiting purposes consider that for azimuth one finds a rising zero crossing on transducer A, then one then looks for the next rising zero crossing on transducer B. This difference is termed $AB_T$. And from the same zero crossing wave set, again for azimuth one finds a rising zero crossing on transducer C, then one looks for the next rising zero crossing on transducer D. This difference is termed $CD_T$. For elevation, this same principle is used to find $AC_T$ and $BD_T$. This provides four time values: for azimuth times, $AB_T$ and $CD_T$ are used. For elevation times $AC_T$ and $BD_T$ are used.

One method to determine direction of arrival is to provide signatures for the direction of arrival for the values measured by the microcontroller is to calculate all the possible angles that one might obtain from the measurement and store these values. Each value pair, that is for azimuth times, $AB_T$ (corresponding to 21 mm) and $CD_T$ (corresponding to 17.68 mm) are used. For elevation times $AC_T$ (corresponding to 21 mm) and $BD_T$ (corresponding to 17.68 mm) are used. Since 21 mm and 17.68 mm are the same distances used for both azimuth and elevation (corresponding to the same time values) one lookup table may be used for both azimuth and elevation direction of arrival determination. If the center-to-center distance values were different for azimuth and elevation, a lookup table for each axis would be calculated. The center-to-center distance values may be different to increase the accuracy of the direction of arrival estimate in one axis or simply for layout reasons. Any method of storing lookup values can be used. One example is suggested here.

If the microcontroller reads the time values with 0.5 uS resolution, then a lookup table, of 50 by 50, where 25 uS wraps around to 0 uS, may be sufficient to cover possible values from 0 uS to 25 uS (25 uS=1/40 HKz) for direction of arrival sets. The microcontroller calculates, and stores the values corresponding to the possible direction of arrival resolution of readings. This table is partially filled. Some of the 2500 possible lookups will be empty. This is because there is enough resolution to provide unambiguous results, thus leaving gaps where no direction of arrival estimates are stored. This table could be reduced in size using other methods, such as hash tables, at the expense of some computational time during operation, but many microcontrollers have the 2500 memory slots needed to store this data as is.

1 The measurement resolution can be changed. If the microcontroller reads the time values with 1 uS resolution, then a lookup table, of 25 by 25, where 25 uS wraps around to 0 uS, may be sufficient to cover possible values from 0 uS to 25 uS (25 uS=1/40 HKz) for direction of arrival sets. The microcontroller calculates, and stores the values corresponding to the possible direction of arrival resolution of readings. This table is partially filled. Some of the 625 possible lookups will be empty. This is because there is enough resolution to provide unambiguous results, thus leaving gaps where no direction of arrival estimates are stored. The measurement resolution can be increased but preferably, should not be increased above that which does not provide unambiguous results. It is also apparent that if one measured with 0.25 uS resolution, that is twice as fine as 0.5 uS, the resolution of the degrees reported would be twice as fine, and would require a lookup table of 10000 memory slots, and some microcontrollers have fast access to a table this size.

The direction of arrival sets that are the most accurate in this example are AB and AC. This is because these are directly in-line with azimuth and elevation, and because these are separated by the greater distance of 21 mm (versus the average of 17.65 mm). The value measured for the AB and AC axes will be considered the most correct. Because 17.65 mm is an estimate (the average of 17.5 mm and 17.85 mm), and the measured phase time could be off because of this, an inaccuracy of up to 0.18 mm or 0.56 uS may be expected. For the time readings for $CD_T$ and $BD_T$ and because of jitter noise from measurement, if the lookup produces an empty cell, up to plus and minus 1 uS (two adjacent cells each corresponding to 0.5 uS above and below) can be considered. In addition, if needed due to an empty cell, the adjacent stored values are also considered for AB and AC. To fill all possible valid values in this lookup, the angular resolution may need to be considered and calculated. When measured with 0.5 uS time resolution, the direction of arrival resolution is better than 0.5 degrees at low angles, and within 1 degree out to plus and minus 60 degrees. From −60 to −80 degrees and +60 to +80 degrees the resolution reduces. From −80 to −90, and +80 to +90 degrees these typically read about the same value. Even so, at all angles, the sensor can estimate the direction of arrival of incoming waves. The temperature typically changes slowly, and one degree change is unlikely to affect the readings enough to change the direction of arrival angles to be noticed with this measurement resolution. As such, sections of the lookup table are recalculated by the microcontroller during wait times that are typical during the operation of the sensor.

Provided are example calculations with one degree of resolution. In order to more comprehensively fill all the possible values that the microcontroller measures, the degree resolution must be increased, to less than one degree for some angles. For brevity in disclosure, one degree resolution is shown. The same calculations shown here are used, but higher resolution builds the table to the resolution that the sensor evaluates with. The following is a series of calculations.

Speed of sound is calculated at the current temperature. For the example of 20° C., the speed of sound has been previously calculated and is known to be 343214.62 mm/S. Time spacing for the transducers with a center-to-center spacing of 21 mm is as follows:

$$61.19\ \text{uS} = \frac{21\ \text{mm}}{343214.62\ \text{mm/S}}$$

Time spacing for the transducers with a center-to-center spacing of 17.685 mm is as follows:

$$51.51\ \text{uS} = \frac{17.685\ \text{mm}}{343214.62\ \text{mm/S}}$$

These are then used for each separation time/distance to calculate the number of uS that the sensor would measure, corresponding to degrees, if the sound did not have repeating waves. The calculation is as follows for each:

$$SuS = 61.19\ \text{uS} \times \sin\left(\frac{(\text{degrees} \times \pi)}{180}\right)$$

-continued and;

$$SuS = 61.19\ \text{uS} \times \sin\left(\frac{(\text{degrees} \times \pi)}{180}\right)$$

Where SuS is time and where the degree values are obtained from Table 2. The modulo operator uses the number of uS for one wave 25 uS=1/40 KHz to map the SuS values to fit into the time of one wave. These modulo values match the values measured by the microcontroller. The microcontroller stores degrees that correspond to the two modulo values. This forms a unique signature of the time values that the microcontroller reads since the microcontroller reads values with 0.5 uS resolution. The lookup Table 2 has the two time readings read by the microcontroller that correspond to the angle. Where the distance spacing of the widest center-to-center transducers is 61.19 uS divided by 25 uS allows up to plus and minus 2.4476 waves, or 4.9 waves that must have unambiguity. This is further shown in Tables 2A and 2B.

| A | B | C | E | F | H |
|---|---|---|---|---|---|
| 1 | | | | | |
| 2 | Input Fields | | | | |
| 3 | Temperature (C.) | Frequency | Outside of Square Center to Center Transducer Spacing (mm) | Wavelength (mm) | Inside Transducer Spacing mm |
| 4 | 20.00 | 40000 | 21.00 | 8.5804 | 17.68 |
| 5 | Speed of Sound at this temperature (mm/S) | Wavelength (uS) | Transducer Spacing (uS) hypotenuse | Length difference between square sides and the diagonal (mm) | Transducer Spacing (uS) hypotenuse |
| 6 | 343214.62 | 2.50E–05 | 61.19 | 3.22 | 51.51 |
| 7 | | | | | |
| 8 | Degrees from −90 to +90 | uS | mod | uS | |
| 9 | | Formula for this column | Formula for this column | Formula for this column | Formula for this column |
| 10 | | =E$6 * SIN ($B10 * PI( )/180) | =MOD (C10, 25) | =I$5 * SIN ($B10*PI( )/180) | =MOD (F10, 25) |
| 11 | −90.00 | −61.19 | 13.81 | −51.51 | 23.49 |
| 12 | −89.00 | −61.18 | 13.82 | −51.51 | 23.49 |
| 13 | −88.00 | −61.15 | 13.85 | −51.48 | 23.52 |
| 14 | −87.00 | −61.10 | 13.90 | −51.44 | 23.56 |
| 15 | −86.00 | −61.04 | 13.96 | −51.39 | 23.61 |
| 16 | −85.00 | −60.95 | 14.05 | −51.32 | 23.68 |
| 17 | −84.00 | −60.85 | 14.15 | −51.23 | 23.77 |
| 18 | −83.00 | −60.73 | 14.27 | −51.13 | 23.87 |
| 19 | −82.00 | −60.59 | 14.41 | −51.01 | 23.99 |
| 20 | −81.00 | −60.43 | 14.57 | −50.88 | 24.12 |
| 21 | −80.00 | −60.26 | 14.74 | −50.73 | 24.27 |
| 22 | −79.00 | −60.06 | 14.94 | −50.57 | 24.43 |

TABLE 2A

| Degrees | 21 mm uS | 17.68 mm uS |
|---|---|---|
| −90.00 | 13.5 | 23.0 |
| −89.00 | 13.5 | 23.0 |
| −88.00 | 13.5 | 23.5 |
| −87.00 | 13.5 | 23.5 |
| −86.00 | 13.5 | 23.5 |
| −85.00 | 14.0 | 23.5 |
| −84.00 | 14.0 | 23.5 |
| −83.00 | 14.0 | 23.5 |
| −82.00 | 14.0 | 23.5 |
| −81.00 | 14.5 | 24.0 |
| −80.00 | 14.5 | 24.0 |
| −79.00 | 14.5 | 24.0 |
| −78.00 | 15.0 | 24.5 |

TABLE 2A-continued

| Degrees | 21 mm uS | 17.68 mm uS |
|---|---|---|
| −77.00 | 15.0 | 24.5 |
| −76.00 | 15.5 | 0.0 |
| −75.00 | 15.5 | 0.0 |
| −74.00 | 16.0 | 0.0 |
| −73.00 | 16.0 | 0.5 |
| −72.00 | 16.5 | 1.0 |
| −71.00 | 17.0 | 1.0 |
| −70.00 | 17.5 | 1.5 |
| −69.00 | 17.5 | 1.5 |
| −68.00 | 18.0 | 2.0 |
| −67.00 | 18.5 | 2.5 |
| −66.00 | 19.0 | 2.5 |
| −65.00 | 19.5 | 3.0 |
| −64.00 | 20.0 | 3.5 |
| −63.00 | 20.0 | 4.0 |
| −62.00 | 20.5 | 4.5 |
| −61.00 | 21.0 | 4.5 |
| −60.00 | 22.0 | 5.0 |

TABLE 2A-continued

| Degrees | 21 mm uS | 17.68 mm uS |
|---|---|---|
| −59.00 | 22.0 | 5.0 |
| −58.00 | 23.0 | 6.0 |
| −57.00 | 23.5 | 6.5 |
| −56.00 | 24.0 | 7.0 |
| −55.00 | 24.5 | 7.5 |
| −54.00 | 0.0 | 8.0 |
| −53.00 | 1.0 | 8.5 |
| −52.00 | 1.5 | 9.0 |
| −51.00 | 2.0 | 9.5 |
| −50.00 | 3.0 | 10.5 |
| −49.00 | 3.5 | 11.0 |
| −48.00 | 4.5 | 11.5 |
| −47.00 | 5.0 | 12.0 |

TABLE 2A-continued

| Degrees | 21 mm uS | 17.68 mm uS |
|---|---|---|
| −46.00 | 5.5 | 12.5 |
| −45.00 | 6.5 | 13.5 |
| −44.00 | 7.0 | 14.0 |
| −43.00 | 8.0 | 14.5 |
| −42.00 | 9.0 | 15.5 |
| −41.00 | 9.5 | 16.0 |
| −40.00 | 10.5 | 16.5 |
| −39.00 | 11.0 | 17.5 |
| −38.00 | 12.0 | 18.0 |
| −37.00 | 13.0 | 18.5 |
| −36.00 | 14.0 | 19.5 |
| −35.00 | 14.5 | 20.0 |
| −34.00 | 15.5 | 21.0 |
| −33.00 | 16.5 | 21.5 |
| −32.00 | 17.5 | 22.5 |
| −31.00 | 18.0 | 23.0 |
| −30.00 | 19.0 | 24.0 |
| −29.00 | 20.0 | 0.0 |
| −28.00 | 21.0 | 0.5 |
| −27.00 | 22.0 | 1.5 |
| −26.00 | 23.0 | 2.0 |
| −25.00 | 24.0 | 3.0 |
| −24.00 | 0.0 | 4.0 |
| −23.00 | 1.0 | 4.5 |
| −22.00 | 2.0 | 5.5 |
| −21.00 | 3.0 | 6.5 |
| −20.00 | 4.0 | 7.0 |
| −19.00 | 5.0 | 8.0 |
| −18.00 | 6.0 | 9.0 |
| −17.00 | 7.0 | 9.5 |
| −16.00 | 8.0 | 10.5 |
| −15.00 | 9.0 | 11.5 |
| −14.00 | 10.0 | 12.5 |
| −13.00 | 11.0 | 13.0 |
| −12.00 | 12.0 | 14.0 |
| −11.00 | 13.0 | 15.0 |
| −10.00 | 14.0 | 16.0 |
| −9.00 | 15.0 | 16.5 |
| −8.00 | 16.0 | 17.5 |
| −7.00 | 17.5 | 18.5 |
| −6.00 | 18.5 | 19.5 |
| −5.00 | 19.5 | 20.5 |
| −4.00 | 20.5 | 21.0 |
| −3.00 | 21.5 | 22.0 |
| −2.00 | 22.5 | 23.0 |
| −1.00 | 23.5 | 24.0 |
| 0.00 | 0.0 | 0.0 |
| 1.00 | 1.0 | 0.0 |
| 2.00 | 2.0 | 1.5 |
| 3.00 | 3.0 | 2.5 |
| 4.00 | 4.0 | 3.5 |
| 5.00 | 5.0 | 4.0 |
| 6.00 | 6.0 | 5.0 |
| 7.00 | 7.0 | 6.0 |
| 8.00 | 8.5 | 7.0 |
| 9.00 | 9.5 | 8.0 |
| 10.00 | 10.5 | 8.5 |
| 11.00 | 11.5 | 9.5 |
| 12.00 | 12.5 | 10.5 |
| 13.00 | 13.5 | 11.5 |
| 14.00 | 14.5 | 12.0 |
| 15.00 | 15.5 | 13.0 |
| 16.00 | 16.5 | 14.0 |
| 17.00 | 17.5 | 15.0 |
| 18.00 | 18.5 | 15.5 |
| 19.00 | 19.5 | 16.5 |
| 20.00 | 20.5 | 17.5 |
| 21.00 | 21.5 | 18.0 |
| 22.00 | 22.5 | 19.0 |
| 23.00 | 23.5 | 20.0 |
| 24.00 | 24.5 | 20.5 |
| 25.00 | 0.5 | 21.5 |
| 26.00 | 1.0 | 22.0 |
| 27.00 | 2.0 | 23.0 |
| 28.00 | 3.5 | 24.0 |
| 29.00 | 4.5 | 24.5 |
| 30.00 | 5.5 | 0.5 |

TABLE 2A-continued

| Degrees | 21 mm uS | 17.68 mm uS |
|---|---|---|
| 31.00 | 6.5 | 1.5 |
| 32.00 | 7.0 | 2.0 |
| 33.00 | 8.0 | 3.0 |
| 34.00 | 9.0 | 3.5 |
| 35.00 | 10.0 | 4.5 |
| 36.00 | 10.5 | 5.0 |
| 37.00 | 11.5 | 6.0 |
| 38.00 | 12.5 | 6.5 |
| 39.00 | 13.5 | 7.0 |
| 40.00 | 14.0 | 8.0 |
| 41.00 | 15.0 | 8.5 |
| 42.00 | 15.5 | 9.0 |
| 43.00 | 16.5 | 10.0 |
| 44.00 | 17.5 | 10.5 |
| 45.00 | 18.0 | 11.0 |
| 46.00 | 19.0 | 12.0 |
| 47.00 | 19.5 | 12.5 |
| 48.00 | 20.0 | 13.0 |
| 49.00 | 21.0 | 13.5 |
| 50.00 | 21.5 | 14.0 |
| 51.00 | 22.5 | 15.0 |
| 52.00 | 23.0 | 15.5 |
| 53.00 | 23.5 | 16.0 |
| 54.00 | 24.5 | 16.5 |
| 55.00 | 0.0 | 17.0 |
| 56.00 | 0.5 | 17.5 |
| 57.00 | 1.0 | 18.0 |
| 58.00 | 1.5 | 18.5 |
| 59.00 | 2.0 | 19.0 |
| 60.00 | 2.5 | 19.5 |
| 61.00 | 3.0 | 20.0 |
| 62.00 | 4.0 | 20.0 |
| 63.00 | 4.0 | 20.0 |
| 64.00 | 4.5 | 21.0 |
| 65.00 | 5.0 | 21.5 |
| 66.00 | 5.5 | 22.0 |
| 67.00 | 6.0 | 22.0 |
| 68.00 | 6.5 | 22.5 |
| 69.00 | 7.0 | 23.0 |
| 70.00 | 7.0 | 23.0 |
| 71.00 | 7.5 | 23.5 |
| 72.00 | 8.0 | 23.5 |
| 73.00 | 8.5 | 24.0 |
| 74.00 | 8.5 | 24.5 |
| 75.00 | 9.0 | 24.5 |
| 76.00 | 9.0 | 24.5 |
| 77.00 | 9.5 | 0.0 |
| 78.00 | 9.5 | 0.0 |
| 79.00 | 10.0 | 0.5 |
| 80.00 | 10.0 | 0.5 |
| 81.00 | 10.0 | 0.5 |
| 82.00 | 10.5 | 1.0 |
| 83.00 | 10.5 | 1.0 |
| 84.00 | 10.5 | 1.0 |
| 85.00 | 10.5 | 1.0 |
| 86.00 | 11.0 | 1.0 |
| 87.00 | 11.0 | 1.0 |
| 88.00 | 11.0 | 1.0 |
| 89.00 | 11.0 | 1.5 |
| 90.00 | 11.0 | 1.5 |

Additionally provided is Table 2B, where the values are sorted by the 17.68 mm column. It is apparent that all values correspond to unique degrees.

TABLE 2B

| Degrees | 21 mm uS | 17.68 mm uS |
|---|---|---|
| 0.00 | 0.0 | 0.0 |
| 1.00 | 1.0 | 0.0 |
| 77.00 | 9.5 | 0.0 |
| 78.00 | 9.5 | 0.0 |
| −76.00 | 15.5 | 0.0 |

TABLE 2B-continued

| Degrees | 21 mm uS | 17.68 mm uS |
|---|---|---|
| −75.00 | 15.5 | 0.0 |
| −74.00 | 16.0 | 0.0 |
| −29.00 | 20.0 | 0.0 |
| 30.00 | 5.5 | 0.5 |
| 79.00 | 10.0 | 0.5 |
| 80.00 | 10.0 | 0.5 |
| 81.00 | 10.0 | 0.5 |
| −73.00 | 16.0 | 0.5 |
| −28.00 | 21.0 | 0.5 |
| 82.00 | 10.5 | 1.0 |
| 83.00 | 10.5 | 1.0 |
| 84.00 | 10.5 | 1.0 |
| 85.00 | 10.5 | 1.0 |
| 86.00 | 11.0 | 1.0 |
| 87.00 | 11.0 | 1.0 |
| 88.00 | 11.0 | 1.0 |
| −72.00 | 16.5 | 1.0 |
| −71.00 | 17.0 | 1.0 |
| 2.00 | 2.0 | 1.5 |
| 31.00 | 6.5 | 1.5 |
| 89.00 | 11.0 | 1.5 |
| 90.00 | 11.0 | 1.5 |
| −70.00 | 17.5 | 1.5 |
| −69.00 | 17.5 | 1.5 |
| −27.00 | 22.0 | 1.5 |
| 32.00 | 7.0 | 2.0 |
| −68.00 | 18.0 | 2.0 |
| −26.00 | 23.0 | 2.0 |
| 3.00 | 3.0 | 2.5 |
| −67.00 | 18.5 | 2.5 |
| −66.00 | 19.0 | 2.5 |
| 33.00 | 8.0 | 3.0 |
| −65.00 | 19.5 | 3.0 |
| −25.00 | 24.0 | 3.0 |
| 4.00 | 4.0 | 3.5 |
| 34.00 | 9.0 | 3.5 |
| −64.00 | 20.0 | 3.5 |
| −24.00 | 0.0 | 4.0 |
| 5.00 | 5.0 | 4.0 |
| −63.00 | 20.0 | 4.0 |
| −23.00 | 1.0 | 4.5 |
| 35.00 | 10.0 | 4.5 |
| −62.00 | 20.5 | 4.5 |
| −61.00 | 21.0 | 4.5 |
| 6.00 | 6.0 | 5.0 |
| 36.00 | 10.5 | 5.0 |
| −60.00 | 22.0 | 5.0 |
| −59.00 | 22.0 | 5.0 |
| −22.00 | 2.0 | 5.5 |
| 7.00 | 7.0 | 6.0 |
| 37.00 | 11.5 | 6.0 |
| −58.00 | 23.0 | 6.0 |
| −21.00 | 3.0 | 6.5 |
| 38.00 | 12.5 | 6.5 |
| −57.00 | 23.5 | 6.5 |
| −20.00 | 4.0 | 7.0 |
| 8.00 | 8.5 | 7.0 |
| 39.00 | 13.5 | 7.0 |
| −56.00 | 24.0 | 7.0 |
| −55.00 | 24.5 | 7.5 |
| −54.00 | 0.0 | 8.0 |
| −19.00 | 5.0 | 8.0 |
| 9.00 | 9.5 | 8.0 |
| 40.00 | 14.0 | 8.0 |
| −53.00 | 1.0 | 8.5 |
| 10.00 | 10.5 | 8.5 |
| 41.00 | 15.0 | 8.5 |
| −52.00 | 1.5 | 9.0 |
| −18.00 | 6.0 | 9.0 |
| 42.00 | 15.5 | 9.0 |
| −51.00 | 2.0 | 9.5 |
| −17.00 | 7.0 | 9.5 |
| 11.00 | 1.5 | 9.5 |
| 43.00 | 16.5 | 10.0 |
| −50.00 | 3.0 | 10.5 |
| −16.00 | 8.0 | 10.5 |
| 12.00 | 12.5 | 10.5 |

TABLE 2B-continued

| Degrees | 21 mm uS | 17.68 mm uS |
|---|---|---|
| 44.00 | 17.5 | 10.5 |
| −49.00 | 3.5 | 11.0 |
| 45.00 | 18.0 | 11.0 |
| −48.00 | 4.5 | 11.5 |
| −15.00 | 9.0 | 11.5 |
| 13.00 | 13.5 | 11.5 |
| −47.00 | 5.0 | 12.0 |
| 14.00 | 14.5 | 12.0 |
| 46.00 | 19.0 | 12.0 |
| −46.00 | 5.5 | 12.5 |
| −14.00 | 10.0 | 12.5 |
| 47.00 | 19.5 | 12.5 |
| −13.00 | 11.0 | 13.0 |
| 15.00 | 15.5 | 13.0 |
| 48.00 | 20.0 | 13.0 |
| −45.00 | 6.5 | 13.5 |
| 49.00 | 21.0 | 13.5 |
| −44.00 | 7.0 | 14.0 |
| −12.00 | 12.0 | 14.0 |
| 16.00 | 16.5 | 14.0 |
| 50.00 | 21.5 | 14.0 |
| −43.00 | 8.0 | 14.5 |
| −11.00 | 13.0 | 15.0 |
| 17.00 | 17.5 | 15.0 |
| 51.00 | 22.5 | 15.0 |
| −42.00 | 9.0 | 15.5 |
| 18.00 | 18.5 | 15.5 |
| 52.00 | 23.0 | 15.5 |
| −41.00 | 9.5 | 16.0 |
| −10.00 | 14.0 | 16.0 |
| 53.00 | 23.5 | 16.0 |
| −40.00 | 10.5 | 16.5 |
| −9.00 | 15.0 | 16.5 |
| 19.00 | 19.5 | 16.5 |
| 54.00 | 24.5 | 16.5 |
| 55.00 | 0.0 | 17.0 |
| 56.00 | 0.5 | 17.5 |
| −39.00 | 11.0 | 17.5 |
| −8.00 | 16.0 | 17.5 |
| 20.00 | 20.5 | 17.5 |
| 57.00 | 1.0 | 18.0 |
| −38.00 | 12.0 | 18.0 |
| 21.00 | 21.5 | 18.0 |
| 58.00 | 1.5 | 18.5 |
| −37.00 | 13.0 | 18.5 |
| −7.00 | 17.5 | 18.5 |
| 59.00 | 2.0 | 19.0 |
| 22.00 | 22.5 | 19.0 |
| 60.00 | 2.5 | 19.5 |
| −36.00 | 14.0 | 19.5 |
| −6.00 | 18.5 | 19.5 |
| 61.00 | 3.0 | 20.0 |
| 62.00 | 4.0 | 20.0 |
| 63.00 | 4.0 | 20.0 |
| −35.00 | 14.5 | 20.0 |
| 23.00 | 23.5 | 20.0 |
| −5.00 | 19.5 | 20.5 |
| 24.00 | 24.5 | 20.5 |
| 64.00 | 4.5 | 21.0 |
| −34.00 | 15.5 | 21.0 |
| −4.00 | 20.5 | 21.0 |
| 25.00 | 0.5 | 21.5 |
| 65.00 | 5.0 | 21.5 |
| −33.00 | 16.5 | 21.5 |
| 26.00 | 1.0 | 22.0 |
| 66.00 | 5.5 | 22.0 |
| 67.00 | 6.0 | 22.0 |
| −3.00 | 21.5 | 22.0 |
| 68.00 | 6.5 | 22.5 |
| −32.00 | 17.5 | 22.5 |
| 27.00 | 2.0 | 23.0 |
| 69.00 | 7.0 | 23.0 |
| 70.00 | 7.0 | 23.0 |
| −90.00 | 13.5 | 23.0 |
| −89.00 | 13.5 | 23.0 |
| −31.00 | 18.0 | 23.0 |
| −2.00 | 22.5 | 23.0 |

TABLE 2B-continued

| Degrees | 21 mm uS | 17.68 mm uS |
|---|---|---|
| 71.00 | 7.5 | 23.5 |
| 72.00 | 8.0 | 23.5 |
| −88.00 | 13.5 | 23.5 |
| −87.00 | 13.5 | 23.5 |
| −86.00 | 13.5 | 23.5 |
| −85.00 | 14.0 | 23.5 |
| −84.00 | 14.0 | 23.5 |
| −83.00 | 14.0 | 23.5 |
| −82.00 | 14.0 | 23.5 |
| 28.00 | 3.5 | 24.0 |
| 73.00 | 8.5 | 24.0 |
| −81.00 | 14.5 | 24.0 |
| −80.00 | 14.5 | 24.0 |
| −79.00 | 14.5 | 24.0 |
| −30.00 | 19.0 | 24.0 |
| −1.00 | 23.5 | 24.0 |
| 29.00 | 4.5 | 24.5 |
| 74.00 | 8.5 | 24.5 |
| 75.00 | 9.0 | 24.5 |
| 76.00 | 9.0 | 24.5 |
| −78.00 | 15.0 | 24.5 |
| −77.00 | 15.0 | 24.5 |

In furtherance of the example, provided is a portion of Table 2B, which looks at data from the central rows from Table 2B sorted by 17.68 mm data to form Table 3.

TABLE 3

| Degrees | 21 mm uS | 17.68 mm uS |
|---|---|---|
| −44 | 2 | 9.5 |
| −43 | 3 | 10 |
| −15 | 7 | 9.5 |
| 9 | 10.5 | 9 |
| 10 | 11.5 | 10 |
| 36 | 15 | 9 |
| 37 | 16 | 9.5 |

The data in Table 3 is centered around 9.5 uS, plus or minutes 0.5 uS, covering the range from 9 uS to 10 uS and then sorted by the 21 mm column. It should be noted that the data need not be sorted for operation and is merely done so for exemplary purposes and clarity in disclosure. The order that the sensor uses this signature data is exemplified as follows. In this example, the sensor measures 9.5 uS for the 17.68 mm pair spacing. Taking 17.68 mm readings from 9 uS to 10 uS (both sides of 9.5 uS+/−0.5 uS), the sensor may look for a value measured for 21 mm spacing. If the 21 mm measured data is 2 uS, the angle is −44 degrees. If the 21 mm measured data is 3 uS, the angle is −43 degrees. It should be noted that the next angles in the table are considerably different, as are the 21 mm uS values. If the 21 mm measured data is 7 uS, the angle is −15 degrees. If the 21 mm measured data is 10.5 uS the angle is 9 degrees. If the 21 mm measured data is 11.5 uS the angle is 10 degrees. If the 21 mm measured data is 15 uS, the angle is 36 degrees. If the 21 mm measured data is 16 uS the angle is 37 degrees. Since this table in operation would represent the actual values the sensor reads, the sensor unambiguously provides degree of arrival angles. Starting with the 17.68 mm data and then using the 21 mm data to find angles provides the most accurate direction of arrival results. Note, one degree was used for brevity in disclosure to show this method. For example, 2.5 uS could be read by the microcontroller, corresponding to −43.5 degrees, and would be in the complete table.

If for some reason the 21 mm data does not match, a wider search can be used. With reference to the above example, increasing the range of data from 9-10 uS to 8.5-10.5 uS for the 17.68 mm search may help and would still provide unambiguous degree results. Expanded data range is exemplified below in Table 4.

TABLE 4

| Degrees | 21 mm uS | 17.68 mm uS |
|---|---|---|
| −45 | 1 | 8.5 |
| −44 | 2 | 9.5 |
| −43 | 3 | 10 |
| −16 | 6 | 8.5 |
| −15 | 7 | 9.5 |
| −14 | 8 | 10.5 |
| 9 | 10.5 | 9 |
| 10 | 11.5 | 10 |
| 36 | 15 | 9 |
| 37 | 16 | 9.5 |
| 38 | 17 | 10.5 |

Figure 9:
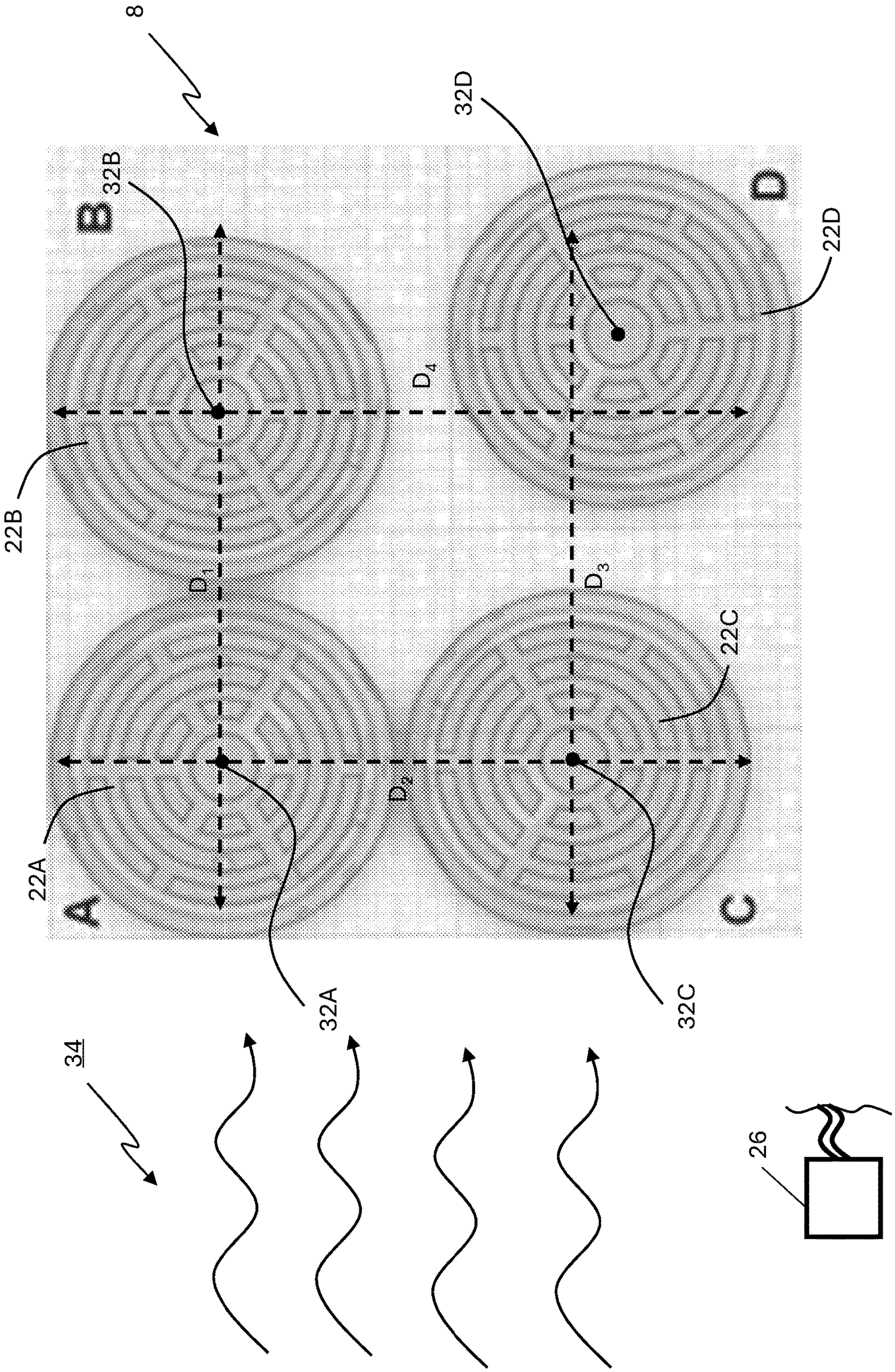
FIG. 9 is a top view illustration of an acoustic sensor array, in accordance with embodiments of the present disclosure.

FIG. 9 is a top view illustration of an acoustic sensor array 8, in accordance with exemplary embodiments of the present disclosure. It should be noted that the arrangement provided in FIG. 9 is functionally equivalent to the arrangement of FIGS. 8A-8B for yielding nonambiguous elevation and azimuth estimates, but because the spacing for the transducers directly in line with azimuth (A and B) and transducers directly in line with elevation (A and C) is less, this provides slightly less accuracy for the azimuth and elevation estimates, so this May not be the most ideal arrangement. FIG. 9 contains many of the same features and structures of FIGS. 8A-8B, which are not restated here for brevity in disclosure.

Figure 10:
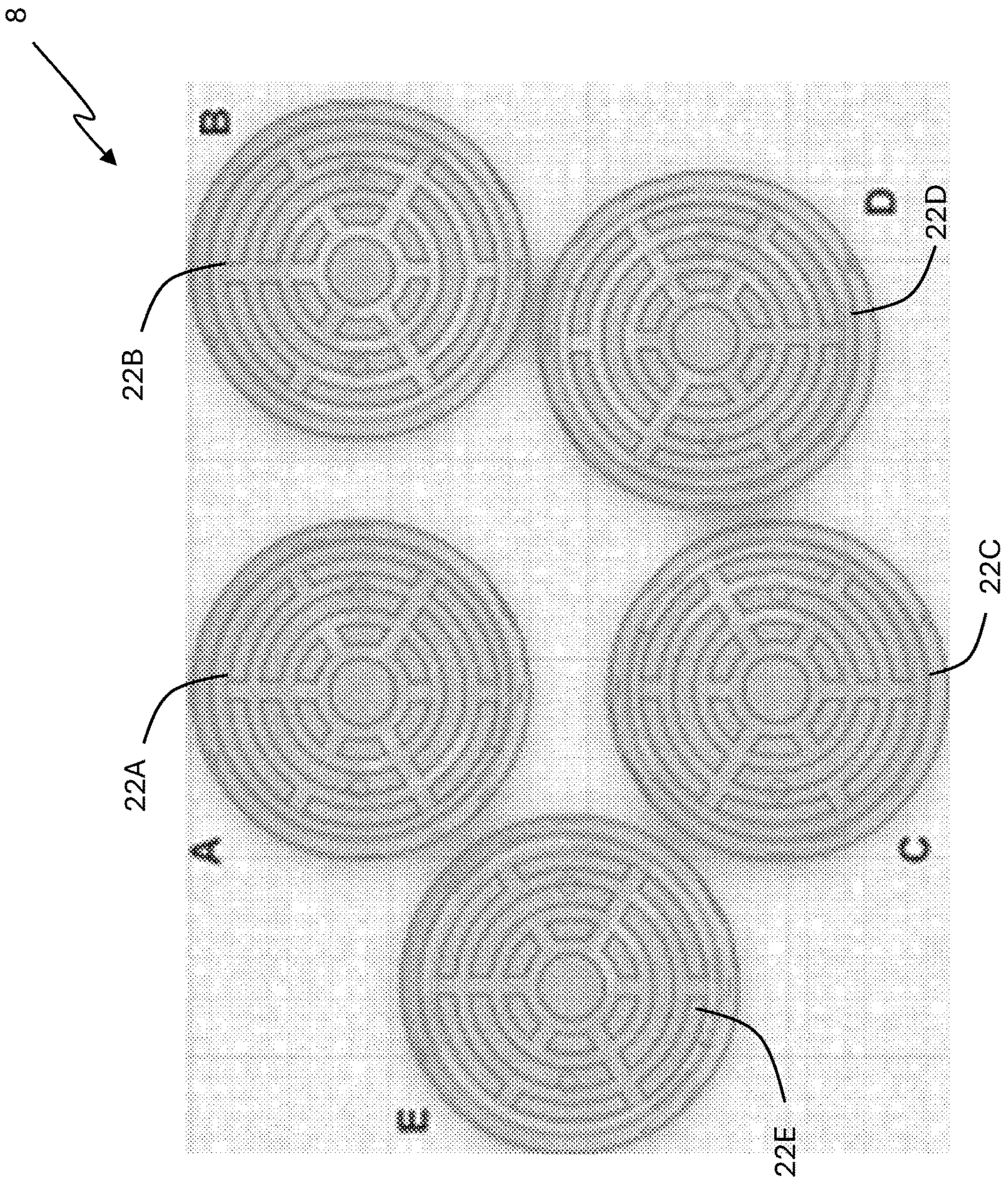
FIG. 10 is a top view illustration of an acoustic sensor array, in accordance with embodiments of the present disclosure.

FIG. 10 is a top view illustration of an acoustic sensor array 8, in accordance with exemplary embodiments of the present disclosure. FIG. 10 illustrates an additional acoustic receiver 22E or transducer for emitting at least one acoustic wave. In some examples, this additional acoustic receiver 22E may have a transducer, and may overall be configured as a dedicated transducer to eliminate ringdown on the other acoustic receivers 22A, 22B, 22C, 22D. A further exemplary description of this configuration is provided herein. The examples, arrangements, and measurements presented are merely for exemplary purposes and are not intended to limit the scope of the disclosure.

A fifth transducer E, as illustrated in FIG. 10 may be added, where the fifth transducer E only transmits. This would eliminate the ringdown on the receiving transducers (A, B, C, D) and allow for close echoes to be used to determine azimuth and elevation during the ringdown period.

The spacings between transducers may be increased to improve angular resolution, but must not be so big as to not allow ambiguous results. As spacing increases, more waves wrap into the measurement providing more angles to sort out, but this can be known and calculated. To prove unambiguous estimates for direction arrival, one must do the math at all temperatures and angles that one desires the sensor to operate at and prove that the chosen arrangement provides unambiguous results.

For 40 Khz, and other ultrasonic frequencies, using calculations and measurement of built sensors for closely spaced transducers with the above arrangement works well for transducers with diameters ranging 9.4 mm to 25 mm. These arrangements may extend to even smaller diameter transducers and to even larger spacings between transducers. Smaller transducers with closer spacing may provide the most unambiguous results.

Figure 11:
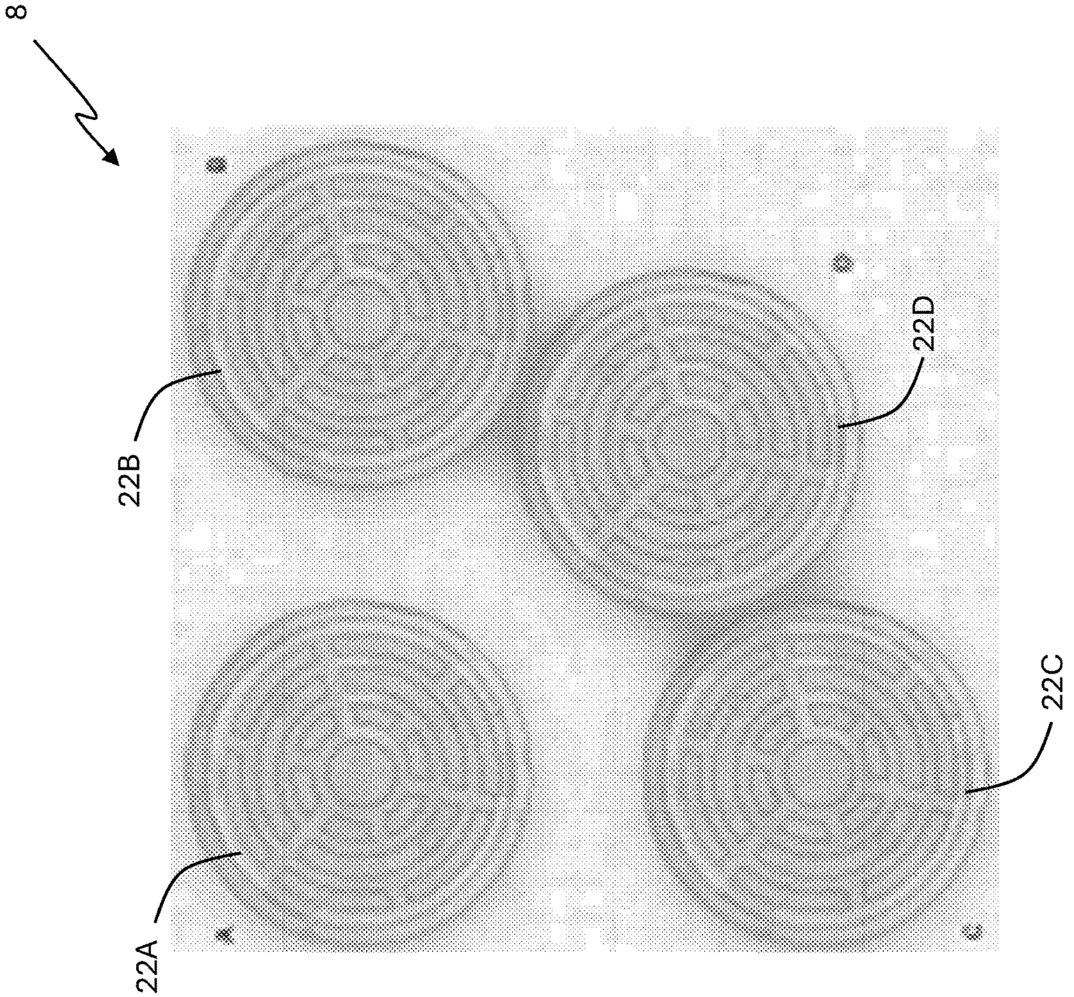
FIG. 11 is a top view illustration of an acoustic sensor array, in accordance with embodiments of the present disclosure.

FIG. 11 is a top view illustration of an acoustic sensor array 8, in accordance with exemplary embodiments of the present disclosure. This is an alternative arrangement of the acoustic receivers 22A, 22B, 22C, 22D of FIGS. 8A-8B. A further exemplary description of this configuration is provided herein. The examples, arrangements, and measurements presented are merely for exemplary purposes and are not intended to limit the scope of the disclosure.

FIG. 11 provides a particular example with particular measurements for exemplary purposes. In particular, illustrated are transducers with a diameter of 9.4 mm emitting a 40 KHz sound. Transducers A and B have a spacing of 12.5 mm, transducers A and C have a spacing of 12.5, transducers B to D have a spacing of 9.66 mm, transducers C to D have a spacing of 9.66 m and transducer D has a 9 mm spacing from the line along the center points of transducers A and C, and transducer D has a 9 mm spacing from the line along the center points of transducers C and D. The line formed from C to D is off axis from the line formed from A to B. However, because of the small diameter of the transducers, closer spacing of a transducers is possible. Thus, the off-axis line between transducer C and D does not affect the ambiguity or accuracy of the direction of arrival angle readings. This is also true for lines formed by transducers B to D and transducers A to C.

Figure 12:
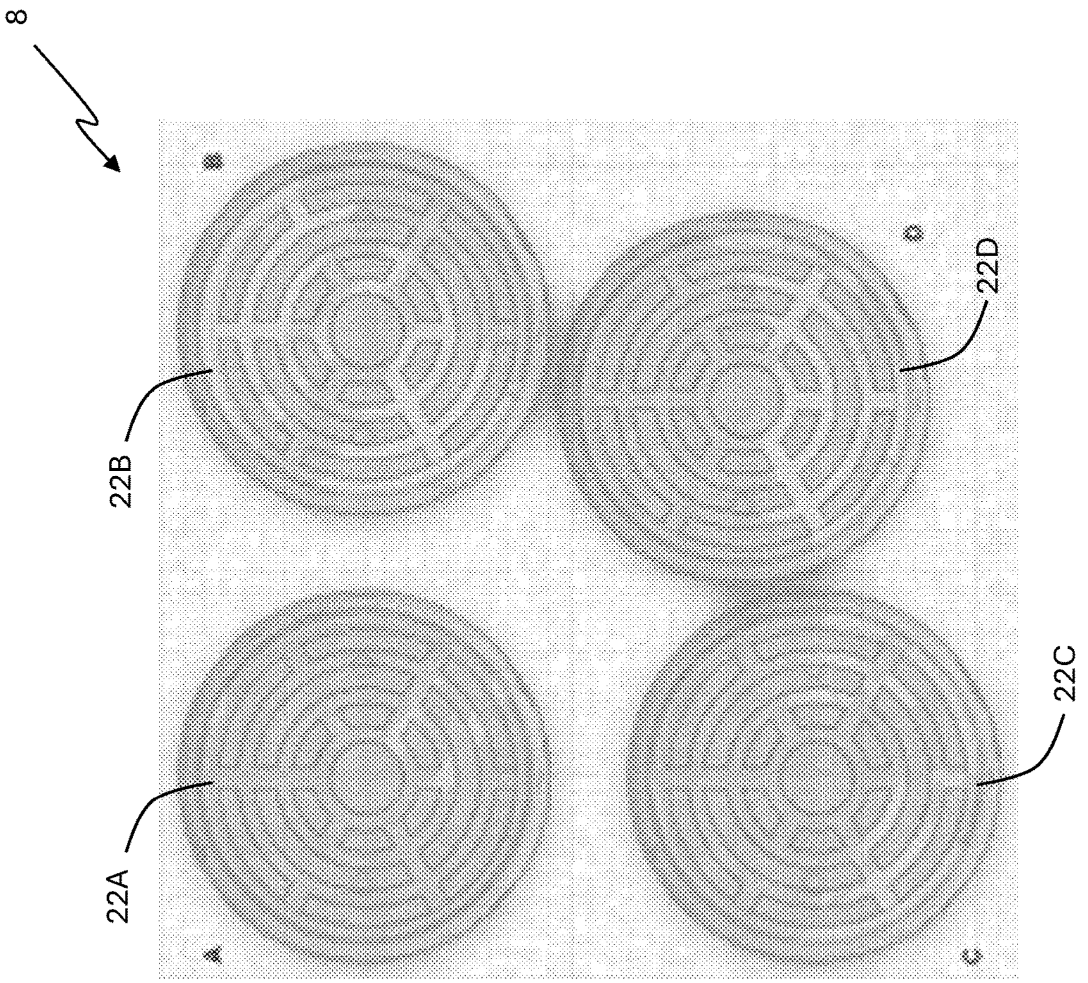
FIG. 12 is a top view illustration of an acoustic sensor array, in accordance with embodiments of the present disclosure.

FIG. 12 is a top view illustration of an acoustic sensor array 8, in accordance with exemplary embodiments of the present disclosure. This is an alternative arrangement of the acoustic receivers 22A, 22B, 22C, 22D of FIGS. 8A-8B and FIG. 11. A further exemplary description of this configuration is provided herein. The examples, arrangements, and measurements presented are merely for exemplary purposes and are not intended to limit the scope of the disclosure.

FIG. 12 is an illustration of another alternative arrangement of acoustic receivers. FIG. 12 provides yet another particular example with particular measurements for exemplary purposes. Illustrated are 18.2 mm diameter 40 KHz transducers, with A to B spacing of 22 mm, A to C spacing of 22 mm, B to D spacing of 18.83 mm, C to D spacing of 18.83 mm, an 18.5 mm spacing of transducer D to the A C line and an 18.5 mm spacing of transducer D to the A B line.

If an arrangement requires more pairs of transducers, for either robustness, measurement redundancy, or to remove ambiguity, an extension may be implemented as described herein. These arrangements of parallel receivers can be extended to almost any arrangement that follows these rules. Adding more pairs of parallel receivers may remove the probability that the signatures for any angle are not ambiguous. For accurate azimuth and elevation estimates, ideally the arrangement of transducers provide an unambiguous signature for the direction of arrival angles. The unambiguous signature for the angles is a function of the phase (that is zero cross measurement) error and the spacing of the transducers, (as this increased spacing allows the need for more possible waves that must be evaluated and provide unambiguous direction of arrival angles). As the spacing becomes larger, more waves of sound can be presented to form the angles. Thus, adding redundant parallel pairs of transducers may add the ability to have a more detailed signature for each incoming angle, so as to remove ambiguity and add robustness to the direction of arrival estimates.

Figure 13:
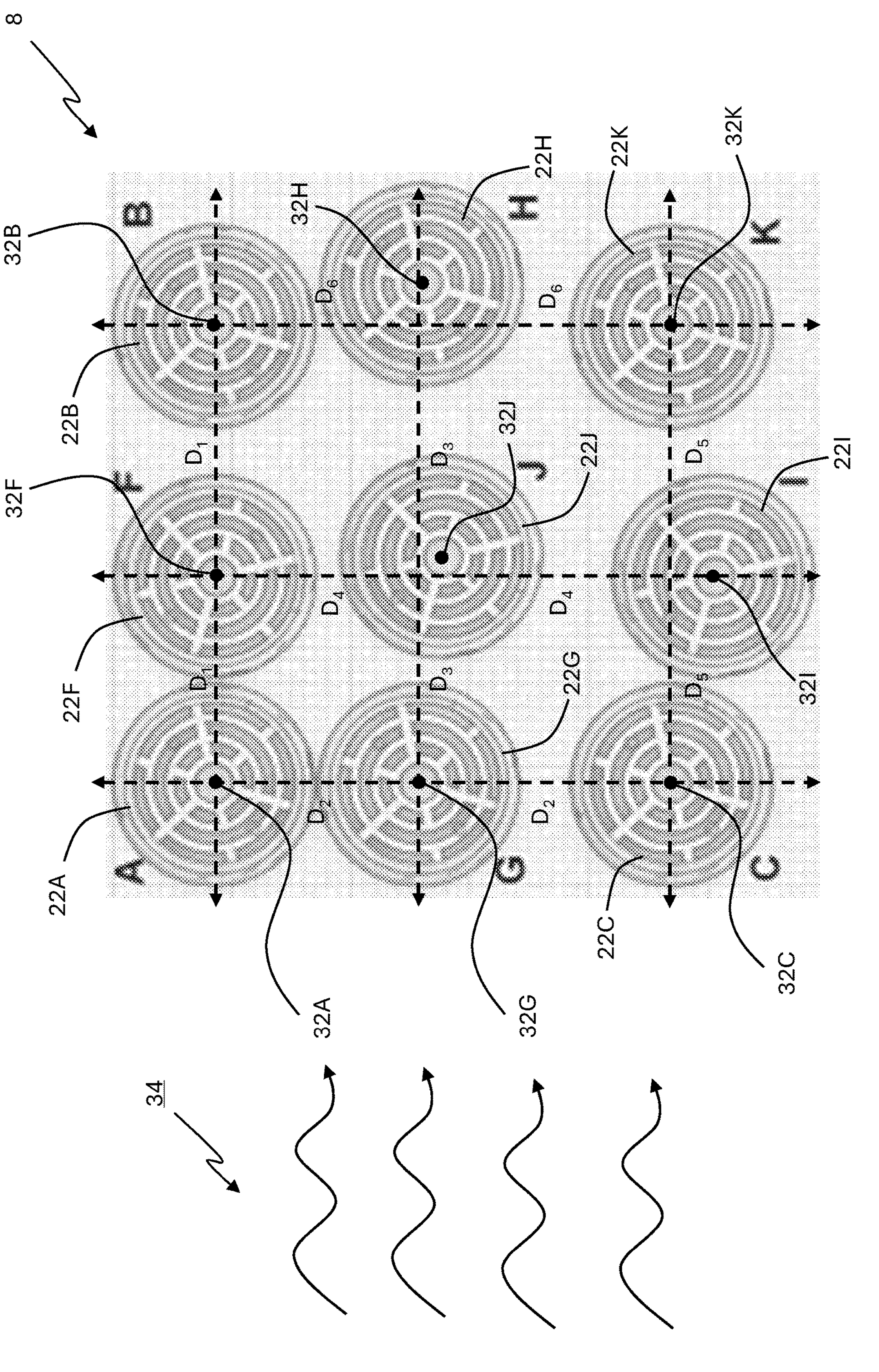
FIG. 13 is a top view illustration of an acoustic sensor array, in accordance with embodiments of the present disclosure.

FIG. 13 is a top view illustration of an acoustic sensor array 8, in accordance with exemplary embodiments of the present disclosure. It is understood that the incoming acoustic wave 34 may arrive from any angle or direction and the illustrated direction of the incoming acoustic wave 34 is merely for illustrative purposes and is not meant to limit the scope of this disclosure or the function or operability of the acoustic sensor array 8 and components thereof.

The acoustic sensor array 8 has a first acoustic receiver 22A, wherein the first acoustic receiver has a center point 32A. A second acoustic receiver 22F is positioned adjacent to the first acoustic receiver 22A, and the second acoustic receiver has a center point 32F. The center points 32A, 32F of each of the first acoustic receiver 22A and the second acoustic receiver 22F are positioned along a first axis $D_1$. A third acoustic receiver 22G is positioned adjacent to the first acoustic receiver 22A, wherein the third acoustic receiver 22G has a center point 32G, wherein the center points 32A, 32G of each of the first acoustic receiver 22A and third acoustic receiver 22G are positioned along a second axis $D_2$. The second axis $D_2$ is perpendicular to the first axis $D_1$, and a third axis $D_3$ crosses the center point 32G of the third acoustic receiver 22G and a fourth axis $D_4$ crosses the center point 32F of the second acoustic receiver 22F. The third axis $D_3$ is perpendicular to the fourth axis $D_4$. A fourth acoustic receiver 22J may be positioned adjacent to the second acoustic receiver 22F and the third acoustic receiver 22G, and a center point 32J of the fourth acoustic receiver 22J may be positioned an offset distance from each of the third axis $D_3$ and the fourth axis $D_4$. An incoming acoustic wave 34 has a wavelength corresponding to the incoming acoustic wave's 34 frequency. The offset distance of the fourth acoustic receiver 22J from the third axis $D_3$ and fourth axis $D_4$ is a distance greater than zero but less than one-half a wavelength of the incoming acoustic wave 34. The acoustic receivers 22A, 22F, 22G, 22J May itself be or otherwise have a transducer or other acoustic wave-emitting component positioned within the acoustic receiver 22A, 22F, 22G, 22J. In some examples, a control circuit 26 microcontroller, processing circuit, or analog to digital converter may be used to evaluate incoming acoustic waves. The control circuit 26 may be a stand-alone circuit separate from the acoustic receivers 22 or may be integrated within the acoustic receivers 22. Further aspects and details of the control circuit 26 have been previously discussed.

In some examples, additional acoustic receivers 22A, 22F, 22G, 22J, 22B, 22C, 22H, 22I, 22K may be used. In one such example, an additional acoustic receiver 22B may be positioned adjacent to the second acoustic receiver 22F, where the additional acoustic receiver 22B has a center point 32B positioned along the first axis $D_1$. Alternatively, an additional acoustic receiver 22C may be positioned adjacent to the third acoustic receiver 22G, where the additional acoustic receiver 22C has a center point 32C positioned along the second axis $D_2$. In another example, a fifth acoustic receiver 22C and a sixth acoustic receiver 22B may both be added to the acoustic sensor array 8. The fifth acoustic receiver 22C may be positioned adjacent to the third acoustic receiver 22G, where the fifth acoustic receiver 22C has a center point 32C positioned along the second axis $D_2$. The sixth acoustic receiver 22B may be positioned adjacent to the second acoustic receiver 22F, where the sixth acoustic receiver 22B has a center point 32B positioned along the first axis $D_1$.

Further acoustic receivers 22A, 22F, 22G, 22J, 22B, 22C, 22H, 22I, 22K may be added which may increase measurement robustness, accuracy, and redundancy. One such example, among others, includes adding a seventh acoustic receiver 22I positioned adjacent to the fifth acoustic receiver 22C, where a center point 32I of the seventh acoustic receiver 22I is positioned offset from a fifth axis $D_5$. The fifth axis $D_5$ is perpendicular to both second axis $D_2$ and fourth axis $D_4$. The center point 32I of the seventh acoustic receiver 32I has an offset distance greater than zero but less than one-half the wavelength of the incoming acoustic wave 34. An eighth acoustic receiver 22H may also be added to the acoustic sensor array 8. The eighth acoustic receiver 22H may be positioned adjacent to the sixth acoustic receiver 22B, where a center point 32H of the eighth acoustic receiver 22H is positioned offset from a sixth axis $D_6$. The sixth axis $D_6$ is perpendicular to both first axis $D_1$ and the third axis $D_3$. The center point 32H of the eighth acoustic receiver 32H has an offset distance greater than zero but less than one-half of the wavelength of the incoming acoustic wave 34. A ninth acoustic receiver 22K may also be added. The ninth acoustic receiver 22K may be a transceiver or transducer that is a dedicated transducer to eliminate ring-down on other acoustic receivers 22A, 22F, 22G, 22J, 22B, 22C, 22H, 22I. The ninth acoustic receiver 22K may alternatively also be configured to send and receive an acoustic signal, thus adding further robustness and redundancy when measuring an incoming acoustic wave 34. The ninth acoustic receiver 22K may be positioned adjacent to the seventh acoustic receiver 22I and the eighth acoustic receiver 22H, where a center point 32K of the ninth acoustic receiver 22K is positioned at a perpendicular angle of the fifth axis $D_5$ and the sixth axis $D_6$. In other examples, the position of the ninth acoustic receiver 22K and the center point 32K of the ninth acoustic receiver 22K can be said to be a mirror image positioning of the first acoustic receiver 22A and the center point 32A of the first acoustic receiver 22A.

The incoming acoustic wave 34 may be measured in parallel or multiple parallel measurements between various groupings of the acoustic receivers 22A, 22F, 22G, 22J, 22B, 22C, 22H, 22I, 22K. The concept and process of parallel measurements with the use of several transducers is consistent with the understanding of parallel measurements relative to FIG. 8A-8B.

In some examples, the acoustic receivers 22A, 22F, 22G, 22J, 22B, 22C, 22H, 22I, 22K may be referred to as receivers, transceivers, sensors, or transducers. It is understood that these refer to the acoustic receivers 22A, 22F, 22G, 22J, 22B, 22C, 22H, 22I, 22K, where the acoustic receivers 22A, 22F, 22G, 22J, 22B, 22C, 22H, 22I, 22K are configured as transceivers or have a transducer positioned therein. The examples, arrangements, and measurements presented are merely for exemplary purposes and are not intended to limit the scope of the disclosure.

FIG. 13 illustrates the previously discussed arrangement of acoustic receivers. This arrangement uses nine transducers, but still functions under the base arrangement described relative to FIGS. 8A-13. The use of additional transducers may provide additional robustness, measurement redundancy, and to remove ambiguity. For exemplary purposes, the transducers can be said to have a 16 mm diameter and emit a 40 KHz sound wave. Following is a description of one possible arrangement of the nine transducers. It should be noted that the exact measurements and spacings are meant for exemplary purposes and are not meant to be limiting. Center-to-center spacing for transducers A to transducer F and transducer A to transducer G is 17.5 mm. Center-to-center spacing for transducers F to transducer B and transducer G to transducer C is 21 mm. Thus, transducers A and B are 38.5 mm apart and transducers A and C are 38.5 mm apart. This arrangement may be functionally equivalent to FIGS. 8A-8B, but is fully parallel so the signatures corresponding to direction of arrival angles are more precise.

Transducers I and H may be added, where transducer I has a center-to-center spacing of 42 mm from transducer F and is positioned parallel to transducers A and C. Transducer His positioned 42 mm from transducer G, and parallel to transducers A and B. This arrangement adds another comparison for direction of arrival estimates for azimuth and elevation further solidifying the signature with the benefit of increased resolution. Transducer J could be added to transmit, thus freeing up the other transducers to only receive, as this allows transducers A, B, C, G, H, and I to be used for direction of arrival estimates for azimuth and elevation, even during transmit burst. Transducer K can be added and additionally transducer J, if placed in a center space between transducers A, B, C. Transducer K may allow for easy time of flight 3D direction of arrival calculations, adding further robustness for direction of arrival.

Figure 14A:
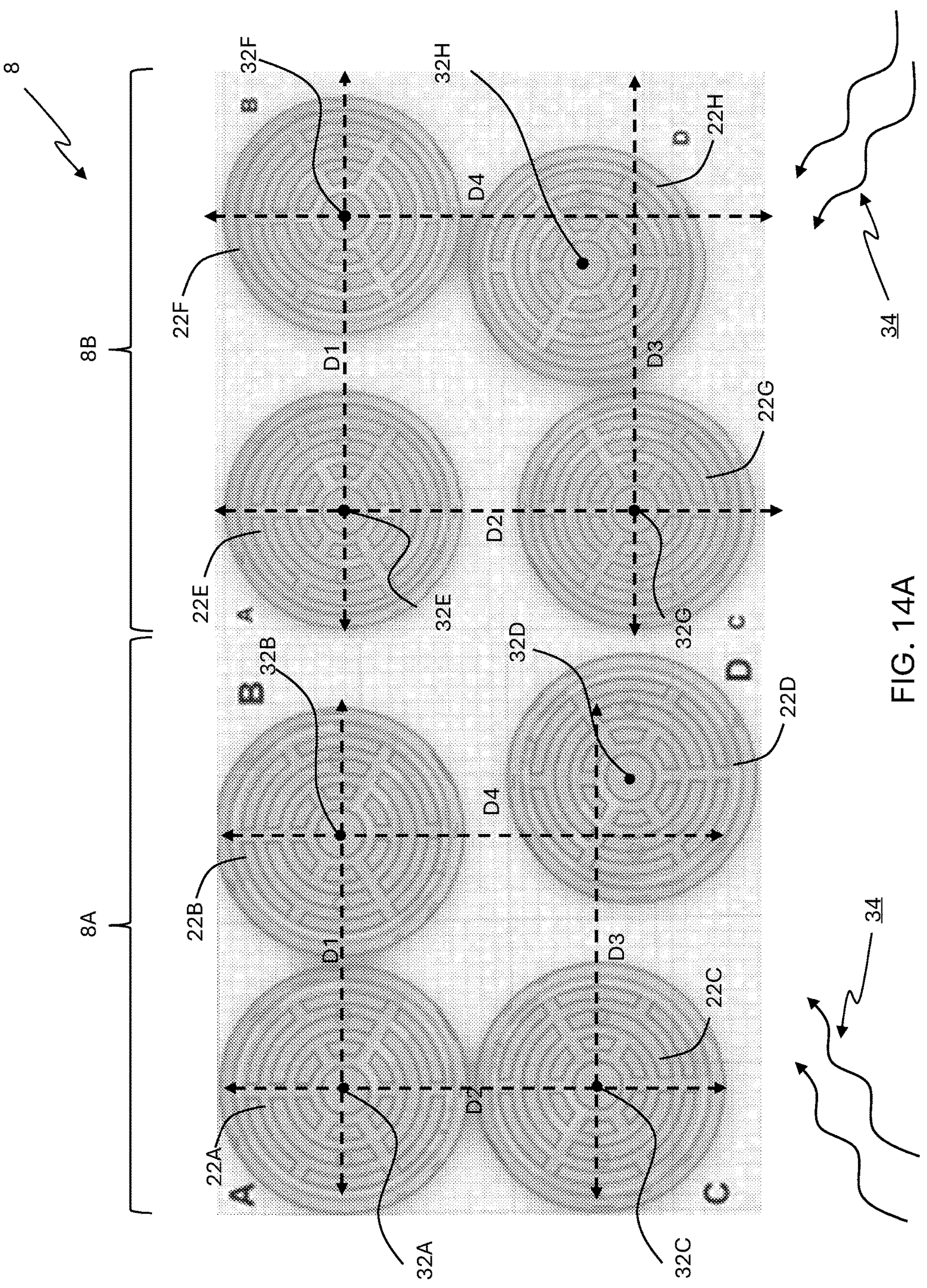
FIG. 14A is a top view illustration of a first and second acoustic sensor array, in accordance with embodiments of the present disclosure.

FIG. 14A is a top view illustration of a first and second acoustic sensor array 8A, 8B, in accordance with exemplary embodiments of the present disclosure. It is understood that the incoming acoustic wave 34 may arrive from any angle or direction and the illustrated direction of the incoming acoustic wave 34 is merely for illustrative purposes and is not meant to limit the scope of this disclosure or the function or operability of the acoustic sensor array 8 and components thereof.

Figure 14B:
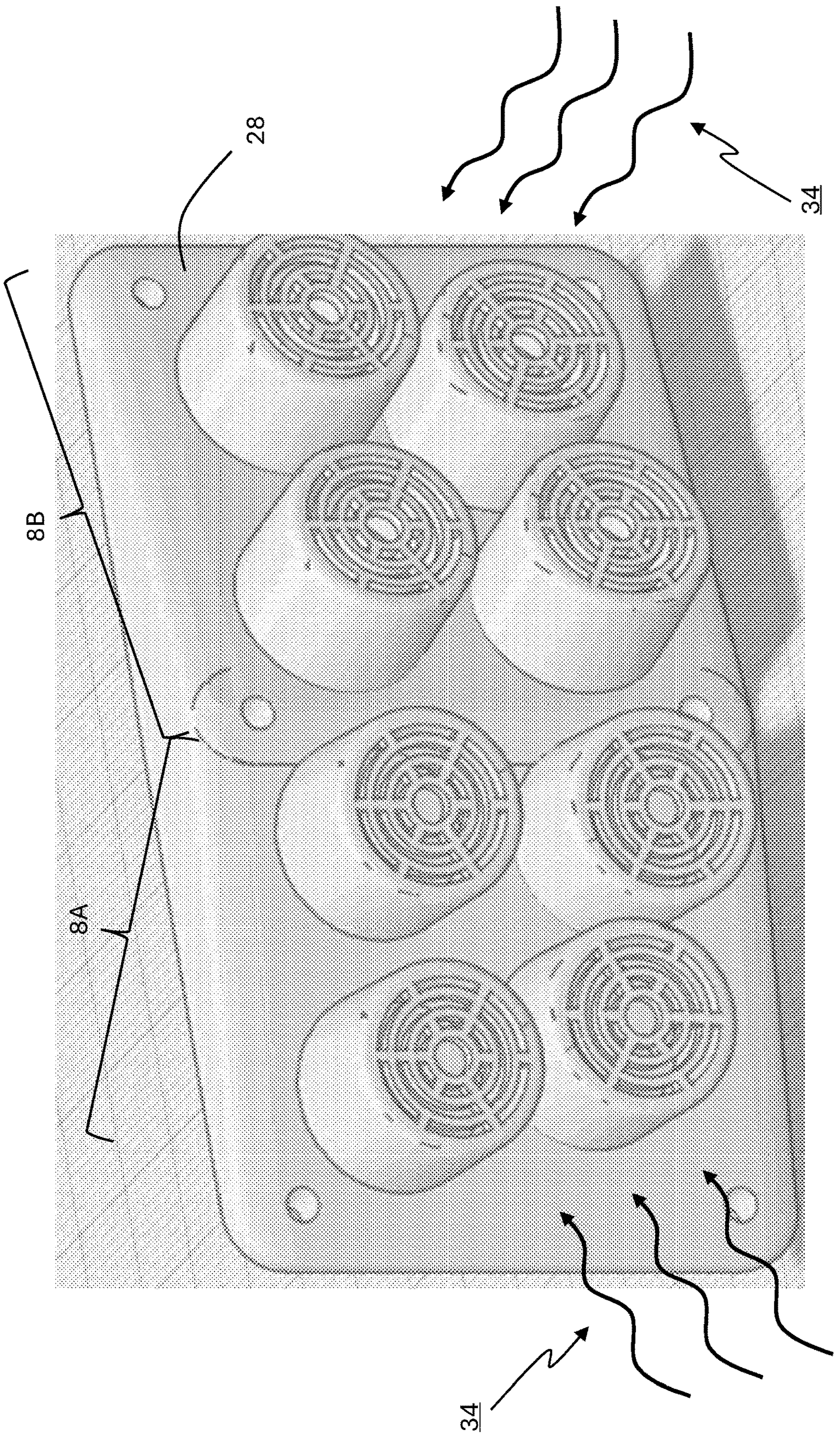
FIG. 14B is a perspective view illustration of the first and second acoustic sensor array of FIG. 14A in a housing, in accordance with embodiments of the present disclosure.

FIG. 14B is a perspective view illustration of the first and second acoustic sensor array 8A, 8B of FIG. 14 in a housing 28, in accordance with exemplary embodiments of the present disclosure. With reference to FIGS. 14A-14B, the arrangement of a first acoustic sensor array 8A and a second acoustic sensor array 8B has a housing 28 having a first sensor array 8A and a second sensor array 8B, where the first sensor array 8A and the second sensor array 8B are positioned adjacent one another, or alternatively described, where the second sensor array 8B is positioned adjacent to the first sensor array 8A.

The first acoustic sensor array 8A has a first acoustic receiver 22A, wherein the first acoustic receiver has a center point 32A. A second acoustic receiver 22B is positioned adjacent to the first acoustic receiver 22A, and the second acoustic receiver has a center point 32B. The center points 32A, 32B of each of the first acoustic receiver 22A and the second acoustic receiver 22B are positioned along a first axis $D_1$. A third acoustic receiver 22C is positioned adjacent to the first acoustic receiver 22A, wherein the third acoustic receiver 22C has a center point 32C, wherein the center points 32A, 32C of each of the first acoustic receiver 22A and third acoustic receiver 22C are positioned along a second axis $D_2$. The second axis $D_2$ is perpendicular to the first axis $D_1$, and a third axis $D_3$ crosses the center point 32C of the third acoustic receiver 22C and a fourth axis $D_4$ crosses the center point 32B of the second acoustic receiver 22B. The third axis $D_3$ is perpendicular to the fourth axis $D_4$. A fourth acoustic receiver 22D is positioned adjacent to the second acoustic receiver 22B and the third acoustic receiver 22C, and a center point 32D of the fourth acoustic receiver 22D is positioned an offset distance from each of the third axis $D_3$ and the fourth axis $D_4$. An incoming acoustic wave 34 has a wavelength corresponding to the incoming acoustic wave's 34 frequency. The offset distance of the fourth acoustic receiver 22D from the third axis $D_3$ and fourth axis $D_4$ is a distance greater than zero but less than one-half a wavelength of the incoming acoustic wave 34. The acoustic receivers 22A, 22B, 22C, 22D may itself be or otherwise have a transducer or other acoustic wave-emitting component positioned within the acoustic receivers 22A, 22B, 22C, 22D.

The second acoustic sensor array 8B has a first acoustic receiver 22E, wherein the first acoustic receiver has a center point 32E. A second acoustic receiver 22F is positioned adjacent to the first acoustic receiver 22E, and the second acoustic receiver has a center point 32F. The center points 32E, 32F of each of the first acoustic receiver 22E and the second acoustic receiver 22F are positioned along a first axis $D_1$. A third acoustic receiver 22G is positioned adjacent to the first acoustic receiver 22E, wherein the third acoustic receiver 22G has a center point 32G, wherein the center points 32E, 32G of each of the first acoustic receiver 22E and third acoustic receiver 22G are positioned along a second axis $D_2$. The second axis $D_2$ is perpendicular to the first axis $D_1$, and a third axis $D_3$ crosses the center point 32G of the third acoustic receiver 22G and a fourth axis $D_4$ crosses the center point 32F of the second acoustic receiver 22F. The third axis $D_3$ is perpendicular to the fourth axis $D_4$. A fourth acoustic receiver 22H is positioned adjacent to the second acoustic receiver 22F and the third acoustic receiver 22G, and a center point 32H of the fourth acoustic receiver 22H is positioned an offset distance from each of the third axis $D_3$ and the fourth axis $D_4$. An incoming acoustic wave 34 has a wavelength corresponding to the incoming acoustic wave's 34 frequency. The offset distance of the fourth acoustic receiver 22H from the third axis $D_3$ and fourth axis $D_4$ is a distance greater than zero but less than one-half a wavelength of the incoming acoustic wave 34. The acoustic receivers 22E, 22F, 22G, 22H may itself be or otherwise have a transducer or other acoustic wave-emitting component positioned within the acoustic receivers 22E, 22F, 22G, 22H.

In some examples, a control circuit 26 microcontroller, processing circuit, or analog to digital converter may be used to evaluate incoming acoustic waves. The control circuit 26 may be a stand-alone circuit separate from the acoustic receivers 22 or may be integrated within the acoustic receivers 22. Further aspects and details of the control circuit 26 are described herein.

In each first sensor array 8A and second sensor array 8B, the incoming acoustic wave 34 may be measured in parallel between groupings of the acoustic receivers 22A, 22B, 22C, 22D in the first sensor array 8A and in groupings of the acoustic receivers 22E, 22F, 22G, 22H in the second sensor array 8B. The concept and process of parallel measurements with the use of several transducers is consistent with the understanding of parallel measurements relative to FIGS. 8A-8B.

It should be noted that it is the center-to-center spacing between the center points 32A, 32B, 32C, 32D, 32E, 32F, 32G, 32H of each acoustic receivers 22A, 22B, 22C, 22D, 22E, 22F, 22G, 22H that is used for the calculations presented hereinabove, and the angle that acoustic receivers 22A, 22B, 22C, 22D, 22E, 22F, 22G, 22H point to may not be needed for the calculations to determine distance directions of an object relative to each acoustic sensor array 8A, 8B. In some examples, the center points 32A, 32B, 32C, 32D, 32E, 32F, 32G, 32H in each first sensor array 8A and second sensor array 8B may be positioned in the same plane. In other words, the center points 32A, 32B, 32C, 32D of the acoustic receivers 22A, 22B, 22C, 22D in the first sensor array 8A may all be positioned along the same plane. Similarly, the center points 32E, 32F, 32G, 32H of the acoustic receivers 22E, 22F, 22G, 22H in the second sensor array 8B may all be positioned along the same plane. The direction angle that the acoustic receivers 22A, 22B, 22C, 22D, 22E, 22F, 22G, 22H points towards is not crucial, provided there is overlap in the pattern or axes $D_1$, $D_2$, $D_3$, $D_4$, along which the acoustic receivers 22A, 22B, 22C, 22D, 22E, 22F, 22G, 22H are positioned over the angles or field of view that is measured. In some examples, the acoustic receivers 22A, 22B, 22C, 22D, 22E, 22F, 22G, 22H may be referred to as receivers, transceivers, sensors, or transducers. It is understood that these refer to the acoustic receivers 22A, 22B, 22C, 22D, 22E, 22F, 22G, 22H, where the acoustic receivers 22A, 22B, 22C, 22D, 22E, 22F, 22G, 22H are configured as transceivers or have a transducer positioned therein. The examples, arrangements, and measurements presented are merely for exemplary purposes and are not intended to limit the scope of the disclosure.

The following examples, arrangements, measurements, and explanations presented are merely for exemplary purposes and are not intended to limit the scope of the disclosure. The use of a first sensor array 8A and a second sensor array 8B may add improvements to the sensor. Each side measures direction of arrival and distance to objects in the increased field of view. Since both sides have a hemisphere detection zone there is an overlap in the middle, and thus object detection towards the side of the field of view of the sensors may be more robust than the use of a singular sensor arrangement alone. The central detection zone produces redundant measurements to the same object, from different angles. Alternating measurements from one side to the other provides very fast updates or measurements in the central overlap area. Additionally, this arrangement can be configured for only one sensor or transducer to transmit an acoustic wave, such that there is no ringdown on the remaining transducers. This allows the sensors to estimate direction of arrival and distance up to the front face of this sensor.

In this example, the spacing of interest is the spacing between the centers of the front faces of each transducers/receivers where the transducers receive or send ultrasonic waves. The center of the front face of each of the transducers/receivers are in the same plane and the direction angle that the transducers/receivers point towards may not be controlling, if there is overlap in the four transducers' beams, or crossing pattern along the various axes, over the angles or field of view that is measured.

Figure 15:
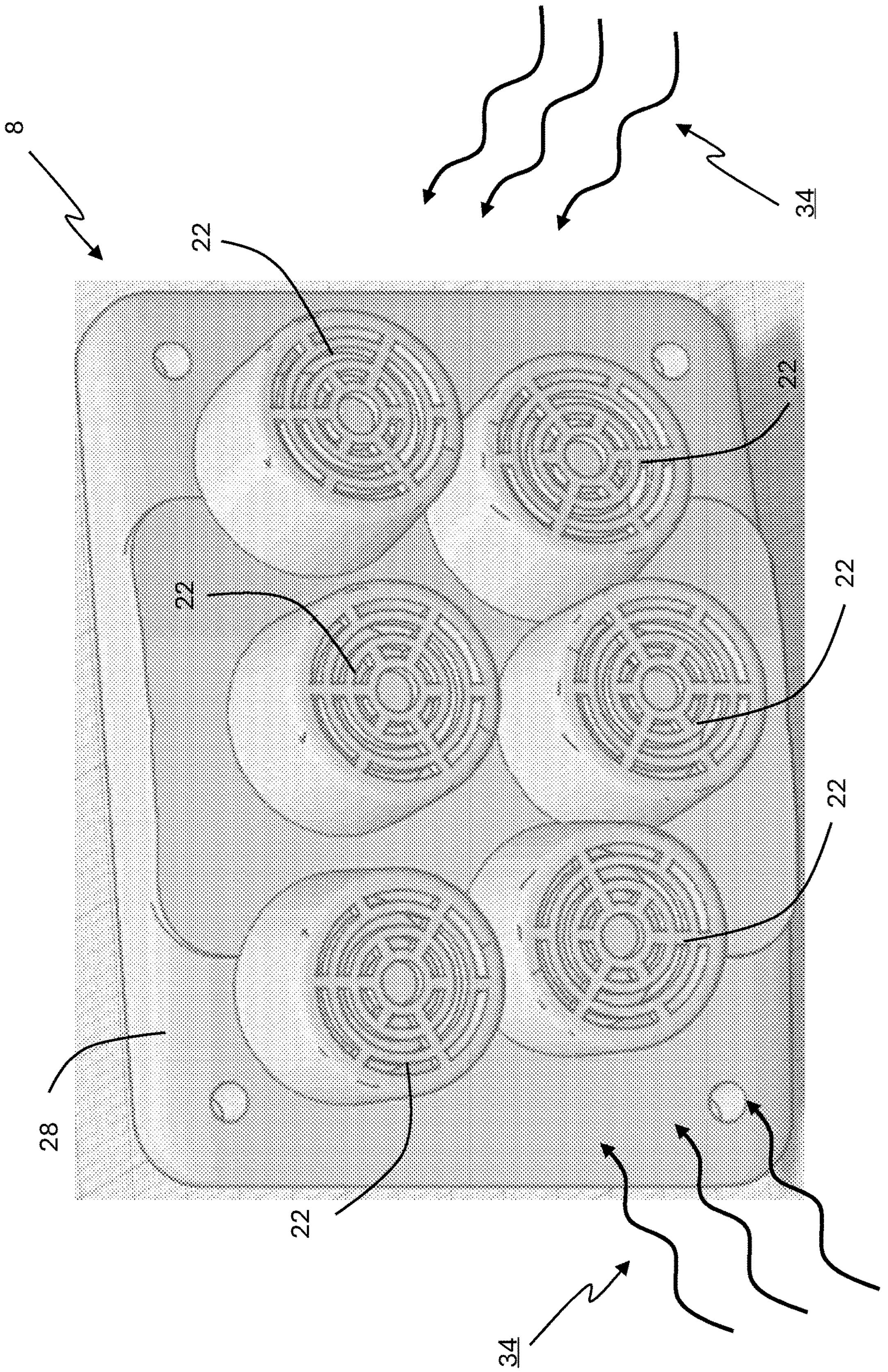
FIG. 15 is a perspective view illustration of an acoustic sensor array in a housing, in accordance with embodiments of the present disclosure.

FIG. 15 is a perspective view illustration of an acoustic sensor array 8 in a housing, in accordance with exemplary embodiments of the present disclosure. Use of acoustic receivers 22 in a center area of the housing 28 may be preferred for reduced production costs, as the amount of material needed for the housing 28 is reduced as is the number of acoustic receivers 22. As illustrated, the acoustic receivers 22 positioned to the left and right of the two center acoustic receivers 22 are offset by a predetermined angle to better face their respective directions. The principles of this acoustic sensor array 8 are similar to those described relative to FIG. 14B, in particular, the center points (not illustrated) of the front face of each acoustic receiver 22 may be positioned on the same plane. Similarly, the direction angle that the transducers/receivers point towards may not be controlling, if there is overlap in the four transducers' beams, or crossing pattern along the various axes, over the angles or field of view that is measured.

Figure 16:
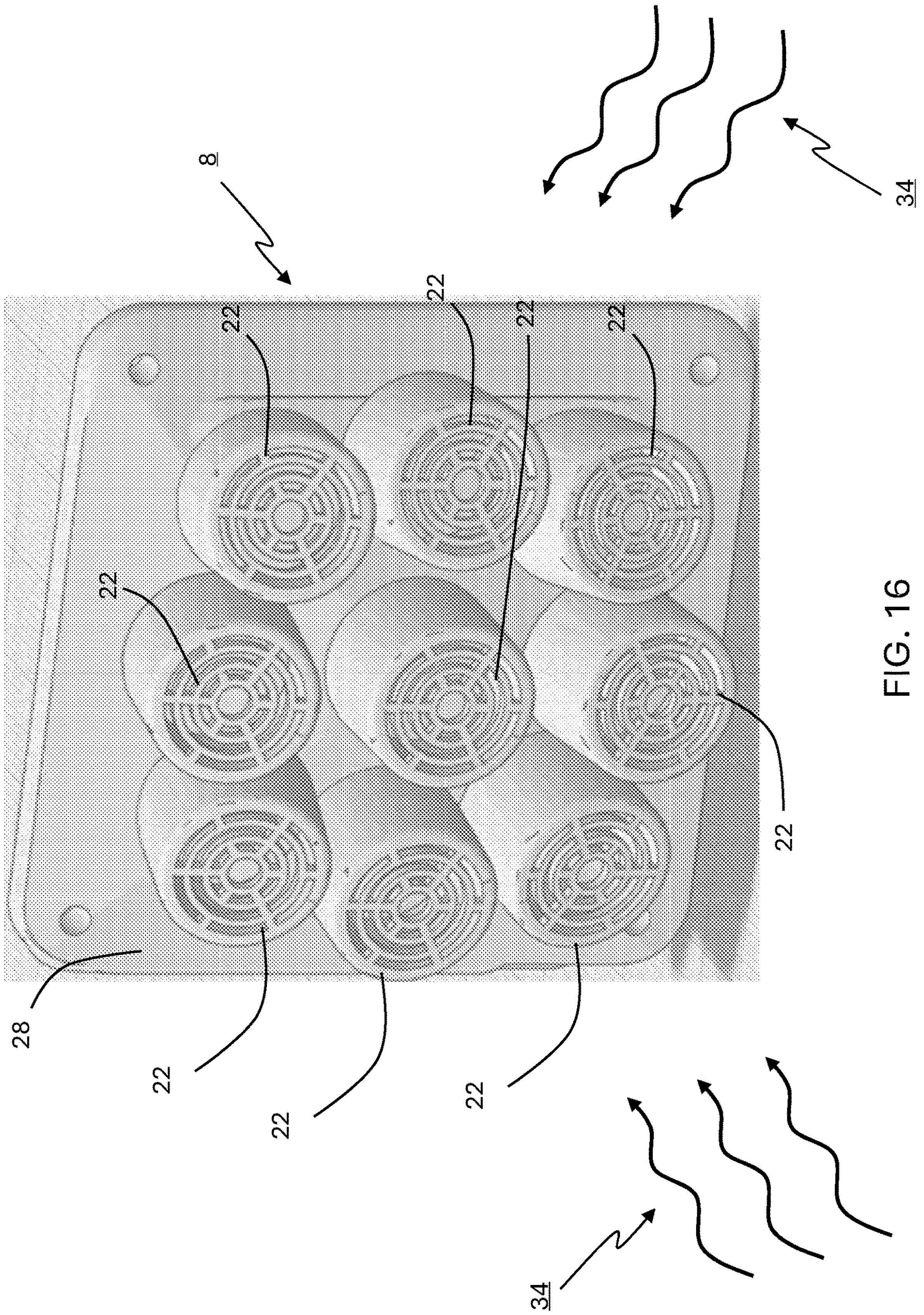
FIG. 16 is a perspective view illustration of an acoustic sensor array in a housing, in accordance with embodiments of the present disclosure.

FIG. 16 is a front perspective illustration of an acoustic sensor array 8 in a housing 28, in accordance with exemplary embodiments of the present disclosure. In this arrangement, each acoustic receiver 22 may be positioned on the housing 28, and angled such that the acoustic receivers 22 have a wider field of view. In other words, the face of each of the acoustic receivers 22 may be facing different directions, as opposed to being positioned flat along a plane. This positioning may increase the field of view of the acoustic receivers 22, such that an incoming acoustic wave 34 may be sensed from objects or beacons positioned nearly lateral to the housing 28. This configuration may also be described as the face of the two center acoustic receivers 22 being positioned to face forward and the acoustic receivers 22 positioned on each left and right sides of the two center acoustic receivers 22 angled to the left and right, respectively. The principles of this acoustic sensor array 8 are similar to those described relative to FIGS. 14B-15, in particular, the center points (not illustrated) of the front face of each acoustic receiver 22 may be positioned on the same plane. Similarly, the direction angle that the transducers/receivers point towards may not be controlling, if there is overlap in the four transducer's beam, or crossing pattern along the various axes, over the angles or field of view that is measured.

Figure 17:
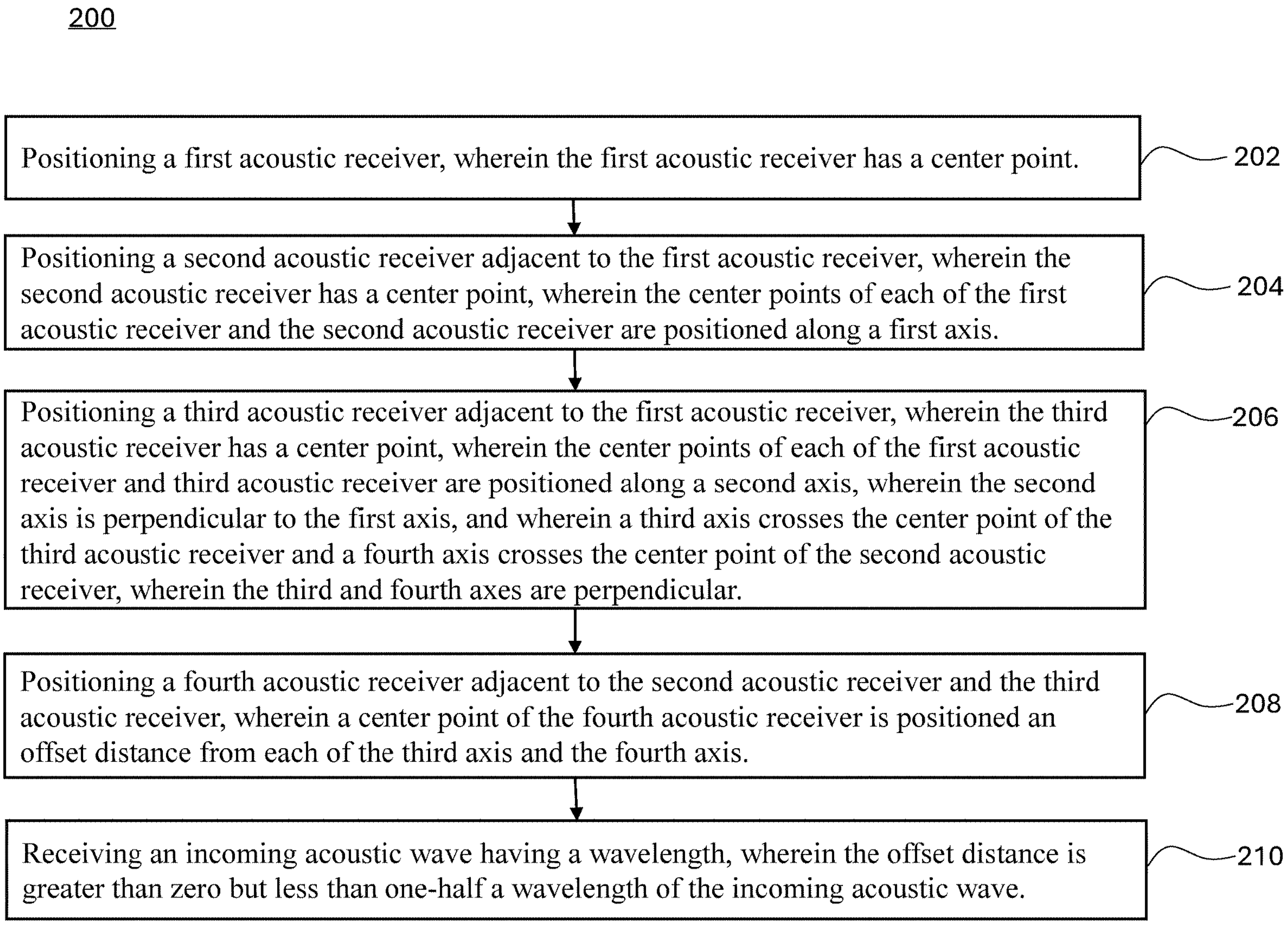
FIG. 17 is a flowchart illustrating a method for positioning acoustic receivers for sensing an incoming acoustic wave, in accordance with embodiments of the present disclosure.

FIG. 17 is a flowchart 200 illustrating a method for positioning acoustic receivers for sensing incoming acoustic waves, in accordance with exemplary embodiments of the present disclosure. It should be noted that any process descriptions or blocks in flow charts should be understood as representing modules, segments, portions of code or steps that include one or more instructions for implementing specific logical functions in the process, and alternate implementations are included within the scope of the present disclosure in which functions May be executed out of order from that shown or discussed, including substantially concurrently or in reverse order, depending on the functionality involved, as would be understood by those reasonably skilled in the art of the present disclosure.

Method step 202 has the step of positioning a first acoustic receiver, wherein the first acoustic receiver has a center point. At step 204, positioning a second acoustic receiver adjacent to the first acoustic receiver, wherein the second acoustic receiver has a center point, wherein the center points of each of the first acoustic receiver and the second acoustic receiver are positioned along a first axis. At step 206, positioning a third acoustic receiver adjacent to the first acoustic receiver, wherein the third acoustic receiver has a center point, wherein the center points of each of the first acoustic receiver and third acoustic receiver are positioned along a second axis, wherein the second axis is perpendicular to the first axis, and wherein a third axis crosses the center point of the third acoustic receiver and a fourth axis crosses the center point of the second acoustic receiver, wherein the third and fourth axes are perpendicular. At step 208, positioning a fourth acoustic receiver adjacent to the second acoustic receiver and the third acoustic receiver, wherein a center point of the fourth acoustic receiver is positioned an offset distance from each of the third axis and the fourth axis. At step 210, receiving an incoming acoustic wave having a wavelength, wherein the offset distance is greater than zero but less than one-half a wavelength of the incoming acoustic wave.

Figure 18:
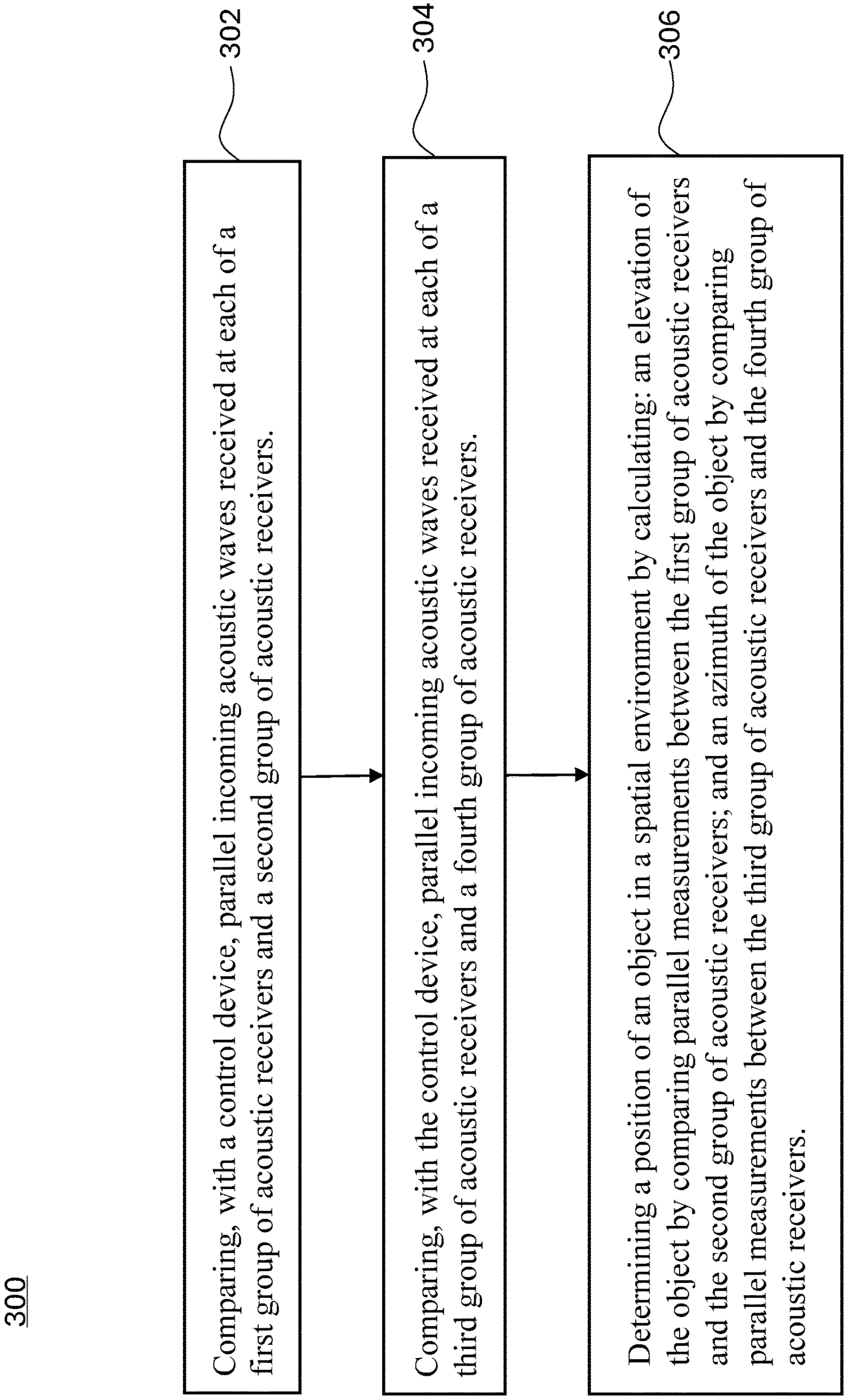
FIG. 18 is a flowchart illustrating a method for determining distance directions of an object using acoustic receivers, in accordance with embodiments of the present disclosure.

FIG. 18 is a flowchart 300 illustrating a method for determining distance directions of an object using acoustic receivers, in accordance with exemplary embodiments of the present disclosure. It should be noted that any process descriptions or blocks in flow charts should be understood as representing modules, segments, portions of code or steps that include one or more instructions for implementing specific logical functions in the process, and alternate implementations are included within the scope of the present disclosure in which functions May be executed out of order from that shown or discussed, including substantially concurrently or in reverse order, depending on the functionality involved, as would be understood by those reasonably skilled in the art of the present disclosure.

Method step 302 has the steps of comparing, with a control device, parallel incoming acoustic waves received at each of a first group of acoustic receivers and a second group of acoustic receivers. At step 304, comparing, with the control device, parallel incoming acoustic waves received at each of a third group of acoustic receivers and a fourth group of acoustic receivers. At step 306, determining a position of an object in a spatial environment by calculating: an elevation of the object by comparing parallel measurements between the first group of acoustic receivers and the second group of acoustic receivers; and an azimuth of the object by comparing parallel measurements between the third group of acoustic receivers and the fourth group of acoustic receivers.

In furtherance of the described method, and with reference to FIGS. 8A-13, the position of the object in the spatial environment can also be calculated using the distance of the object from one of the first acoustic receiver 22A, the second acoustic receiver 22B, the third acoustic receiver 22C, or the fourth acoustic receiver 22D. The elevation of the object can be calculated relative to the position of one of the first acoustic receiver 22A, the second acoustic receiver 22B, the third acoustic receiver 22C, or the fourth acoustic receiver 22D. The azimuth of the object can be calculated relative to the position of one of the first acoustic receiver 22A, the second acoustic receiver 22B, the third acoustic receiver 22C, or the fourth acoustic receiver 22D.

In order to increase robustness of the distance measurements described herein, additional acoustic sensors may be added as described relative to FIGS. 10 and 13. This may include positioning an additional acoustic receiver 22B having a center point 32B along the first axis $D_1$ and adjacent to the second acoustic receiver 22F and/or positioning an additional acoustic receiver 22C having a center point 32C along the second axis $D_2$ and adjacent to the third acoustic receiver 22G. Alternatively, robustness may be increased by positioning a fifth acoustic receiver 22C having a center point 32C along the second axis $D_2$ and adjacent to the third acoustic receiver 22G and positioning a sixth acoustic receiver 22B having a center point 32B along the first axis $D_1$ and adjacent to the second acoustic receiver 22F.

Further components may be additionally added to the acoustic sensor array 8 to improve robustness and redundancy to distance measurements. Positioning a seventh acoustic receiver 22I adjacent to the fifth acoustic receiver 22C may aid in this. In adding a seventh acoustic receiver 22I, the positioning of the center point 32I of the seventh acoustic receiver 22I is offset from a fifth axis $D_5$, wherein the fifth axis $D_5$ is perpendicular to the second axis $D_2$ and fourth axis 4, and wherein the offset distance is greater than zero but less than one-half the wavelength of the incoming acoustic wave 34. Positioning an eighth acoustic receiver 22H may add even further robustness and redundancy to distance measurements. The eighth acoustic receiver 22H may be positioned adjacent to the sixth acoustic receiver 22B, wherein a positioning of a center point 32H of the eighth acoustic receiver 22H is offset from a sixth axis $D_6$, wherein the sixth axis $D_6$ is perpendicular to the first axis $D_1$ and third axis $D_3$, and wherein the offset distance is greater than zero but less than one-half the wavelength of the incoming acoustic wave 34.

It should be emphasized that the above-described embodiments of the present disclosure, particularly, any "preferred" embodiments, are merely possible examples of implementations, merely set fourth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for positioning acoustic receivers for sensing an incoming acoustic wave, comprising:
providing a first acoustic receiver having a center point;
positioning a second acoustic receiver adjacent to the first acoustic receiver, wherein the second acoustic receiver has a center point, wherein the center points of each of the first acoustic receiver and the second acoustic receiver are positioned along a first axis;
positioning a third acoustic receiver adjacent to the first acoustic receiver, wherein the third acoustic receiver has a center point, wherein the center points of each of the first acoustic receiver and third acoustic receiver are positioned along a second axis, wherein the second axis is perpendicular to the first axis, and wherein a third axis crosses the center point of the third acoustic receiver and a fourth axis crosses the center point of the second acoustic receiver, wherein the third and fourth axes are different from the first and second axes, respectively, and are perpendicular;
positioning a fourth acoustic receiver adjacent to the second acoustic receiver and the third acoustic receiver, wherein a center point of the fourth acoustic receiver is positioned an offset distance from each of the third axis and the fourth axis; and
receiving an incoming acoustic wave having a wavelength, wherein the offset distance is greater than zero but less than one-half a wavelength of the incoming acoustic wave.

2. The method of claim 1, further comprising:
comparing, with a control device, parallel incoming acoustic waves received at each of a first group of acoustic receivers and a second group of acoustic receivers, wherein the first group of acoustic receivers includes the first and second acoustic receivers, and the second group of acoustic receivers includes the third and fourth acoustic receivers; and
comparing, with the control device, parallel incoming acoustic waves received at each of a third group of acoustic receivers and a fourth group of acoustic receivers, wherein the third group of acoustic receivers includes the first and third acoustic receivers and the fourth group of acoustic receivers includes the second and fourth acoustic receivers,
wherein each group of acoustic receivers is unique and has at least two acoustic receivers.

3. The method of claim 2, further comprising determining a position of an object in a spatial environment by calculating:
an elevation of the object by comparing parallel measurements between the first group of acoustic receivers and the second group of acoustic receivers; and
an azimuth of the object by comparing parallel measurements between the third group of acoustic receivers and the fourth group of acoustic receivers.

4. The method of claim 1, further comprising calculating a position of an object in a spatial environment using at least one of:
a distance of the object from at least one of the first, second, third, or fourth acoustic receivers;
an elevation of the object relative to the position of at least one of the first, second, third, or fourth acoustic receivers; and
an azimuth of the object relative to the position of at least one of the first, second, third, or fourth acoustic receivers.

5. The method of claim 1, further comprising:
positioning a transducer adjacent to at least one of the acoustic receivers; and
emitting at least one acoustic wave with the transducer.

6. The method of claim 1, further comprising positioning an additional acoustic receiver adjacent to the second acoustic receiver, wherein the additional acoustic receiver has a center point positioned along the first axis.

7. The method of claim 1, further comprising positioning an additional acoustic receiver adjacent to the third acoustic receiver, wherein the additional acoustic receiver has a center point positioned along the second axis.

8. The method of claim 1, further comprising:
positioning a fifth acoustic receiver adjacent to the third acoustic receiver, wherein a center point of the fifth acoustic receiver is positioned along the second axis; and
positioning a sixth acoustic receiver adjacent to the second acoustic receiver, wherein a center point of the sixth acoustic receiver is positioned along the first axis.

9. The method of claim 8, further comprising positioning a seventh acoustic receiver adjacent to the fifth acoustic receiver, wherein a center point of the seventh acoustic receiver is an offset distance from a fifth axis, wherein the fifth axis is perpendicular to the second and third axes, and wherein the offset distance of the seventh acoustic receiver is greater than zero but less than one-half the wavelength of the incoming acoustic wave.

10. The method of claim 9, further comprising positioning an eighth acoustic receiver adjacent to the sixth acoustic receiver, wherein a center point of the eighth acoustic receiver is an offset distance from a sixth axis, wherein the sixth axis is perpendicular to the first and fourth axes, and wherein the offset distance of the eighth acoustic receiver is greater than zero but less than one-half the wavelength of the incoming acoustic wave.

11. An acoustic sensor array, comprising:
a first acoustic receiver having a center point;
a second acoustic receiver positioned adjacent to the first acoustic receiver, wherein the second acoustic receiver has a center point, wherein the center points of each of the first acoustic receiver and the second acoustic receiver are positioned along a first axis;
a third acoustic receiver positioned adjacent to the first acoustic receiver, wherein the third acoustic receiver has a center point, wherein the center points of each of the first acoustic receiver and third acoustic receiver are positioned along a second axis, the second axis being perpendicular to the first axis, wherein a third axis crosses the center point of the third acoustic receiver and a fourth axis crosses the center point of the second acoustic receiver, wherein the third and fourth axes are different from the first and second axes, respectively, and are perpendicular;
a fourth acoustic receiver positioned adjacent to the second acoustic receiver and the third acoustic receiver, wherein a center point of the fourth acoustic receiver is positioned an offset distance from each of the third axis and the fourth axis; and an incoming acoustic wave having a wavelength, wherein the offset distance is greater than zero but less than one-half a wavelength of the incoming acoustic wave.

12. The acoustic sensor array of claim 11, further comprising a controller, wherein the controller compares the incoming acoustic waves received at a first group of acoustic receivers in parallel with a second group of acoustic receivers and the incoming acoustic wave received at a third group of acoustic receivers in parallel with a fourth group of acoustic receivers, wherein the first group of acoustic receivers includes at least the first and second acoustic receivers, and the second group of acoustic receivers includes at least the third and fourth acoustic receivers, the third group of acoustic receivers includes at least the first and third acoustic receivers, and the fourth group of acoustic receivers includes at least the second and fourth acoustic receivers, and wherein each group of acoustic receivers is unique.

13. The acoustic sensor array of claim 11, wherein each of the acoustic receivers comprises a transducer.

14. The acoustic sensor array of claim 11, further comprising a transducer positioned adjacent to at least one of the acoustic receivers, wherein the transducer is configured to emit at least one acoustic wave.

15. The acoustic sensor array of claim 11, further comprising an additional acoustic receiver positioned adjacent to the second acoustic receiver, wherein the additional acoustic receiver has a center point positioned along the first axis.

16. The acoustic sensor array of claim 11, further comprising an additional acoustic receiver positioned adjacent to the third acoustic receiver, wherein the additional acoustic receiver has a center point positioned along the second axis.

17. The acoustic sensor array of claim 11, further comprising:

a fifth acoustic receiver positioned adjacent to the third acoustic receiver, wherein the fifth acoustic receiver has a center point positioned along the second axis; and a sixth acoustic receiver positioned adjacent to the second acoustic receiver, wherein the sixth acoustic receiver has a center point positioned along the first axis.

18. The acoustic sensor array of claim 17, further comprising:

a seventh acoustic receiver positioned adjacent to the fifth acoustic receiver, wherein a center point of the seventh acoustic receiver is positioned the offset distance from a fifth axis, wherein the fifth axis is perpendicular to the second and third axes, and wherein the offset distance is greater than zero but less than one-half the wavelength of the incoming acoustic wave.

19. The acoustic sensor array of claim 18, further comprising:

an eighth acoustic receiver positioned adjacent to the sixth acoustic receiver, wherein a center point of the eighth acoustic receiver is positioned the offset distance from a sixth axis, wherein the sixth axis is perpendicular to the first and fourth axes, and wherein the offset distance is greater than zero but less than one-half of the wavelength of the incoming acoustic wave.

20. An acoustic sensor arrangement, comprising:

a housing having a first sensor array and a second sensor array, the second sensor array positioned adjacent to the first sensor array, wherein each of the first and second sensor arrays has:

a first acoustic receiver having a center point;

a second acoustic receiver positioned adjacent to the first acoustic receiver, wherein the second acoustic receiver has a center point, wherein the center points of each of the first acoustic receiver and the second acoustic receiver are positioned along a first axis;

a third acoustic receiver positioned adjacent to the first acoustic receiver, wherein the third acoustic receiver has a center point, wherein the center points of each of the first acoustic receiver and third acoustic receiver are positioned along a second axis, the second axis being perpendicular to the first axis, wherein a third axis crosses the center point of the third acoustic receiver and a fourth axis crosses the center point of the second acoustic receiver, wherein the third and fourth axes are different from the first and second axes, respectively, and are perpendicular; and a fourth acoustic receiver positioned adjacent to the second acoustic receiver and the third acoustic receiver, wherein a center point of the fourth acoustic receiver is positioned an offset distance from each of the third axis and the fourth axis; and an incoming acoustic wave having a wavelength, wherein the offset distance is greater than zero but less than one-half a wavelength of the incoming acoustic wave.

* * * * *